United States Patent
Miyamura et al.

(10) Patent No.: US 11,228,152 B2
(45) Date of Patent: Jan. 18, 2022

(54) JOINT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Masaaki Tabata, Mie (JP); Yasuo Omori, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/058,024

(22) PCT Filed: May 31, 2019

(86) PCT No.: PCT/JP2019/021809
§ 371 (c)(1),
(2) Date: Nov. 23, 2020

(87) PCT Pub. No.: WO2019/235389
PCT Pub. Date: Dec. 12, 2019

(65) Prior Publication Data
US 2021/0234321 A1 Jul. 29, 2021

(30) Foreign Application Priority Data
Jun. 5, 2018 (JP) .............................. JP2018-107612

(51) Int. Cl.
*H01R 31/06* (2006.01)
*H01R 4/48* (2006.01)
*H02G 15/08* (2006.01)

(52) U.S. Cl.
CPC ............... *H01R 31/06* (2013.01); *H01R 4/48* (2013.01); *H02G 15/08* (2013.01)

(58) Field of Classification Search
CPC .......... H01R 31/06; H01R 4/48; H01R 15/08; H01R 4/26; H01R 4/5075; H01R 31/08; H01R 11/09
See application file for complete search history.

(56) References Cited

U.S. PATENT DOCUMENTS

| 6,551,119 B1* | 4/2003 | Sakamoto | ............ H01R 13/514 439/287 |
| 7,354,318 B2* | 4/2008 | Murakami | ............. H01R 4/185 439/701 |
| 2002/0025731 A1* | 2/2002 | Sato | ...................... H01R 13/514 439/701 |

FOREIGN PATENT DOCUMENTS

| CN | 102377030 A | 3/2012 |
| JP | 2002-165323 A | 6/2002 |

(Continued)

OTHER PUBLICATIONS

International Search Report dated Jul. 16, 2019 for WO 2019/235389 A1 (4 pages).

*Primary Examiner* — Briggitte R. Hammond
(74) *Attorney, Agent, or Firm* — Abelman, Frayne & Schwab

(57) ABSTRACT

A joint connector 10 is provided with a joint terminal 12, and a housing 13 configured to accommodate the joint terminal 12. The joint terminal 12 includes a plurality of branch portions 16, a plurality of wire connecting portions 19 respectively continuous with the plurality of branch portions (Continued)

16 and to be connected to wires 11, and a coupling portion 15 electrically connecting the plurality of branch portions 16 by coupling the plurality of branch portions 16. The wire connecting portion 19 includes a connecting piece having a contact surface configured to contact the wire 11 and a pressing portion 17 configured to press the connecting piece against the wire 11 by coming into contact with the connecting piece.

7 Claims, 47 Drawing Sheets

(56) References Cited

FOREIGN PATENT DOCUMENTS

| JP | 2006-179368 A | 7/2006 |
|---|---|---|
| JP | 2014-002994 A | 1/2014 |
| JP | 2015-219955 A | 12/2015 |
| JP | 2016-225248 A | 12/2016 |

\* cited by examiner

FIG. 9
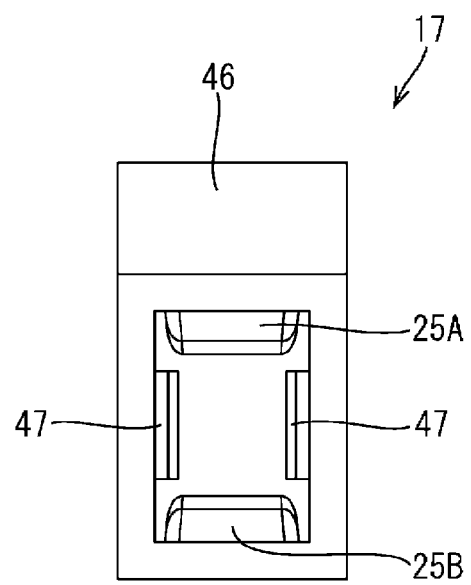
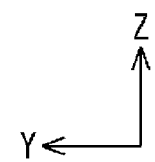

FIG. 27
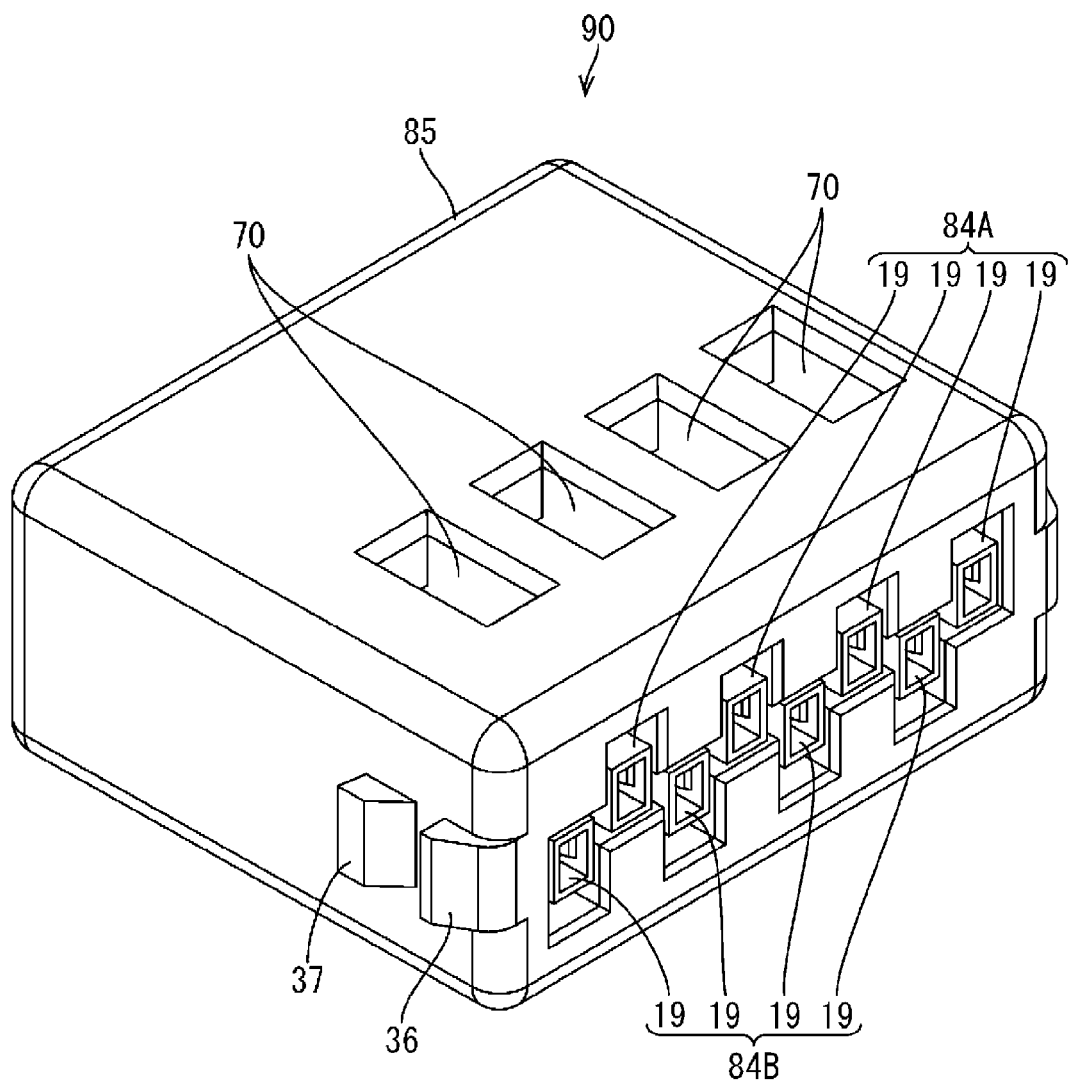
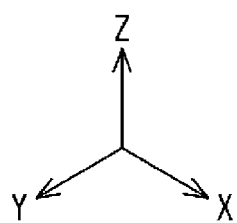

FIG. 46
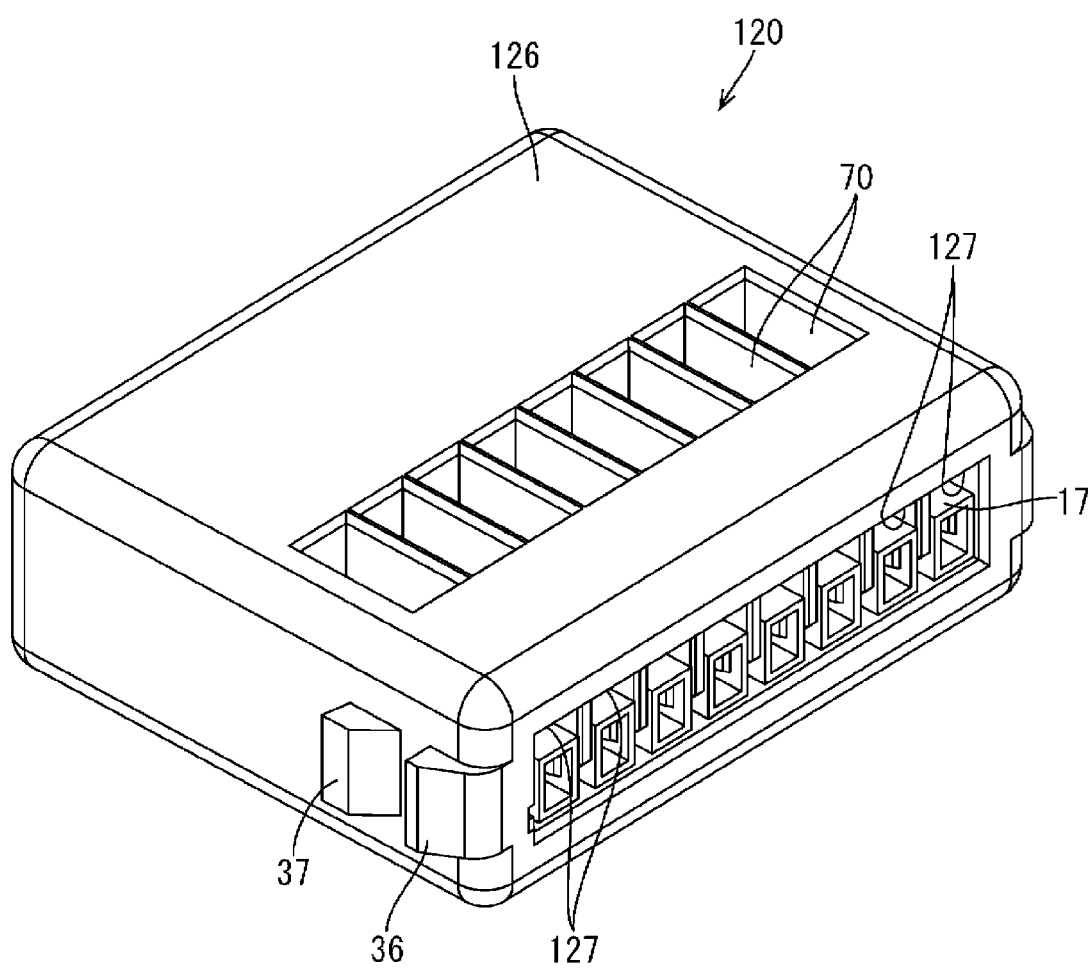
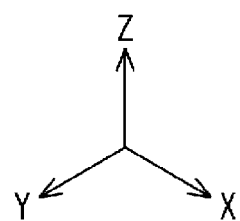

JOINT CONNECTOR

CROSS REFERENCE TO RELATED APPLICATIONS

This application is a national phase of PCT application No. PCT/JP2019/021809, filed on 31 May 2019, which claims priority from Japanese patent application No. 2018-107612, filed on 5 Jun. 2018, all of which are incorporated herein by reference.

TECHNICAL FIELD

A technique disclosed in this specification relates to a joint connector for electrically connecting a plurality of wires.

BACKGROUND

Conventionally, a joint connector for electrically connecting a plurality of wires is known from Japanese Patent Laid-Open Publication No. 2015-219955. This joint connector is provided with a joint terminal in which a plurality of male terminals are integrally juxtaposed, female terminals connected to wires and to be respectively connected to the male terminals and a housing including a terminal insertion groove for accommodating the joint terminal and cavities for accommodating the female terminals.

In the above joint connector, the wire and the female terminal are electrically connected by crimping a barrel provided in the female terminal to the outer periphery of the wire. Further, the female terminal includes a connecting tube portion having a resilient contact piece inside. The resilient contact piece resiliently contacts the male terminal inserted into the connecting tube portion, whereby the female terminal and the male terminal are electrically connected.

In the above joint connector, the male terminals and the female terminals are electrically connected by inserting the joint terminal into the terminal insertion groove of the housing and accommodating the female terminals connected to the wires into the cavities. In this way, the plurality of wires are electrically connected via the female terminals and the male terminals by the joint terminal.

PRIOR ART DOCUMENT

Patent Document

Patent Document 1: JP 2015-219955 A

SUMMARY OF THE INVENTION

Problems to be Solved

According to the above technique, a step of crimping the barrels of the female terminals to the wires and a step of accommodating the female terminals into the housing have been separately performed. Thus, it has been required to make a manufacturing process of the joint connector more efficient.

The technique disclosed in this specification was completed on the basis of the above situation and aims to provide a joint connector, a manufacturing process of which is made more efficient.

Means to Solve the Problem

The technique disclosed in this specification is directed to a joint connector with a joint terminal, and a housing configured to accommodate the joint terminal, the joint terminal including a plurality of branch portions, a plurality of wire connecting portions respectively continuous with the plurality of branch portions and to be connected to wires, and a coupling portion electrically connecting the plurality of branch portions by coupling the plurality of branch portions, wherein the wire connecting portion includes a connecting piece having a contact surface configured to contact the wire and a pressing portion configured to press the connecting piece against the wire by coming into contact with the connecting piece.

According to the above configuration, after the wire is disposed on the contact surface of the wire connecting portion, the wire is pressed against the connecting piece by the pressing portion, whereby the wire and the joint terminal can be electrically connected. In this way, an assembly process of the joint connector can be made more efficient as compared to the case where a process of connecting female terminals, which are members separate from the joint terminal, and the wires is separately performed like a conventional technique.

The following modes are preferable as embodiments of the technique disclosed in this specification.

The pressing portion moves between a pressing position where the pressing portion presses the connecting piece against the wire and a releasing position where the pressing portion does not press the connecting piece.

According to the above configuration, the wire and the joint terminal can be electrically connected by a simple operation of moving the pressing portion from the releasing position to the pressing position.

A jig contact portion is provided to project on the pressing portion, and the pressing portion is moved from the releasing position to the pressing position by being pressed by a jig with the jig contact portion held in contact with the jig.

According to the above configuration, the wire and the joint terminal can be electrically connected by bringing the jig into contact with the jig contact portion and moving the pressing portion from the releasing position to the pressing position.

A holder is mounted on the housing, and the holder includes an engaging portion configured to restrict a movement of the pressing portion at the pressing position to the releasing position by engaging the pressing portion with the holder mounted on the housing.

According to the above configuration, the pressing portion can be retained and held in the housing by the engagement of the engaging portion of the holder with the pressing portion.

The plurality of wire connecting portions are disposed on opposite ends in a longitudinal direction of the branch portions.

According to the above configuration, the wires routed toward the joint connector from different directions along the longitudinal direction of the branch portions can be electrically connected.

The coupling portion includes a coupling portion folded portion folded in a longitudinal direction of the coupling portion and a first coupling portion and a second coupling portion delimited by the coupling portion folded portion, and the first and second coupling portions are folded to overlap.

According to the above configuration, a plurality of the wire connecting portions provided on the second coupling portions can be respectively disposed between adjacent ones of a plurality of the wire connecting portions provided on the first coupling portions by folding the coupling portion in the coupling portion folded portion. Since intervals between the plurality of wire connecting portions arranged in an extending direction of the coupling portion can be made narrower in this way, the joint connector can be made narrower in the extending direction of the coupling portion.

The plurality of branch portions include first branch portions branched on one side of the coupling portion and second branch portions branched on the other side of the coupling portion, and the second branch portions are folded to extend in the same direction as an extending direction of the first branch portions.

According to the above configuration, the wire connecting portions continuous with the second branch portions can be disposed between adjacent ones of the plurality of wire connecting portions continuous with the first branch portions arranged in the extending direction of the coupling portion by folding the second branch portions in branch portion folded portions. In this way, the intervals between the plurality of wire connecting portions arranged in the extending direction of the coupling portion can be made narrower. In this way, the joint connector can be made narrower in the extending direction of the coupling portion.

Effect of the Invention

According to the technique disclosed in this specification, it is possible to make a joint connector manufacturing process more efficient.

BRIEF DESCRIPTION OF THE DRAWINGS

FIG. 9 is a left side view showing the pressing portion.
FIG. 27 is a perspective view showing a joint connector.
FIG. 46 is a perspective view showing a joint connector.

DETAILED DESCRIPTION TO EXECUTE THE INVENTION

First Embodiment

A first embodiment according to the technique disclosed in this specification is described with reference to FIGS. 1 to 17. A joint connector 10 according to this embodiment includes a joint terminal 12 for electrically connecting a plurality of wires 11, and a housing 30 for accommodating the joint terminal 12. In the following description, a direction indicated by an arrow Z is referred to as an upward direction, a direction indicated by an arrow Y is referred to as a forward direction and a direction indicated by an arrow X is referred to as a leftward direction. Only some of a plurality of identical members may be denoted by a reference sign and the other members may not be denoted by the reference sign.

(Wires 11)

Figure 3:
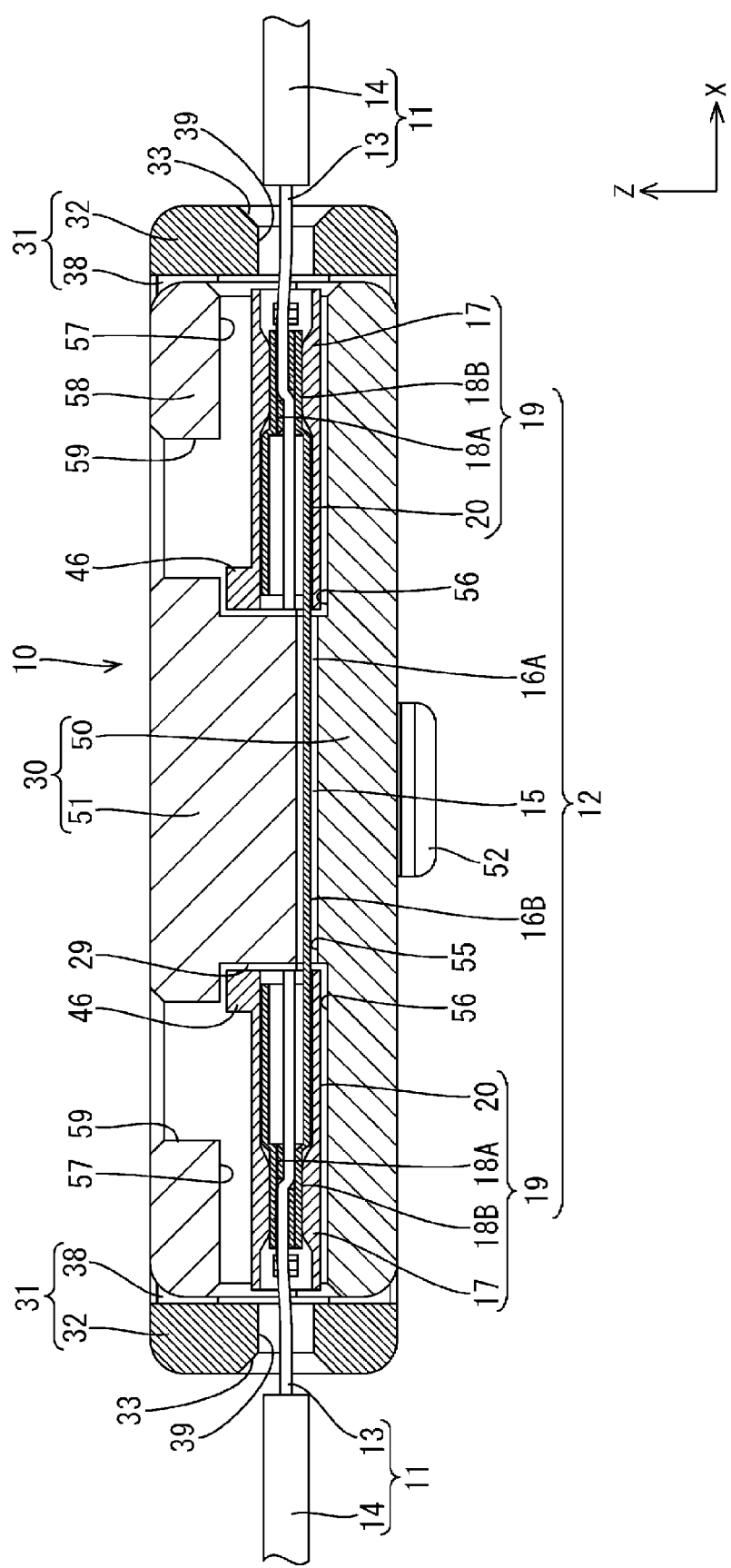
FIG. 3 is a section showing the joint connector.

As shown in FIG. 3, the wire 11 is such that the outer peripheral surface of a core 13 is surrounded by an insulation coating 14 made of insulating synthetic resin. An end part of the insulation coating 14 is stripped to expose the core 13. The core 13 according to this embodiment is a so-called single-core wire made of one metal wire. Note that the core 13 may be a stranded wire by stranding a plurality of metal thin wires. An arbitrary metal such as coper, copper alloy, aluminum or aluminum alloy can be appropriately selected as a metal constituting the core 13 according to need. The core 13 according to this embodiment is made of copper or copper alloy.

(Joint Terminal 12)

As shown in FIG. 3, the joint terminal 12 includes a coupling portion 15 extending in a front-rear direction, a plurality of (four in this embodiment) branch portions 16 extending in a lateral direction from both left and right side edges of the coupling portion 15, and a plurality of (four in this embodiment) wire connecting portions 19 respectively continuous with the plurality of barrel portions 16 and to be connected to the wires 11. The joint terminal 12 is substantially H-shaped when viewed from above.

The wire connecting portion 19 includes a tubular portion 20 in the form of a rectangular tube continuous from the barrel portion 16, an upper connecting piece 18A (an example of a connecting piece) and a lower connecting piece 18B (an example of the connecting piece) deformable and extending along the lateral direction from an end part of the tubular portion 20 opposite to the barrel portion 16, and a pressing portion 17 separate from the tubular portion 20 and the upper and lower connecting pieces 18A, 18B and to be mounted on the tubular portion 20.

Figure 7:
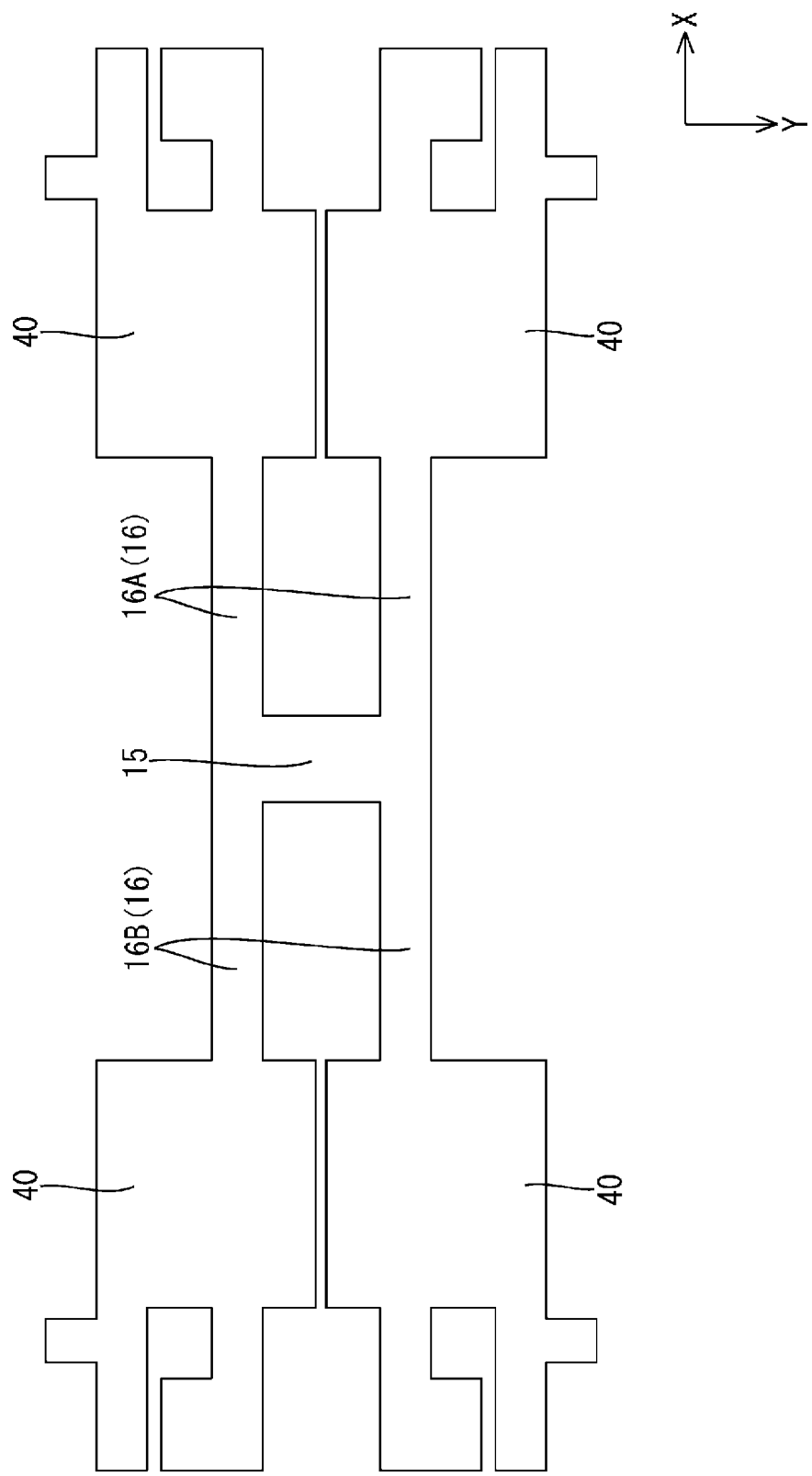
FIG. 7 is a plan view showing a developed shape of a metal plate material after cutting.

The coupling portion 15, the barrel portions 16, the tubular portions 20 and the upper and lower connecting pieces 18A, 18B are formed by press-working after a metal plate material is cut into a developed shape as shown in FIG. 7. An arbitrary metal such as coper, copper alloy, aluminum, aluminum alloy or stainless steel can be appropriately selected as a metal constituting the metal plate material according to need. In this embodiment, the metal constituting the metal plate material is made of copper or copper alloy. A plating layer may be formed on the surface of the metal plate material. An arbitrary metal such as tin, nickel or silver can be appropriately selected as a metal constituting the plating layer according to need. Tin plating is applied to the metal plate material according to this embodiment.

Figure 4:
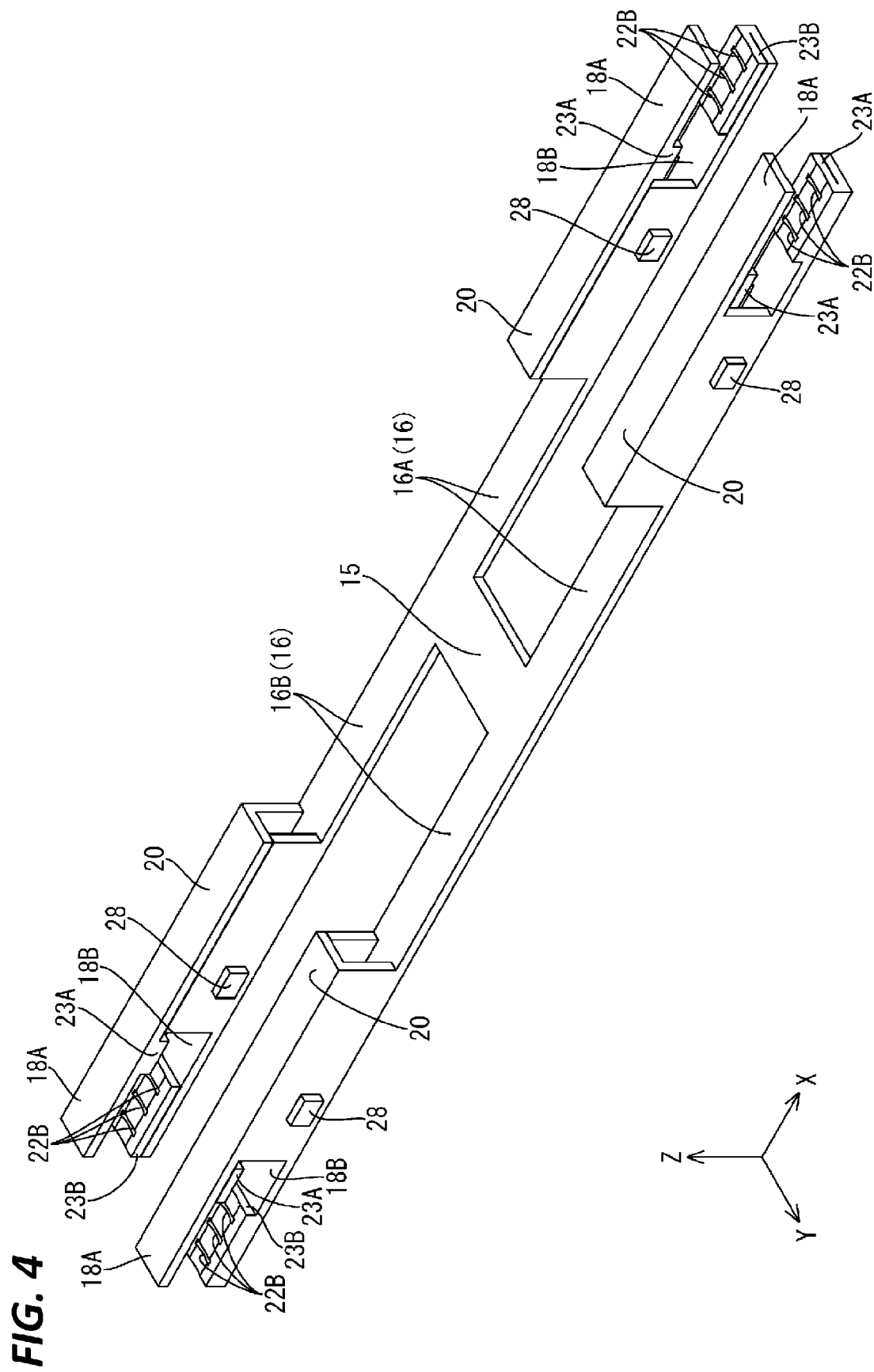
FIG. 4 is a perspective view showing a joint terminal before pressing portions are mounted.

As shown in FIG. 4, the coupling portion 15 is in the form of a relatively short plate extending in the front-rear direction. Plate surfaces of the coupling portion 15 are facing in a vertical direction. The coupling portion 15 has a substantially rectangular shape when viewed from above.

Two first barrel portions 16A extending leftward are provided respectively from front and rear end parts of the coupling portion 15. Further, two second barrel portions 16A extending rightward are provided respectively from the front and rear end parts of the coupling portion 15. Plate surfaces of the first and second barrel portions 16A, 16B are facing in the vertical direction. The first and second barrel portions 16A, 16B have a substantially rectangular shape elongated in the lateral direction when viewed from above.

The wire connecting portions 19 are respectively continuous with end parts of the first and second barrel portions 16A, 16B. The wire connecting portions 19 continuous with the first barrel portions 16A and the wire connecting portions 19 continuous with the second barrel portions 16B are bilaterally symmetrically disposed, and all the wire connecting portions 19 have the same structure. Thus, the structure of one wire connecting portion 19 is described and the description of the other wire connecting portions 19 is omitted by denoting the same members by the same reference signs.

Figure 5:
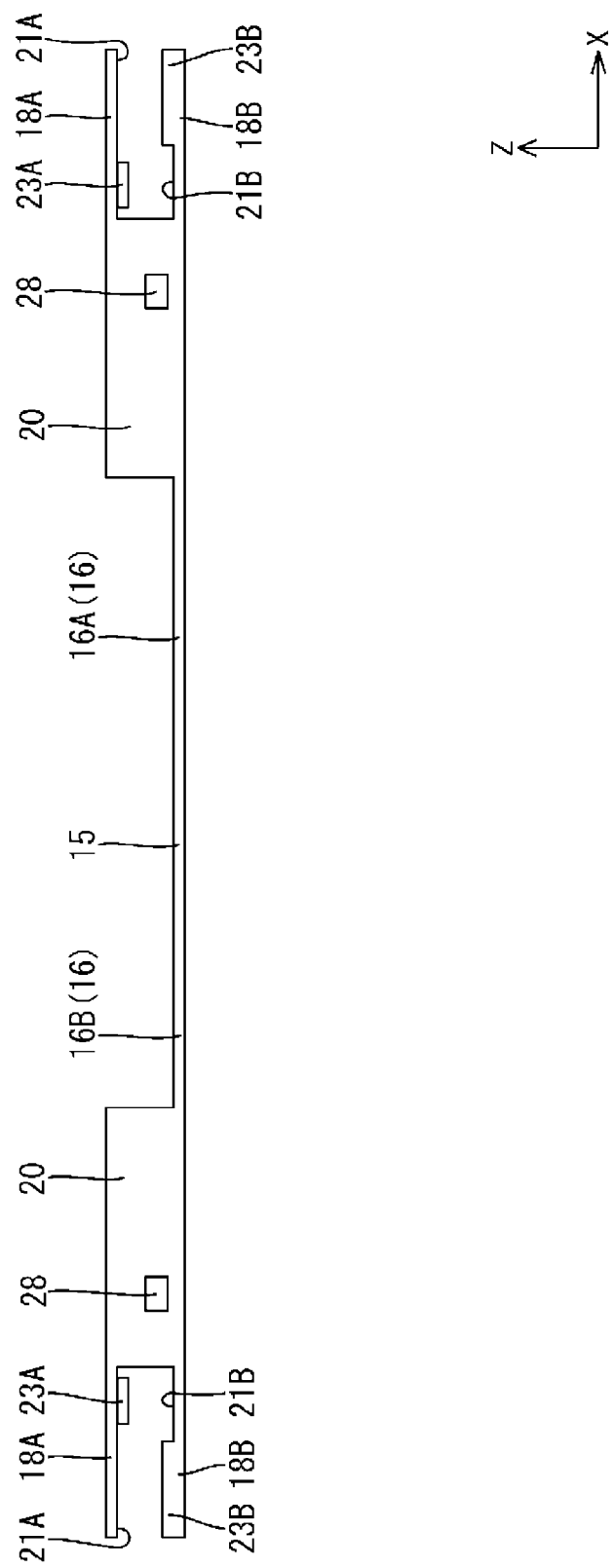
FIG. 5 is a front view showing the joint terminal before the pressing portions are mounted.
Figure 6:
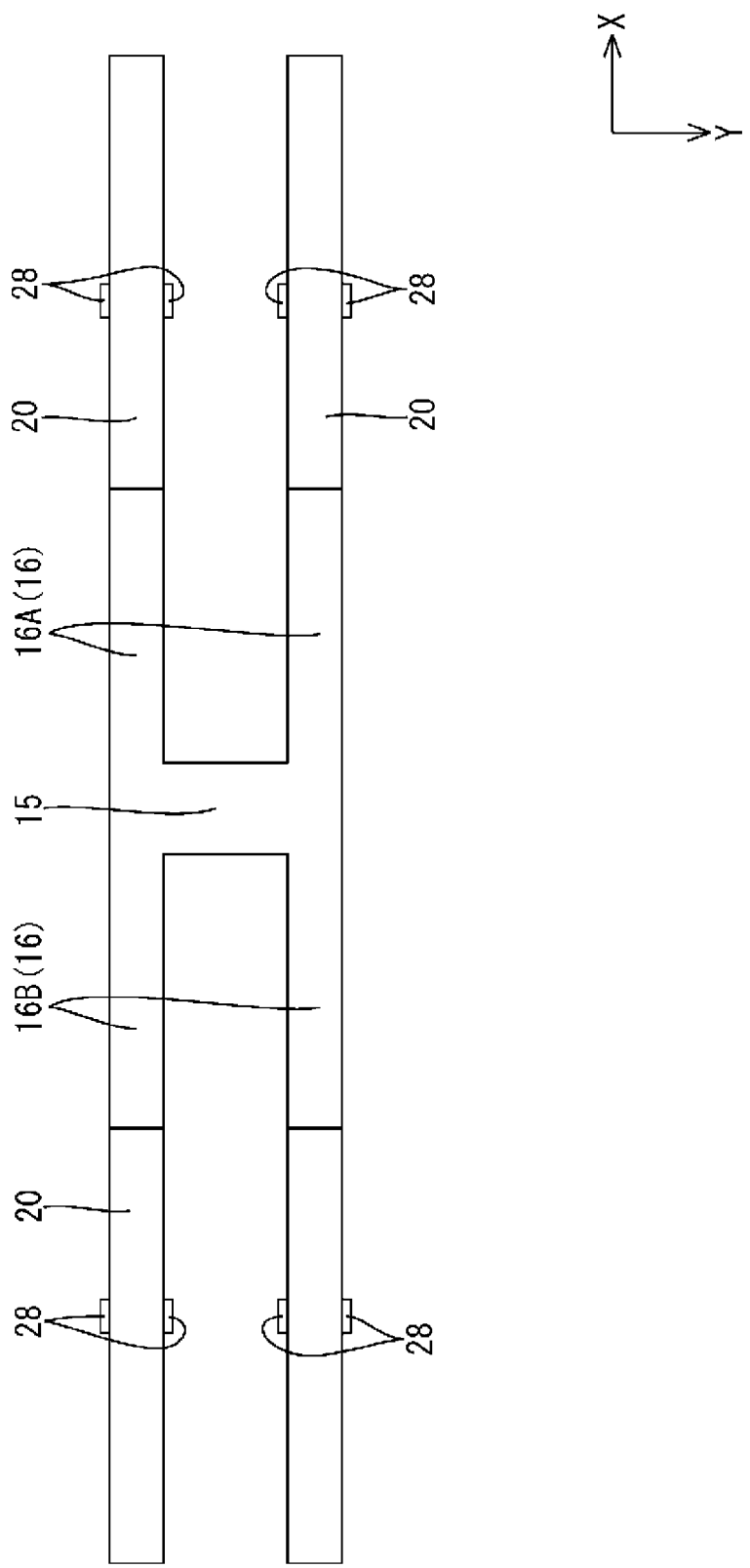
FIG. 6 is a plan view showing the joint terminal before the pressing portions are mounted.

As shown in FIGS. 4 to 6, the tubular portion 20 of the wire connecting portion 19 is in the form of a rectangular tube elongated in the lateral direction. The upper connecting piece 18A extending in a direction opposite to the barrel portion 16 along the lateral direction from an end part located on a side opposite to the barrel portion 16 is provided on an upper wall of the tubular portion 20. The lower connecting piece 18B extending in the direction opposite to the barrel portion 16 along the lateral direction from an end part located on the side opposite to the barrel portion 16 is provided on a lower wall of the tubular portion 20. The upper and lower connecting pieces 18A, 18B are formed to have substantially the same length in the front-rear direction.

(Upper Connecting Piece 18A)

The upper connecting piece 18A is formed to be resiliently deformable in the vertical direction with a boundary part to the tubular portion 20 as a fulcrum. The lower surface of the upper connecting piece 18A serves as an upper contact surface 21A (an example of a contact surface) configured to contact the core 13. An upper holding protrusion 23A projecting downward is provided at a position near the boundary part to the tubular portion 20 on the upper contact surface 21A of the upper connecting piece 18A. The upper contact surface 21A is formed with a plurality of (three in this embodiment) serrations 22A extending in the front-rear direction and arranged at intervals in the lateral direction. The serrations 22A are in the form of grooves extending in the front-rear direction (see FIG. 16).

(Lower Connecting Piece 18B)

The lower connecting piece 18B is formed to be resiliently deformable in the vertical direction with a boundary part to the tubular portion 20 as a fulcrum. The upper surface of the lower connecting piece 18B serves as a lower contact surface 21B (an example of the contact surface) configured to contact the core 13. A lower holding protrusion 23B projecting upward is provided at a position near a projecting end part of the lower connecting piece 18B on the lower contact surface 21B of the lower connecting piece 18B. The lower holding protrusion 23B and the upper holding protrusion 23A are provided at positions shifted in the lateral direction. The lower contact surface 21B is formed with a plurality of (three in this embodiment) serrations 22B extending in the front-rear direction and arranged at intervals in the lateral direction. The serrations 22B are in the form of grooves extending in the front-rear direction (see FIG. 16).

Figure 16:
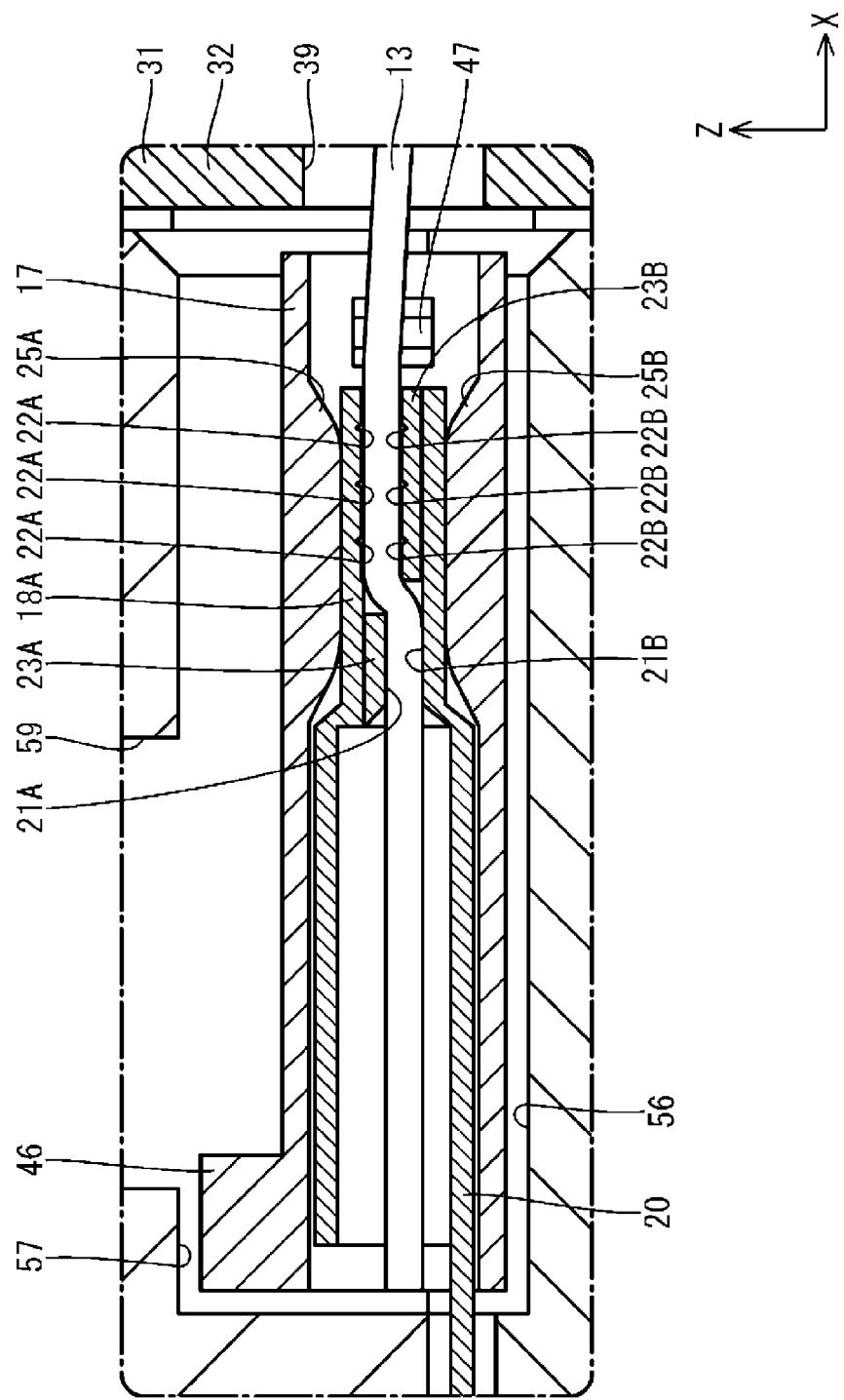
FIG. 16 is a partial enlarged section of FIG. 15.

By the contact of the core 13 with the upper contact surface 21A of the upper connecting piece 18A and the lower contact surface 21B of the lower connecting piece 18B, the core 13 and the wire connecting portion 19 are electrically connected (see FIG. 16).

(Pressing Portion 17)

Figure 8:
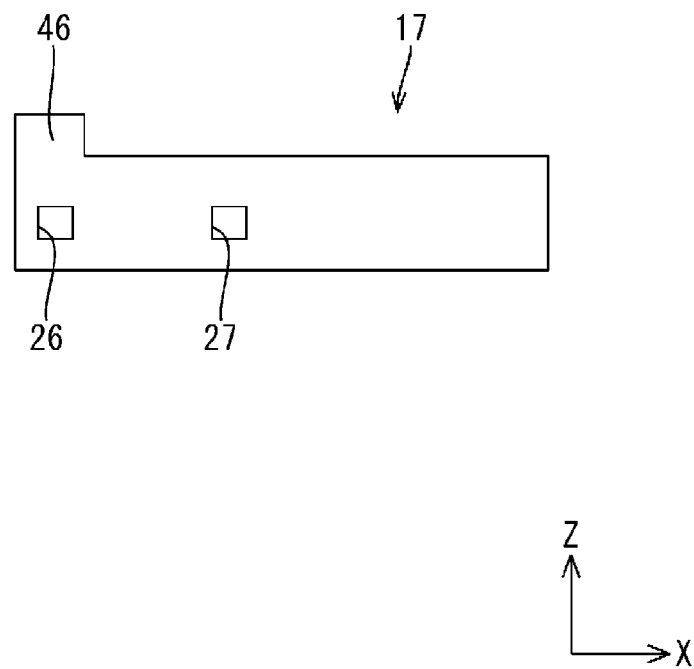
FIG. 8 is a front view showing the pressing portion.

As shown in FIGS. 8 and 9, the pressing portion 17 is in the form of a rectangular tube extending in the front-rear direction. The pressing portion 17 is formed by a known method such as cutting, casting or press-working according to need. An arbitrary metal such as coper, copper alloy, aluminum, aluminum alloy or stainless steel can be appropriately selected as a metal constituting the pressing portion 17 according to need. In this embodiment, the pressing portion 17 is made of copper or copper alloy. A plating layer may be formed on the surface of the pressing portion 17. An arbitrary metal such as tin, nickel or silver can be appropriately selected as a metal constituting the plating layer according to need.

A cross-section of the inner shape of the pressing portion 17 is equal to or somewhat larger than a cross-section of the outer shape of a region of the wire connecting portion 19 where the tubular portion 20 and the upper and lower connecting pieces 18A, 18B are provided. In this way, the pressing portion 17 is externally fittable to the region of the wire connecting portion 19 where the tubular portion 20 and the upper and lower connecting pieces 18A, 18B are provided.

An upper contact portion 25A projecting downward is provided on the lower surface of an upper wall of the pressing portion 17. A lower contact portion 25B projecting upward is provided on the upper surface of a lower wall of the pressing portion 17.

Partial lock receiving portions 26 are open at positions near a front end part in the front-rear direction in side walls of the pressing portion 17. Further, full lock receiving portions 27 are open at positions behind the partial lock receiving portions 26 in the side walls of the pressing portion 17. The partial lock receiving portions 26 and the full lock receiving portions 27 are resiliently lockable to locking projections 28 provided on side walls of the tubular portion 20.

Figure 13:
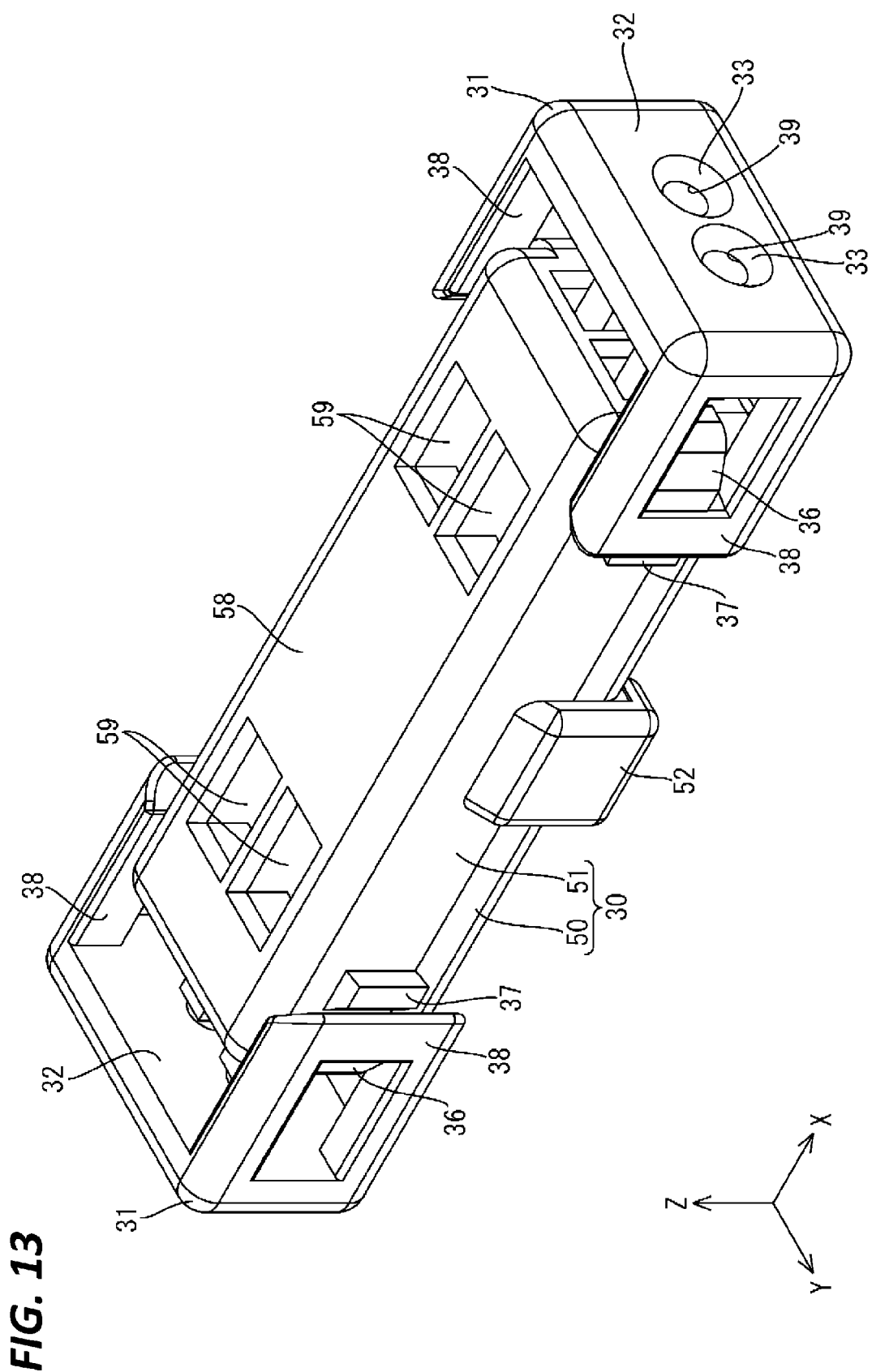
FIG. 13 is a section showing the state where the holders are partially locked to the housing.
Figure 14:
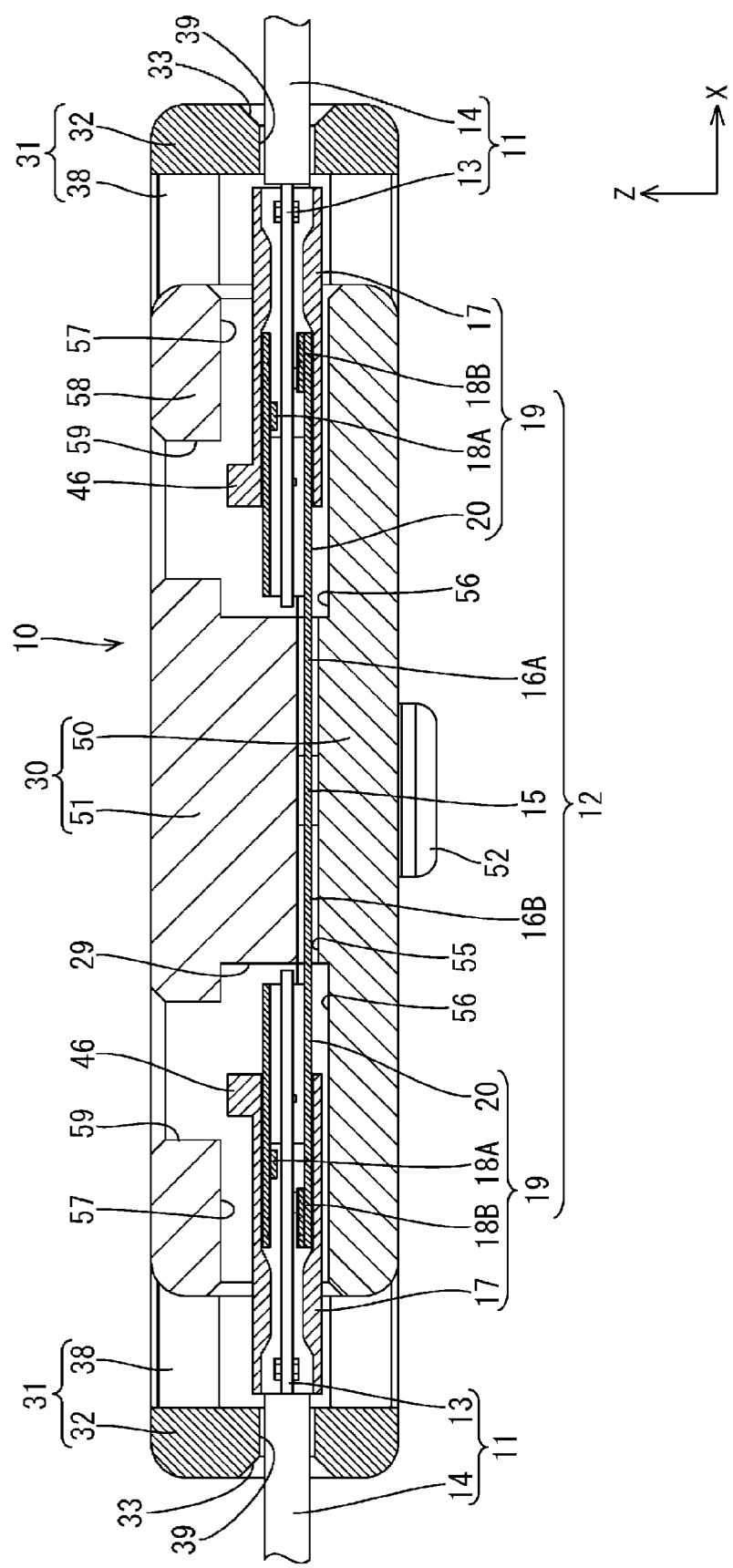
FIG. 14 is a section showing a state where wires are inserted in the housing.

As shown in FIGS. 13 and 14, the pressing portion 17 is held at a partial locking position with respect to the tubular portion 20 with the locking projections 28 of the tubular portion 20 and the partial lock receiving portions 26 of the pressing portion 17 locked. In this state, the upper and lower contact portions 25A, 25B of the pressing portion 17 are disposed at positions shifted in the lateral direction from projecting end edges of the upper and lower connecting pieces 18A, 18B, and separated from the upper and lower connecting pieces 18A, 18B. In this state, the upper and lower contact portions 25A, 25B of the pressing portion 17 do not respectively press the upper and lower connecting pieces 18A, 18B against the core 13 of the wire 11. A state where the pressing portion 17 is held at the partial locking position in this way is referred to as a releasing position where the pressing portion 17 does not press the upper and lower connecting pieces 18A, 18B against the wire 11. Further, in this state, an interval between the upper and lower connecting pieces 18A, 18B is set larger than a diameter of the core 13.

Figure 15:
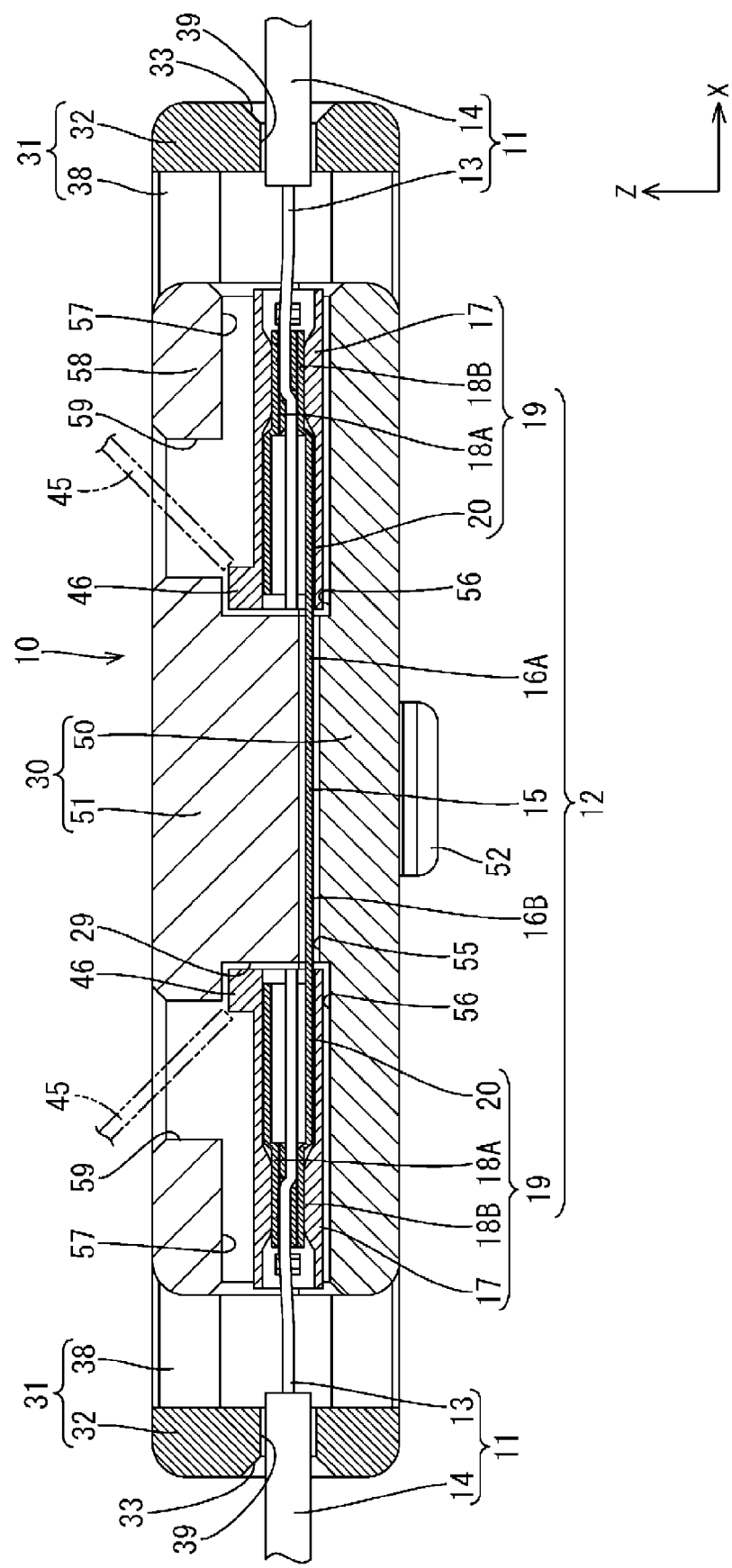
FIG. 15 is a section showing a state where the pressing portions are fully locked.

As shown in FIG. 15, the pressing portion 17 is held at a full locking position with respect to the tubular portion 20 with the locking projections 28 of the tubular portion 20 and the full lock receiving portions 27 of the pressing portion 17 locked. In this state, the upper contact portions 25A of the pressing portion 17 is in contact with the upper connecting piece 18A from a side (upper side) opposite to the upper contact surface 21A of the upper connecting piece 18A. Further, the lower contact surface 25B of the pressing portion 17 is in contact with the lower connecting piece 18B from a side (lower side) opposite to the lower contact surface 21B of the lower connecting piece 18B. With the upper contact portion 25A held in contact with the upper connecting piece 18A and the lower contact portion 25B held in contact with the lower connecting piece 18B at the position where the pressing portion 17 is fully locked to the tubular portion 20 in this way, the upper and lower contact portions 25A, 25B respectively press the upper and lower connecting pieces 18A, 18B against the core 13 of the wire 11. A state where the pressing portion 17 is held at the full locking position in this way is referred to as a pressing position where the pressing portion 17 presses the upper and lower connecting pieces 18A, 18B against the wire 11.

As described above, the pressing portion 17 is slidable along the lateral direction between the partial locking position and the full locking position described above while being externally fit to the region where the tubular portion 20 and the upper and lower connecting pieces 18A, 18B are provided. In this embodiment, the locking projection 28 provided on the tubular portion 20 doubles as a fully locking portion and a partially locking portion.

As described above, with the pressing portion 17 held at the full locking position with respect to the tubular portion 20, the upper contact portion 25A is in contact with the upper surface of the upper connecting piece 18A from above and the lower contact portion 25B is in contact with the lower surface of the lower connecting piece 18B from below.

With the pressing portion 17 held at the full locking position with respect to the tubular portion 20, the upper contact portion 25A presses the upper connecting piece 18A from above, whereby the upper connecting piece 18A is resiliently deformed downward. Further, the lower contact portion 25B presses the lower connecting piece 18B from below, whereby the lower connecting piece 18B is resiliently deformed upward. In this way, the core 13 is disposed in a state extended in the lateral direction (extending direction) in a space between the upper and lower connecting pieces 18A, 18B and, with the pressing portion 17 held at the full locking position with respect to the tubular portion 20, the core 13 is sandwiched in the vertical direction by the resiliently deformed upper and lower connecting pieces 18A, 18B. Specifically, the upper connecting piece 18A contacts the core 13 from above by being pressed downward by the upper contact portion 25A and the lower connecting piece 18B contacts the core 13 from below by being pressed upward by the lower contact portion 25B.

With the pressing portion 17 held at the full locking position with respect to the tubular portion 20, the upper holding protrusion 23A of the upper connecting piece 18A presses the core 13 from above and the lower holding protrusion 23B of the lower connecting piece 18B presses the core 13 from below. In this way, the core 13 is pressed from above by the upper holding protrusion 23A and pressed from below by the lower holding protrusion 23B disposed at the position shifted in the front-rear direction from the upper holding protrusion 23A, thereby being held in a state bent in the vertical direction. Further, the core 13 and the joint terminal 12 is electrically connected also by the upper and lower holding protrusions 23A, 23B.

A jig contact portion 46 projecting upward from the upper wall is provided at a position of the pressing portion 17 near one end part in the lateral direction. A jig 45 comes into contact with the jig contact portion 46, and the pressing portion 17 is pushed forward by this jig 45, thereby being moved forward (see FIG. 15). The jig 45 is in the form of an elongated plate or rod. The jig 45 is made of a known material such as metal or synthetic resin. Note that the above jig 45 is relatively small in size as compared to a mold and a facility for operating this mold. Thus, a cost increase due to the jig 45 is suppressed.

A pair of guiding portions 47 projecting inwardly of the pressing portion 17 are provided on both left and right side walls at positions of the pressing portion 17 near the other end part in the lateral direction. The core 13 slides in contact with the inner surfaces of the guiding portions 47, whereby the core 13 is guided into the pressing portion 17.

(Housing 30)

As shown in FIG. 3, the housing 30 of the joint connector 10 includes a cavity 29 for accommodating the joint terminal 12. Holders 31 are respectively mounted on left and right end parts of the housing 30.

Figure 1:
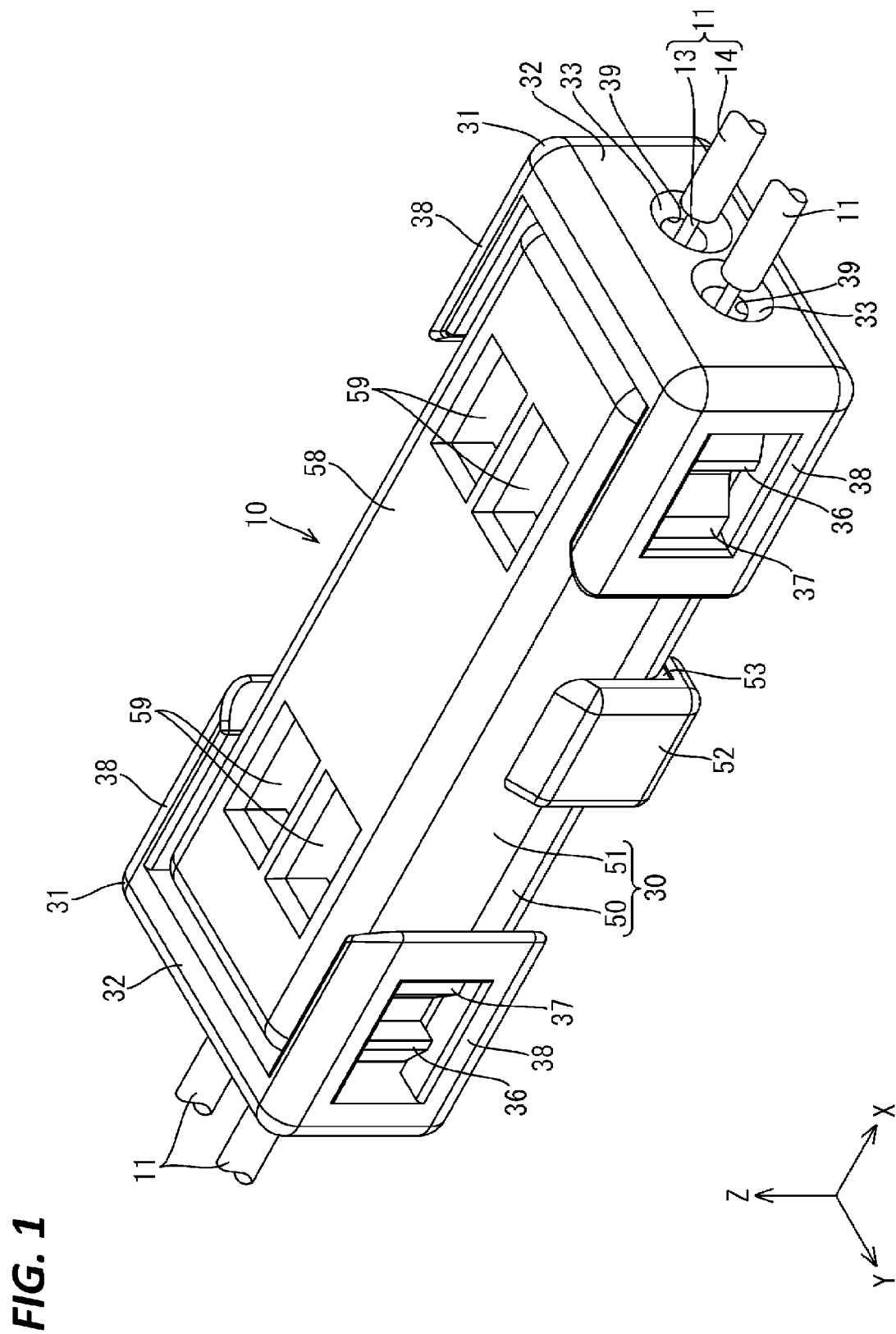
FIG. 1 is a perspective view showing a joint connector according to a first embodiment.

As shown in FIG. 1, the housing 30 has a substantially rectangular parallelepiped shape flat in the vertical direction and extending in the lateral direction. The housing 30 is formed by injection-molding insulating synthetic resin.

Figure 2:
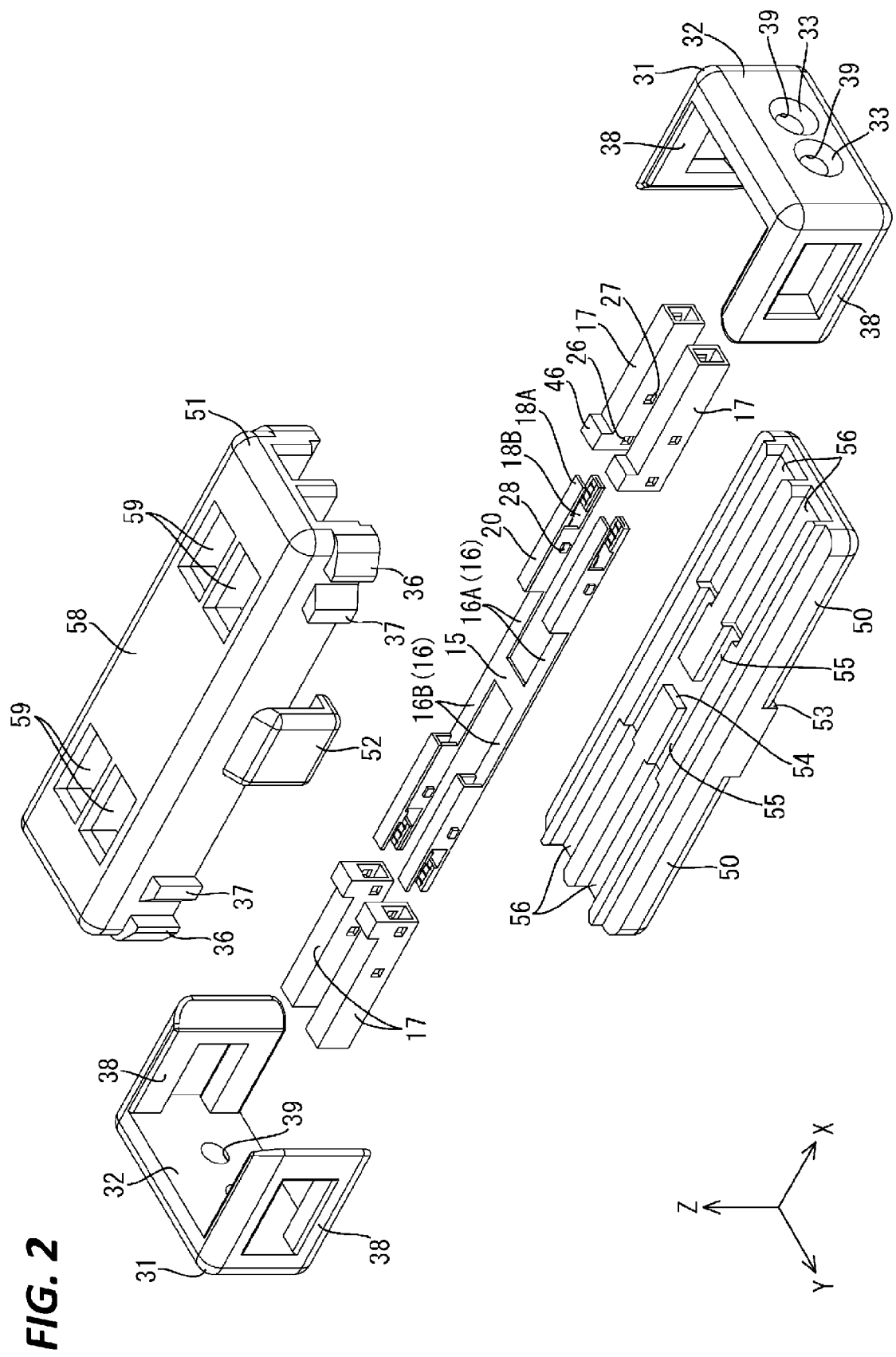
FIG. 2 is an exploded perspective view showing the joint connector.

As shown in FIG. 2, the housing 30 includes a lower case 50 and an upper case 51 to be assembled with the lower case 50 from above. The lower case 50 has a bottom wall and side walls extending upward from both front and rear side edges of the bottom wall. Lock receiving portions 53 to be resiliently locked by lock portions 52 to be described later are formed to extend downward at laterally center positions of the side walls of the lower case 50.

(Lower Case 50)

Figure 10:
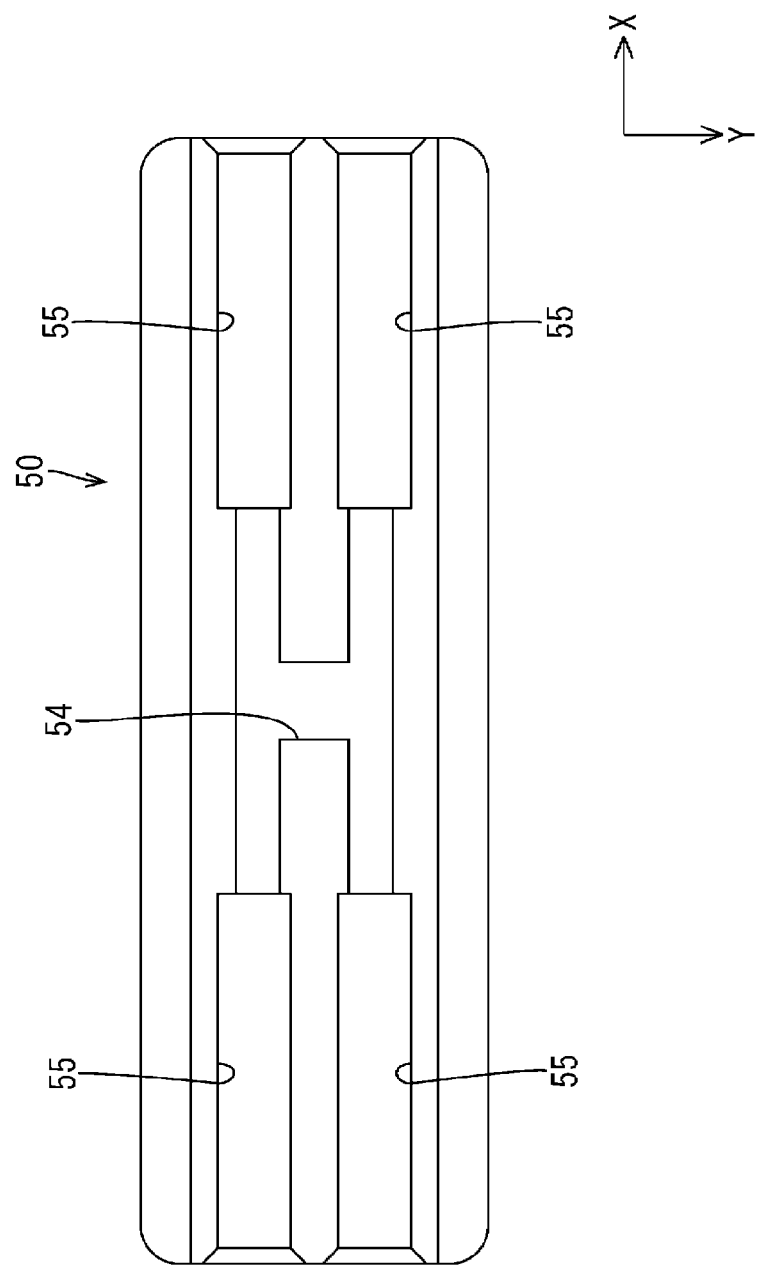
FIG. 10 is a plan view showing a lower case.

As shown in FIGS. 2 and 10, the bottom wall of the lower case 50 is recessed downward to form a coupling portion accommodating portion 54, branch portion accommodating portions 55 and wire connecting portion accommodating portions 56. The coupling portion accommodating portion 54, the branch portion accommodating portions 55 and the wire connecting portion accommodating portions 56 are formed into a shape in conformity with the joint terminal 12 when viewed from above.

The coupling portion accommodating portion 54 extending in the front-rear direction is provided at a laterally center position of the bottom wall of the lower case 50. The coupling portion 15 is accommodated into this coupling portion accommodating portion 54 from above. The branch portion accommodating portions 55 respectively extend in the lateral direction from front and rear end parts of the coupling portion accommodating portion 54. The respective branch portions 16 are respectively accommodated into these branch portion accommodating portions 55. The wire connecting portion accommodating portion 56 into which the wire connecting portion 19 is accommodated is provided to extend in the lateral direction on an end part in the lateral direction of each branch portion accommodating portion 55. A part of the wire connecting portion accommodating portion 56 opposite to the branch portion accommodating portion 55 is open in the lateral direction.

(Upper Case 51)

As shown in FIG. 2, the upper case 51 has an upper wall 58 and side walls respectively extending downward from both front and rear side edges of the upper wall 58. The lock portions 52 extending downward and having lower end parts bent inward in the front-rear direction are formed at positions near laterally center positions and corresponding to the lock receiving portions 53 of the lower case 50 on the side walls of the upper case 51. The lock portions 52 are in the form of plates resiliently deformable in the front-rear direction. These lock portions 52 resiliently engage the lock receiving portions 53, whereby the lower case 50 and the upper case 51 are integrally assembled.

As shown in FIG. 3, the upper wall 58 of the upper case 51 is recessed upward to form a plurality of (four in this embodiment) wire connecting portion accommodating portions 57 into which the respective wire connecting portions 19 are accommodated. The upper wall 58 of the upper case 51 is formed with work holes 59 penetrating through the upper wall 58 at positions corresponding to the respective wire connecting portion accommodating portions 57. The work holes 59 have a rectangular shape elongated in the lateral direction when viewed from above (see FIG. 11). An opening area of the work hole 59 is set larger than a cross-sectional area of the jig 45 to be described later. In this way, the jig 45 can be inserted into the cavity 29 through the work hole 59 and brought into contact with the jig contact portion of the pressing portion as described later.

With the lower case 50 and the upper case 51 assembled, the cavity 29 into which the joint terminal 12 is accommodated is formed between an inner wall of the lower case 50 and an inner wall of the upper case 51. The cavity 29 includes the coupling portion accommodating portion 54, the branch portion accommodating portions 55 and the wire connecting portion accommodating portions 56, 57. As shown in FIG. 3, the cavity 29 formed in the housing 30 is open leftward and rightward respectively at left and right end parts of the housing 30.

As shown in FIG. 3, with the lower case 50 and the upper case 51 assembled, regions of the upper wall 58 of the upper case 51 corresponding to the branch portion accommodating portions 55 and the coupling portion accommodating portion 54 of the lower case 50 are formed such that intervals in the vertical direction between these regions and the branch portion accommodating portions 55 and the coupling portion accommodating portion 54 are somewhat larger than thicknesses of the branch portions 16 and the coupling portion 15 of the joint terminal 12. In this way, the coupling portion 15 and the branch portions 16 respectively accommodated in the branch portion accommodating portions 55 and the coupling portion accommodating portion 54 of the lower case 50 are held in the housing 30 by being sandwiched by the lower case 50 and the upper case 51.

Figure 11:
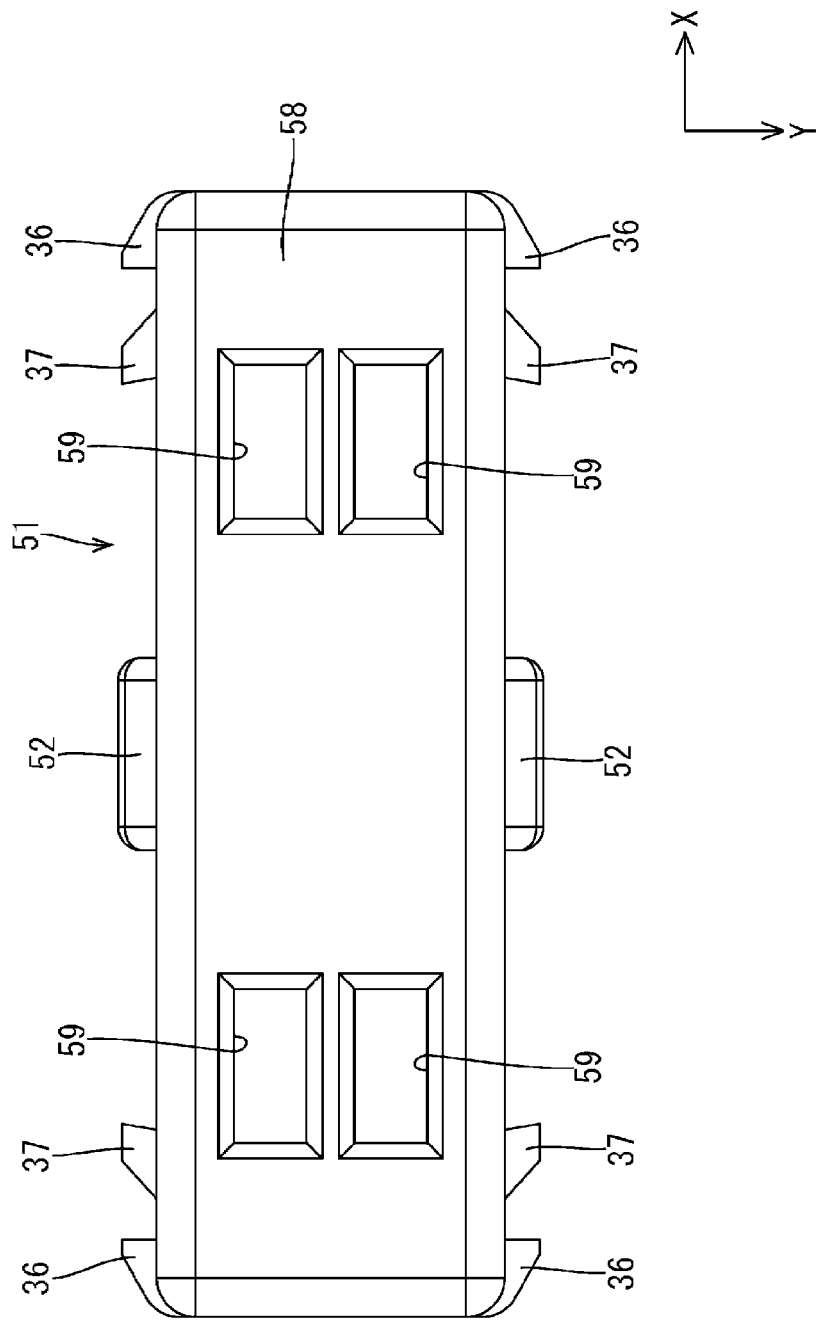
FIG. 11 is a plan view showing an upper case.

As shown in FIG. 11, partial locking portions 36 projecting outward along the front-rear direction are provided at positions near left and right end parts on front and rear walls of the upper case 51. Further, full locking portions 37 are provided to project outward along the front-rear direction at positions inwardly of the partial locking portions 36 in the lateral direction.

(Holders 31)

As shown in FIG. 2, the holder 31 mounted on the left end part of the housing 30 includes a holding wall 32 (an example of an engaging portion) and gate-shaped lock receiving portions 38 respectively extending rightward from front and rear end edges of the holding wall 32. The holder 31 is formed by injection-molding insulating synthetic resin.

Figure 12:
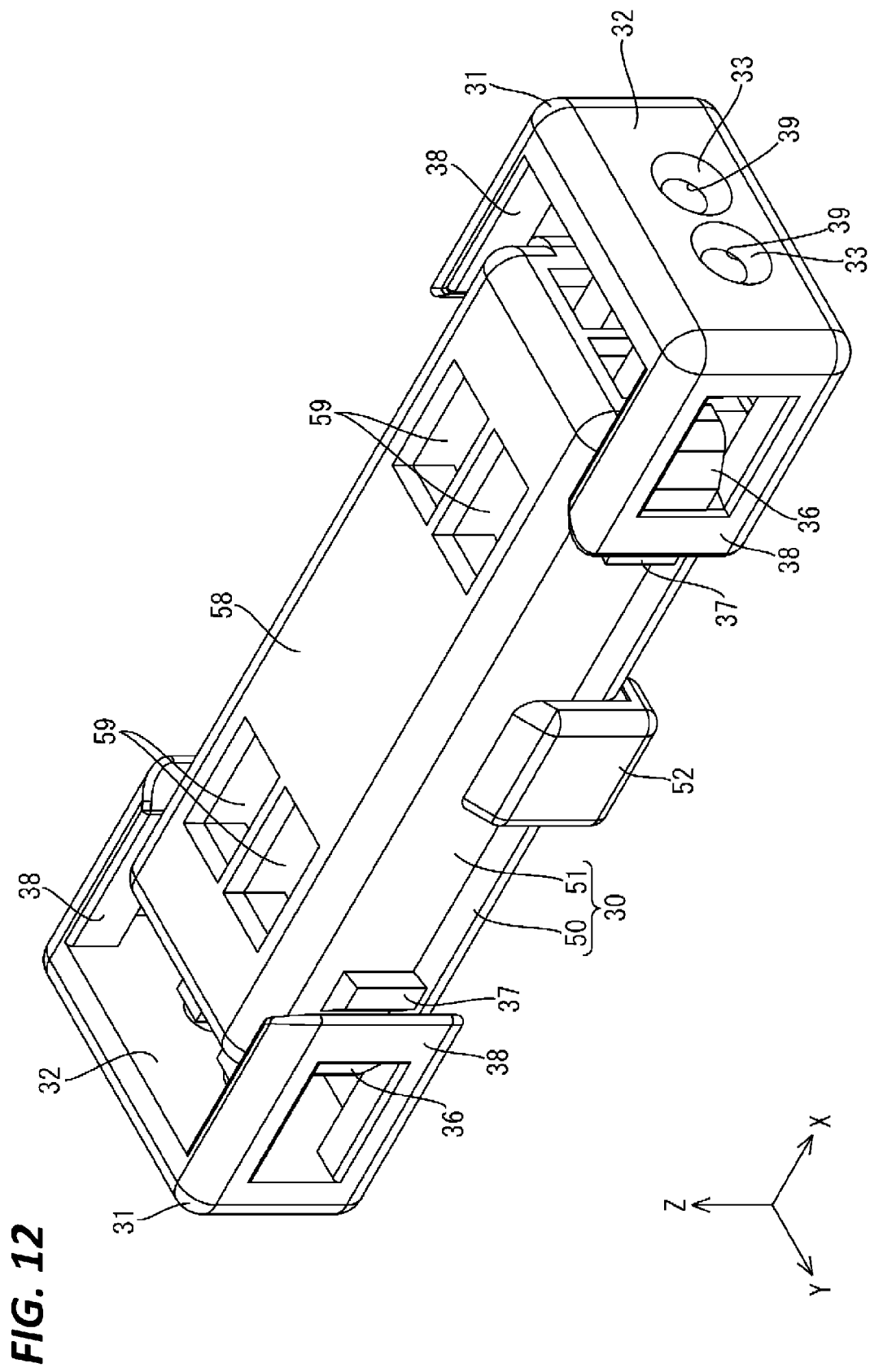
FIG. 12 is a perspective view showing a state where holders are partially locked to a housing.

As shown in FIGS. 1 and 12, the lock receiving portion 38 is resiliently locked to each of the partial locking portion 36 and the full locking portion 37 provided on the housing 30. The holder 31 is held at a partial locking position with respect to the housing 30 by locking the partial locking portions 36 of the housing 30 and the lock receiving portions 38 of the holder 31 (see FIG. 12). Further, the holder 31 is held at the full locking position with respect to the housing 30 by locking the full locking portions 37 of the housing 30 and the lock receiving portions 38 of the holder 31 (see FIG. 1).

The holding wall 32 is formed to have substantially the same shape as the left side wall of the housing 30 with the lower case 50 and the upper case 51 assembled. With the holder 31 assembled with the housing 30, the holding wall 32 of the holder 31 covers the left side wall of the housing 30 from the left.

The holding wall 32 is formed with a plurality of (two in this embodiment) insertion holes 39 arranged side by side in the front-rear direction and penetrating through the holding wall 32 in the lateral direction. The insertion holes 39 are formed at positions corresponding to parts of the cavity 29 open in the left side wall of the housing 30. In this way, the insertion holes 39 communicate with the cavity 29 of the housing 30. An inner diameter of the insertion hole 39 is set equal to or somewhat larger than an external dimension of the insulation coating 14 of the wire 11. In this way, the wire 11 is inserted into the insertion hole 39.

Tapered surfaces 33 tapered toward the right are formed on hole edge parts of the insertion holes 39 in the left side surface of the holding wall 32. The wire 11 is guided into the insertion hole 39 by sliding in contact with the tapered surface 33.

With the holder 31 held at the partial locking position with respect to the housing 30, the holding wall 32 of the holder 31 is located to the left of the left side surface of the housing 30. With the holder 31 held at the full locking position with respect to the housing 30, the right side surface of the holding wall 32 of the holder 32 is disposed at a position in contact with or somewhat separated leftward from the left side surface of the housing 30.

Since the holder 31 mounted on the right end part of the housing 30 has the same shape as the holder 31 mounted on the left end part of the housing 30, the same members are denoted by the same reference signs and repeated description is omitted.

(Manufacturing Process of Joint Connector 10)

Next, a manufacturing process of the joint connector 10 according to this embodiment is described. Note that the manufacturing process of the joint connector 10 is not limited to the one described below.

The metal plate material is cut into the developed shape shown in FIG. 7. Parts 40 where the tubular portions 20 and the upper and lower connecting pieces 18A, 18B are formed are formed side by side in the front-rear direction and symmetrically formed in the front-rear direction. In this way, an interval between the branch portions 16 arranged in the front-rear direction can be made smaller as compared to the case where the parts 40 where the tubular portions 20 and the upper and lower connecting pieces 18A, 18B are formed are not symmetrically formed in the front-rear direction.

Next, the metal plate material formed into the developed shape is press-worked, thereby forming parts of the joint terminal 12 different from the pressing portions 17 as shown in FIGS. 4 to 6. Subsequently, the pressing portions 17 are formed into a predetermined shape (see FIGS. 8 and 9).

The pressing portions 17 are mounted from the left on the tubular portions 20 provided on the tips of the branch portions 16 extending leftward from the coupling portion 15. Further, the pressing portions 17 are mounted from the right on the tubular portions 20 provided on the tips of the branch portions 16 extending rightward from the coupling portion 15.

End edges of the pressing portions 17 come into contact with the locking projections 28 of the tubular portions 20, whereby the side walls of the pressing portions 17 are expanded and deformed. If the pressing portions 17 are further pushed toward the tubular portions 20, the side walls of the pressing portions 17 are restored and the partial lock receiving portions 26 of the pressing portions 17 are locked to the locking projections 28 of the tubular portions 20. In this way, the pressing portions 17 are held at the partial locking position with respect to the tubular portions 20. In this way, the joint terminal 12 is obtained.

By injection-molding synthetic resin, the lower case 50, the upper case 51 and the holders 31 are formed. The joint terminal 12 is accommodated into a lower accommodation recess of the lower case 50 from above. In particular, the coupling portion 15 of the joint terminal 12 is accommodated into the coupling portion accommodating portion 54 of the lower case 50, the branch portions 16 of the joint terminal 12 are accommodated into the branch portion accommodating portions 55 of the lower case 50, and the wire connecting portions 19 of the joint terminal 12 are accommodated into the wire connecting portion accommodating portions 56 of the lower case 50.

Subsequently, the upper case 51 is brought closer to the lower case 50 from above the lower case 50. Then, lower end parts of the lock portions 52 of the upper case 51 come into contact with the lock receiving portions 53 of the lower case 50 from above. If the upper case 51 is moved further downward, the lock portions 52 ride on the lock receiving portions 53, whereby the lock portions 52 are expanded and deformed outward in the front-rear direction. If the upper case 51 is moved further downward, the lock portions 52 are restored. In this way, the lock portions 52 come into contact with the lock receiving portions 53 from below, whereby the upper case 51 and the lower case 50 are integrally assembled.

Subsequently, the holder 31 is mounted from the left on the left end part of the housing 30, and the holder 31 is mounted from the right on the right end part of the housing 30. Tip parts of the lock receiving portions 38 of the holders 31 come into contact with the partial locking portions 36 of the housing 30 and the lock receiving portions 38 are expanded and deformed. If the holders 31 are further pushed toward the housing 30, the tip parts of the lock receiving portions 38 are restored and the lock receiving portions 38 of the holders 31 are resiliently locked to the partial locking portions 36 of the housing 30. In this way, the holders 31 are held at the partial locking position with respect to the housing 30. In this state, the holding walls 32 of the holders 31 are disposed at positions separated rearward from the rear end edges of the pressing portions 17 (see FIG. 13).

The insulation coating 14 is stripped in an end part of the wire 11, thereby exposing the core 13 of a predetermined length. The core 13 of the wire 11 is inserted into the insertion hole 39 provided in the holding wall 32 of the holder 31. At this time, the tip of the core 13 slides in contact with the tapered surface 33 formed on the hole edge part of the insertion hole 39 provided in the holding wall 32, whereby the core 13 is guided into the insertion hole 39.

If the wire 11 is further pushed into the housing 30, the tip part of the core 13 projects toward the joint terminal 12 from the insertion hole 39 of the holder 31 and inserted into the pressing portion 17. At this time, the tip of the core 13 slides in contact with the guiding portions 47 of the pressing portion 17, thereby being guided into the pressing portion 17. If the wire 11 is pushed further into the housing 30, the tip part of the core 13 enters the tubular portion 20 and reaches the space between the upper and lower connecting pieces 18A, 18B.

If the wire 11 is pushed further into the housing 30, the core 13 enters the tubular portion 20. In this state, the insulation coating 14 of the wire 11 is located in the insertion hole 39 of the holder 31 (see FIG. 14).

With the pressing portions 17 held at the partial locking position with respect to the tubular portions 20 and the holders 31 held at the partial locking position with respect to the housing 30, the core 13 does not receive large friction forces from the upper and lower connecting pieces 18A, 18B when being inserted into the joint connector 10 since the interval between the upper and lower connecting pieces 18A, 18B is set larger than the outer diameter of the core 13. Thus, an insertion force in inserting the wire 11 into the joint connector 10 can be reduced.

Next, as shown in FIG. 15, the jigs 45 are inserted into the work holes 59 of the housing 30 from above and brought into contact with the jig contact portions 46. Subsequently, the pressing portions 17 are relatively moved with respect to the tubular portions 20 by pressing the jig contact portions 46 by the jigs 45. In particular, the pressing portions 17 of the wire connecting portions 19 formed to the left of the coupling portion 15 are relatively moved rightward with respect to the tubular portions 20, and the pressing portions 17 of the wire connecting portions 19 formed to the right of the coupling portion 15 are relatively moved leftward with respect to the tubular portions 20. Then, locking between the locking projections 28 of the tubular portions 20 and the partial lock receiving portions 26 of the pressing portions 17 is released and the side walls of the pressing portions 17 ride on the locking projections 28 to be expanded and deformed.

If the pressing portions 17 are further moved, the side walls of the pressing portions 17 are restored and the locking projections 28 of the tubular portions 20 and the full lock receiving portions 27 of the pressing portions 17 are resiliently locked. In this way, the pressing portions 17 are held at the full locking position with respect to the tbsp 20 (see FIG. 15).

With the pressing portion 17 held at the full locking position with respect to the tubular portion 20, the upper contact portion 25A of the pressing portion 17 comes into contact with the upper connecting piece 18A of the tubular portion 20 from above to press the upper connecting piece 18A downward. Further, the lower contact portion 25B of the pressing portion 17 comes into contact with the lower connecting piece 18B of the tubular portion 20 from below to press the lower connecting piece 18B upward. In this way, the core 13 is sandwiched from upper and lower sides by the upper and lower connecting pieces 18A, 18B. As a result, the upper and lower connecting pieces 18A, 18B are held in contact with the core 13, whereby the wire 11 and the joint terminal 12 are electrically connected (see FIG. 16). At this time, the serrations 22A, 22B bite into the surface of the core 13, whereby the electrical connection reliability of the core 13 and the upper and lower connecting pieces 18A, 18B is improved.

With the core 13 vertically sandwiched by the upper and lower connecting pieces 18A, 18B, the core 13 is sandwiched by the upper holding protrusion 23A of the upper connecting piece 18A and the lower holding protrusion 23B of the lower connecting piece 18B, thereby being held in the state bent in the vertical direction while extending in the front-rear direction. Since the core 13 can be firmly held in this way, a holding force of the wire 11 and the joint terminal 12 can be enhanced when a pulling force acts on the wire 11.

Subsequently, the holders 31 are moved from the partial locking position to the full locking position. In particular, the holder 31 mounted on the left end part of the housing 30 is moved rightward, and the holder 31 mounted on the right end part of the housing 30 is moved leftward. Then, the lock receiving portions 38 of the holders 31 ride on the full locking portions 37 of the housing 30 to be expanded and deformed. If the holders 31 are further pressed, the lock receiving portions 38 of the holders 31 ride over the full locking portions 37 to be restored, and the full locking portions 37 of the housing 30 and the lock receiving portions 38 of the holders 31 are locked. In this way, the holders 31 are held at the full locking position with respect to the housing 30 (see FIGS. 1 and 3). As a result, the holding walls 32 of the holders 31 come into contact with the pressing portions 17, whereby the pressing portions 17 are retained and held inside the housing 30.

Figure 17:
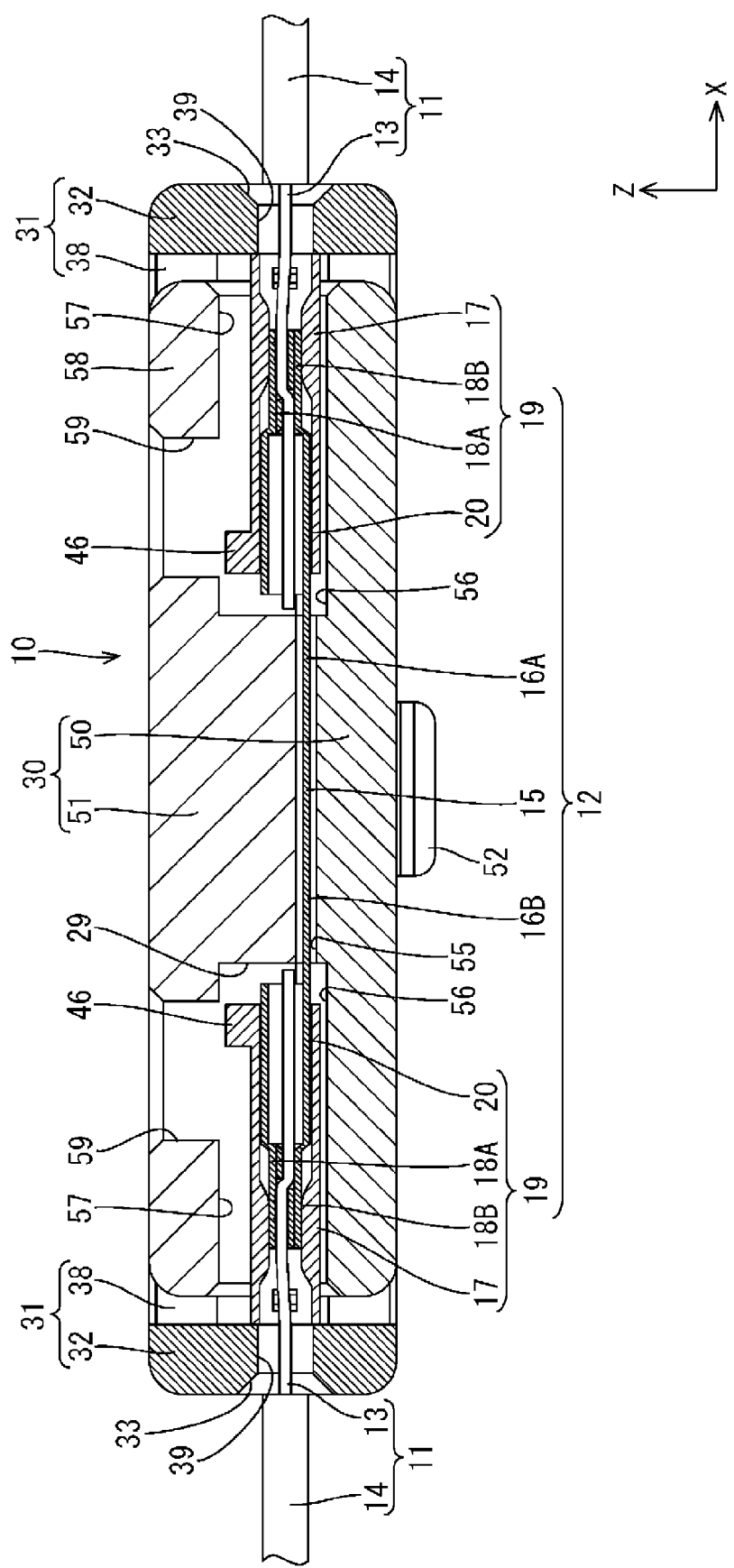
FIG. 17 is a section showing a state where the holders are in contact with the pressing portions when the pressing portions are not moved to a full locking position.

Further, as shown in FIG. 17, the pressing portion 17 may be stopped between the partial locking position and the full locking position in the process of moving the pressing portion 17 to the full locking position. In this state, a state of electrical connection of the core 13 and the upper and lower connecting pieces 18A, 18B is not sufficient. This is because contact pressures of the upper and lower connecting pieces 18A, 18B with the core 13 are not sufficient. If an attempt is made to move the holder 31 from the partial locking position to the full locking position in this state, the inner surface of the holding wall 32 of the holder 31 comes into contact with the pressing portion 17, whereby the holder 31 cannot be moved to the full locking position. In this way, whether or not the pressing portions 17 have been moved to the full locking position can be determined.

Functions and Effects of Embodiment

Next, functions and effects of this embodiment are described. The joint connector 10 according to this embodiment is provided with the joint terminal 12 and the housing 30 configured to accommodate the joint terminal 12, the joint terminal 12 includes the plurality of branch portions 16, the plurality of wire connecting portions 19 respectively continuous with the plurality of branch portions 16 and to be connected to the wires 11 and the coupling portion 15 electrically connecting the plurality of branch portions 16 by coupling the plurality of branch portions 16. The wire connecting portion 19 includes the upper and lower connecting pieces 18A, 18B having the upper and lower contact surfaces 21A, 21B configured to contact the wire 11, and the pressing portion 17 configured to press the upper connecting piece 18A against the wire 11 by coming into contact with the upper connecting piece 18A and press the lower connecting piece 18B against the wire 11 by coming into contact with the lower connecting piece 18B.

According to the above configuration, the wires 11 and the joint terminal 12 can be electrically connected by pressing the upper and lower connecting pieces 18A, 18B against the wires 11 by the pressing portions 17 after the wires 11 are disposed on the upper and lower contact surfaces 21A, 21B of the wire connecting portions 19. In this way, an assembly process of the joint connector 10 can be made more efficient as compared to the case where a step of connecting female terminals, which are members separate from the joint terminal 12, and the wires 11 is separately performed.

In the case of forming the joint terminal 12 including the tubular portions 20 and the upper and lower connecting pieces 18A, 18B on the tips of the plurality of branch portions 16 extending from the side edges of the coupling portion 15 by cutting and press-working the metal plate material as in this embodiment, structures for forming the tubular portions 20 and the upper and lower connecting pieces 18A, 18B are provided on the tips of the branch portions 16. Thus, in the state of development, the interval between the branch portions 16 adjacent in the front-rear direction may become wider due to restricted structures relating to the parts 40 for forming the tubular portions 20 and the upper and lower connecting pieces 18A, 18B.

Accordingly, in this embodiment, the parts 40 adjacent in the front-rear direction for forming the tubular portions 20 and the upper and lower connecting pieces 18A, 18B are symmetrically shaped in the front-rear direction in the developed shape. In this way, the interval between the branch portions 16 arranged in the front-rear direction can be made narrower.

Further, according to this embodiment, the pressing portion 17 moves along the lateral direction between the pressing position where the pressing portion 17 presses the upper and lower connecting pieces 18A, 18B against the core 13 of the wire 11 and the releasing position where the pressing portion 17 does not press the upper and lower connecting pieces 18A, 18B against the core 13 of the wire 11.

According to the above configuration, the wire 11 and the joint terminal 12 can be electrically connected by a simple operation of moving the pressing portion 17 from the releasing position to the pressing position.

Further, according to this embodiment, the pressing portion 17 is provided with the jig contact portion 46 projecting in the vertical direction, and moved from the releasing position to the pressing position by being pressed by the jig 45 with the jig contact portion 46 held in contact with the jig 45.

According to the above configuration, the wire 11 and the joint terminal 12 can be electrically connected by bringing the jig 45 into contact with the jig contact portion 46 and moving the pressing portion 17 from the releasing position to the pressing position.

Further, according to this embodiment, the jig contact portion 46 is provided on one vertical side of the pressing portion 17.

According to the above configuration, an operation of moving the pressing portion 17 in the lateral direction only has to be performed from one side in the vertical direction, wherefore the efficiency of an assembly operation of the joint connector 10 can be improved.

Further, according to this embodiment, the holders 31 are mounted on the housing 30, and include the holding walls 32 configured to restrict movements of the pressing portions 17 at the pressing position to the releasing position by engaging the pressing portions 17 while being mounted on the housing 30.

According to the above configuration, the pressing portions 17 can be retained and held in the housing 30 by the engagement of the holding walls 32 of the holders 31 with the pressing portions 17.

Further, according to this embodiment, the plurality of wire connecting portions 19 are disposed on opposite ends in a longitudinal direction (lateral direction) of the branch portions 16.

According to the above configuration, the wires 11 routed toward the joint connector 10 from different directions along the lateral direction can be electrically connected.

Second Embodiment

Next, a second embodiment relating to the technique disclosed in this specification is described with reference to FIGS. 18 to 23.

(Joint Terminal 60)

Figure 18:
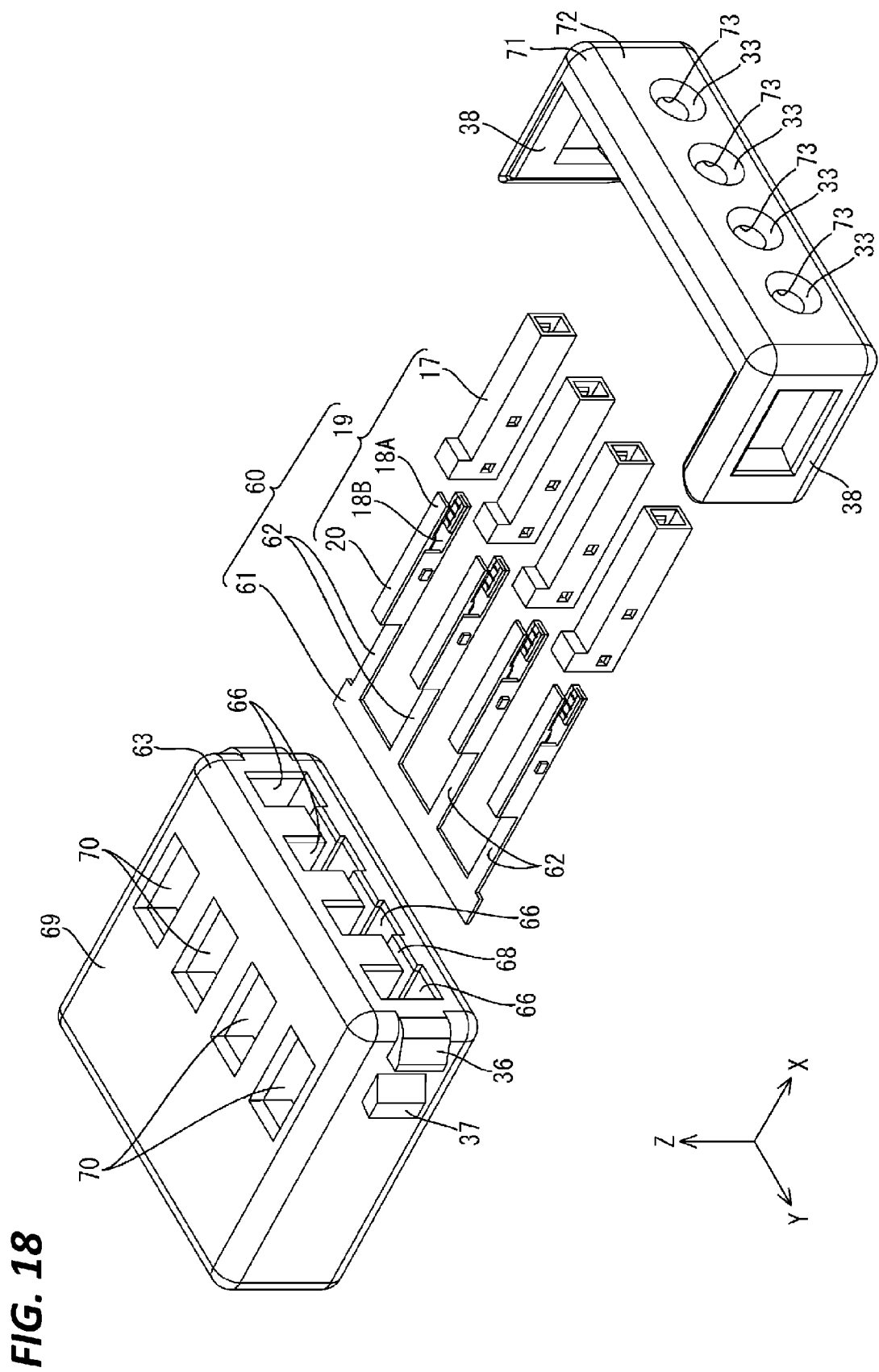
FIG. 18 is an exploded perspective view showing a joint connector according to a second embodiment.
Figure 19:
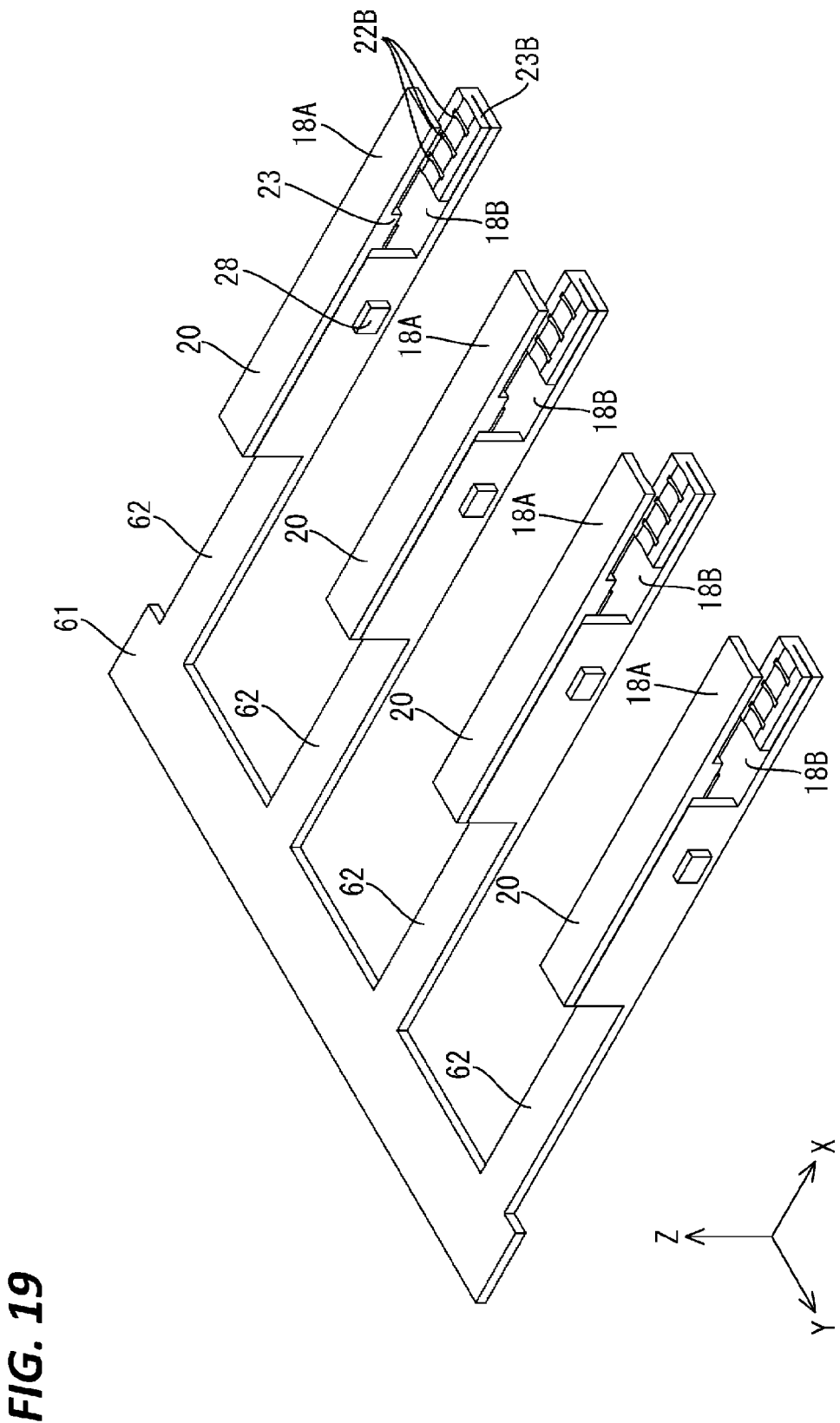
FIG. 19 is a perspective view showing a joint terminal before pressing portions are mounted.
Figure 20:
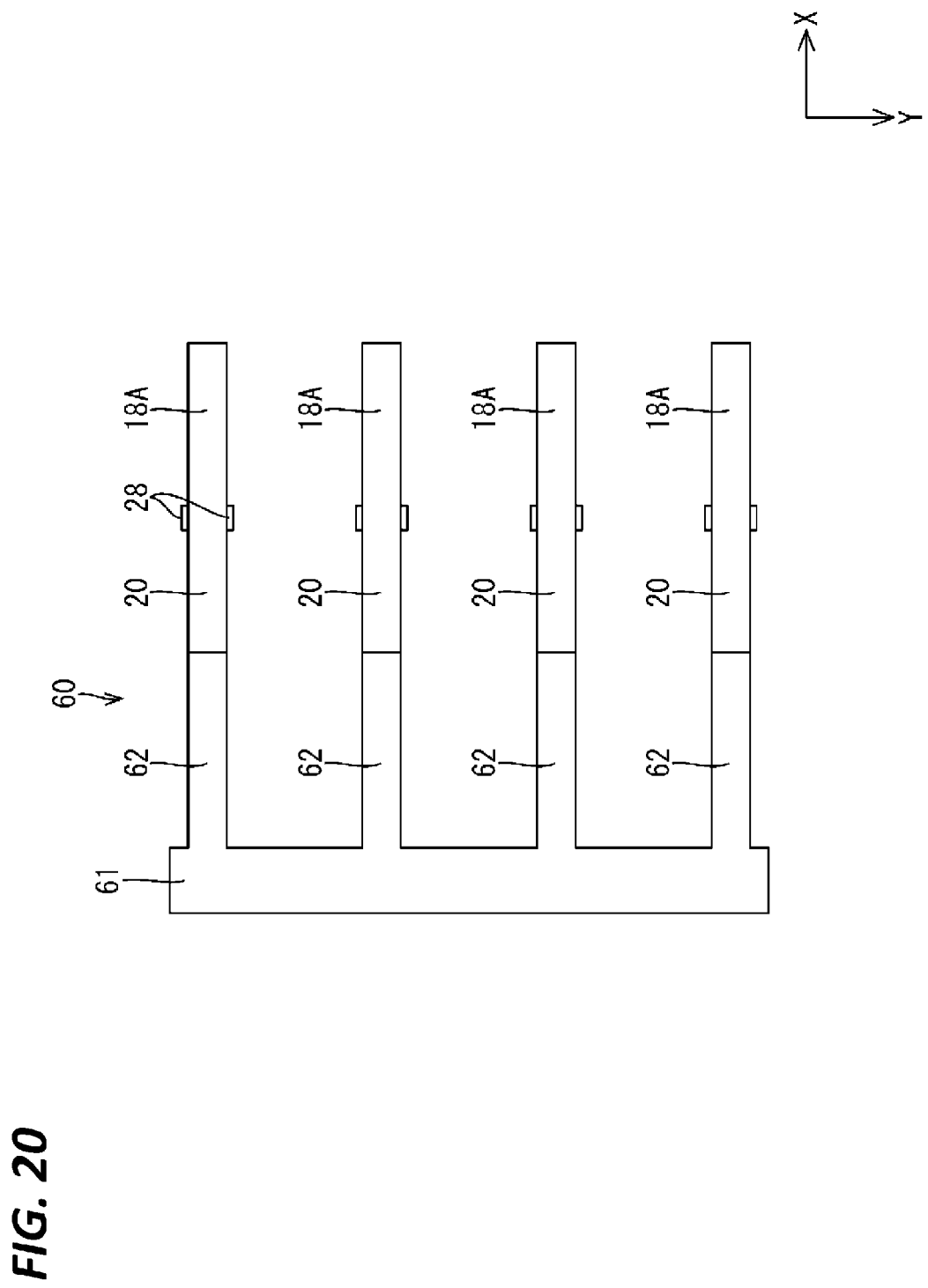
FIG. 20 is a plan view showing the joint terminal before the pressing portions are mounted.

As shown in FIGS. 18 to 20, a joint terminal 60 includes a coupling portion 61 elongated in a front-rear direction. The coupling portion 61 is in the form of a plate having a rectangular shape when viewed from above. A plurality of (four in this embodiment) branch portions 61 extending leftward are disposed side by side at intervals in the front-rear direction on a left side edge of the coupling portion 61. A wire connecting portion 19 is formed on the tip of each branch portion 62.

Since the configuration of the wire connecting portion 19 is the same as in the first embodiment, the same members are denoted by the same reference signs and repeated description is omitted.

Figure 21:
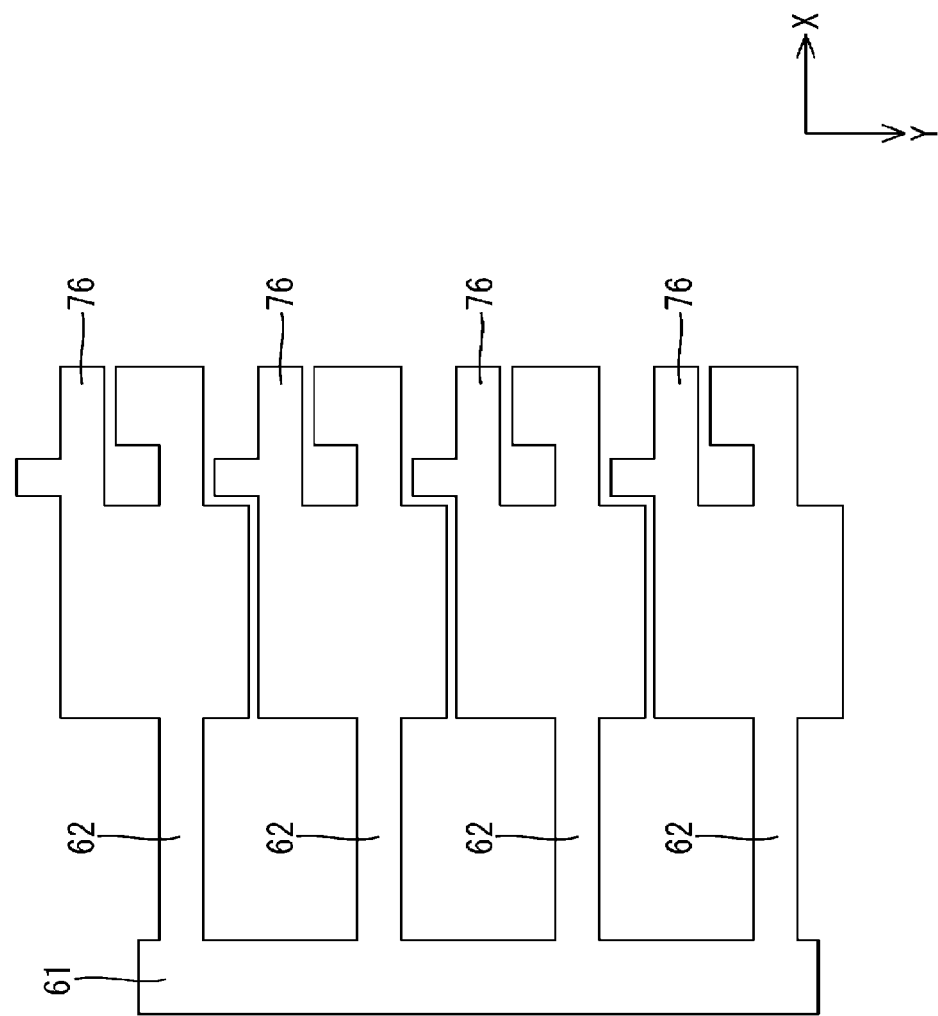
FIG. 21 is a plan view showing a developed shape of a metal plate material after cutting.

The joint terminal 60 is formed by press-working after a metal plate material is cut into a developed shape shown in FIG. 21. In this embodiment, out of the metal plate material cut into the developed shape, parts 76 where tubular portions 20 and upper and lower connecting pieces 18A, 18B are formed are formed to have the same shape when viewed from above. Further, out of the metal plate material cut into the developed shape, the parts 76 adjacent in the front-rear direction where the tubular portions 20 and the upper and lower connecting pieces 18A, 18B are formed are arranged without any clearance therebetween. In this way, a yield in manufacturing the joint terminal 60 from the metal plate material can be improved. Further, intervals in the front-rear direction between a plurality of the wire connecting portions 19 formed after press-working can be made narrower.

(Housing 63)

Figure 22:
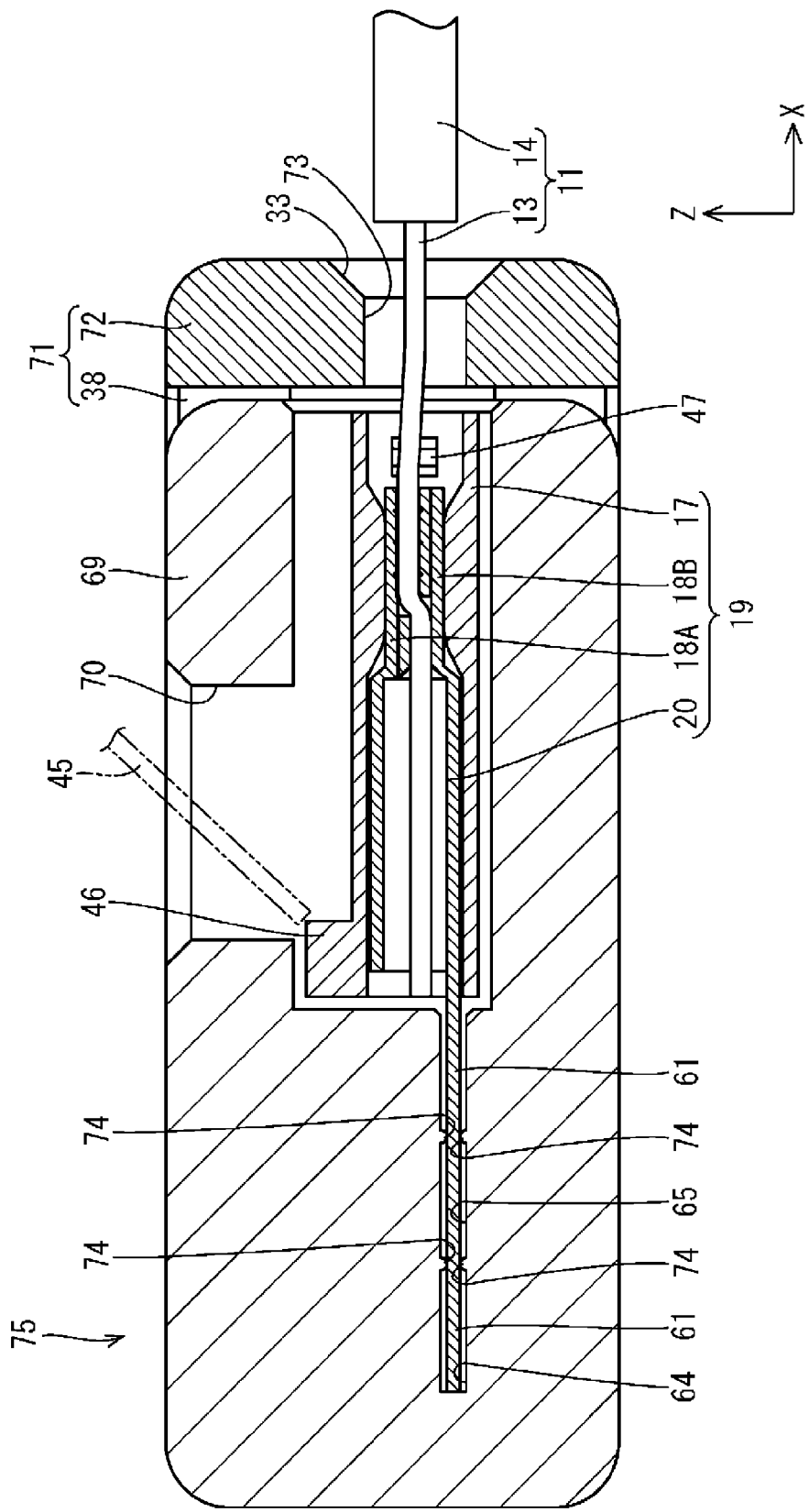
FIG. 22 is a section showing the joint connector.
Figure 23:
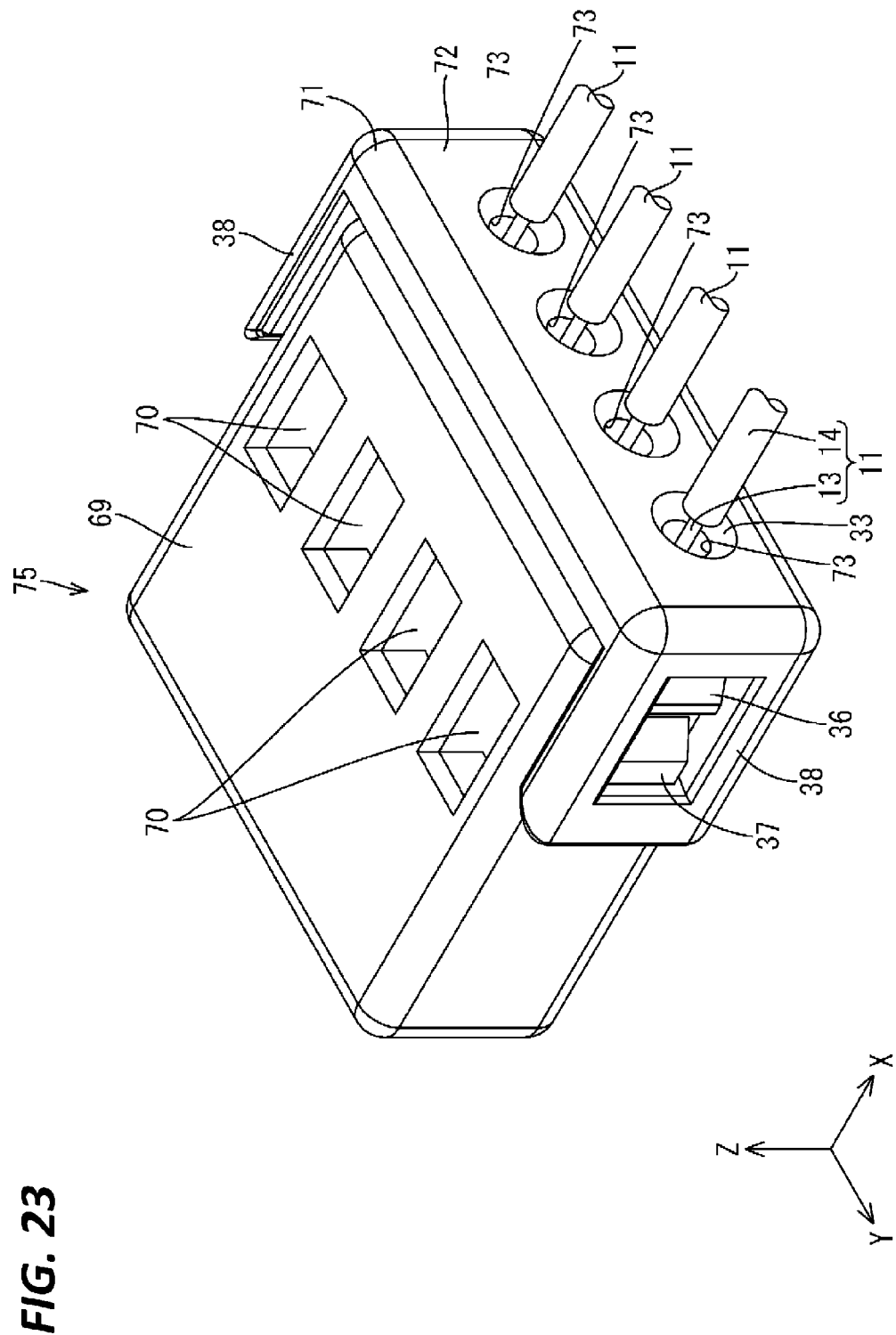
FIG. 23 is a perspective view showing a joint connector.

As shown in FIGS. 18 and 22, the housing 63 is formed by injection-molding insulating synthetic resin. The housing 63 has a substantially rectangular shape as a whole. The housing 63 includes a cavity 67 for accommodating the joint terminal 60. The cavity 67 includes a coupling portion accommodating portion 64 into which the coupling portion 61 of the joint terminal 60 is press-fit, branch portion accommodating portions 65 into which the branch portions 62 of the joint terminal 60 are accommodated, and wire connecting portion accommodating portions 66 into which the wire connecting portions 19 of the joint terminal 60 are accommodated.

Out of the cavity 67, left end parts of the wire connecting portion accommodating portions 66 are open leftward. Further, a slit 68 into which the coupling portion 61 of the joint terminal 60 is inserted is formed to extend in the front-rear direction in a left side wall of the housing 63. A length in the front-rear direction of the slit 68 is equal to or somewhat longer than that of the coupling portion 61 of the joint terminal 60. Further, a vertical height of the slit 68 is set equal to or somewhat larger than that of the coupling portion 61 of the joint terminal 60.

The coupling portion accommodating portion 64 is formed to extend in the front-rear direction. A vertical height of the coupling portion accommodating portion 64 is set equal to or somewhat larger than a vertical thickness of the coupling portion 61 of the joint terminal 60.

On the other hand, ribs 74 are formed to project inwardly of the branch portion accommodating portions 65 on upper and lower walls of the branch portion accommodating portions 65. In this way, the joint terminal 60 is retained and held in the housing 63 by press-fitting the branch portions 62 of the joint terminal 60 between the ribs 74 in the branch portion accommodating portions 65.

An upper wall 69 of the housing 63 is formed with work holes 70 penetrating through the upper wall 69 at positions corresponding to the wire connecting portion accommodating portions 66. The work holes 70 have a rectangular shape elongated in a lateral direction when viewed from above. The wire connecting portion accommodating portions 66 are allowed to communicate with the outside of the housing 63 by these work holes 70.

As shown in FIG. 18, partial locking portions 36 projecting outward in the front-rear direction are provided at positions near right end parts on side walls of the housing 63.

Further, full locking portions 37 are provided to project outward at positions to the right of the partial locking portions 36.

(Holder 71)

As shown in FIG. 18, a holder 71 includes a holding wall 72 elongated in the front-rear direction. Gate-shaped lock receiving portions 38 extending rightward are respectively provided on front and rear end edges of the holding wall 72. The holder 71 is formed by injection-molding insulating synthetic resin.

The holding wall 72 is formed to have substantially the same size as the left side wall of the housing 63. With the housing 71 assembled with the housing 63, the holding wall 72 (an example of the engaging portion) of the holder 71 covers the left side wall of the housing 63 from the left.

The holding wall 72 is formed with a plurality of (fourth in this embodiment) insertion holes 73 arranged in the front-rear direction and penetrating through the holding wall 72 in the lateral direction. The insertion holes 73 are formed at positions corresponding to parts of the cavity 67 open in the left side wall of the housing 63. In this way, the insertion holes 73 communicate with the cavity 67 of the housing 63. An inner diameter of the insertion hole 73 is set equal to or somewhat larger than an outer diameter of an insulation coating 14 of a wire 11. In this way, the wire 11 is inserted into the insertion hole 73.

Tapered surfaces tapered toward the right are formed on hole edge parts of the insertion holes 73 in the left side surface of the holding wall 72. The wires 11 are guided into the insertion holes 73 by sliding in contact with these tapered surfaces.

Since the configuration other than the above is substantially the same as in the first embodiment, the same members are denoted by the same reference signs and repeated description is omitted.

(Manufacturing Process of Joint Connector 75)

Next, a manufacturing process of a joint connector 75 according to this embodiment is described. Note that the manufacturing process of the joint connector 75 is not limited to the one described below.

The joint terminal 60 is formed into a developed shape shown in FIG. 21 by cutting the metal plate material. The parts 76 where the tubular portions 20 and the upper and lower connecting pieces 18A, 18B are formed are formed to the left of the coupling portion 61 and side by side in the front-rear direction. Further, the parts 76 where the tubular portions 20 and the upper and lower connecting pieces 18A, 18B are form are formed to have the same shape when viewed from above, and formed side by side without any clearance in the front-rear direction. In this way, the intervals between the branch portions 62 arranged in the front-rear direction can be made smaller.

Next, parts of the joint terminal 60 different from the pressing portions 17 are formed as shown in FIGS. 19 and 20 by press-working the metal plate material formed into the developed shape. Subsequently, the pressing portions 17 are formed into a predetermined shape.

The pressing portions 17 are mounted from the left on the tubular portions 20 provided on the tips of the branch portions 62 extending leftward from the coupling portion 61.

The housing 63 is formed by injection-molding synthetic resin. The joint terminal 60 is disposed to the left of the housing 63 with the coupling portion 61 facing rightward and the wire connecting portions 19 facing leftward. The coupling portion 61 of the joint terminal 60 is inserted into the slit 68 formed in the left side wall of the housing 63 from the left. By moving the joint terminal 60 rightward, the coupling portion 61 and the branch portions 62 are inserted into the coupling portion accommodating portion 64 and the branch portion accommodating portions 65 of the housing 63 from the left. In this way, the branch portions 62 are sandwiched between the ribs 74 formed in the branch portion accommodating portions 65, whereby the joint terminal 60 is retained and held in the housing 63.

Next, the holder 71 is mounted from the left on the left end part of the housing 63 and the lock receiving portions 38 of the holder 71 are resiliently locked to the partial locking portions 36 of the housing 63 to hold the holder 71 at a partial locking position with respect to the housing 63. In this state, the holding wall 72 of the holder 71 is disposed at a position separated rearward from rear end edges of the pressing portions 17.

The cores 13 exposed from the insulation coatings 14 of the wires 11 are inserted into the insertion holes 73 provided in the holding wall 72 of the holder 71. By pushing the wires 11 into the housing 63, the cores 13 are disposed inside the tubular portions 20 and the insulation coatings 14 of the wires 11 are disposed in the insertion holes 73 of the holder 71.

Next, as shown in FIG. 22, a jig 45 is inserted into the work hole 70 of the housing 63 from above and brought into contact with a jig contact portion 46. Subsequently, the jig contact portion 46 is pressed by the jig 45 to move the pressing portion 17 relatively rightward with respect to the tubular portion 20. In this way, locking projections 28 of the tubular portion 20 and full locking portions 27 of the pressing portion 17 are resiliently locked, whereby the pressing portion 17 is held at a full locking position with respect to the tubular portion 20.

With the pressing portion 17 held at the full locking position with respect to the tubular portion 20, an upper contact portion 25A of the pressing portion 17 comes into contact with the upper connecting piece 18A of the tubular portion 20 from above to press the upper connecting piece 18A downward. Further, a lower contact portion 25B of the pressing portion 17 comes into contact with the lower connecting piece 18B of the tubular portion 20 from below to press the lower connecting piece 18B upward. In this way, the core 13 is sandwiched from upper and lower sides by the upper and lower connecting pieces 18A, 18B. As a result, the core 13 is held in contact with the upper and lower connecting pieces 18A, 18B, whereby the wire 11 and the joint terminal 12 are electrically connected.

Next, the holder 71 is moved from the partial locking position to a full locking position. Then, the lock receiving portions 38 of the holder 71 ride over the full locking portions 37 to be restored and the full locking portions 37 of the housing 63 and the lock receiving portions 38 of the holder 71 are locked. In this way, the holder 71 is held at the full locking position with respect to the housing 63 (see FIG. 22). As a result, the holding wall 72 of the holder 71 is engaged with the pressing portions 17 to retain and hold the pressing portions 17 inside the housing 63. In this way, the joint connector 75 is completed (see FIG. 23).

Note that since a process other than the above is substantially the same as in the first embodiment, repeated description is omitted.

Functions and Effects of Embodiment

Next, functions and effects of this embodiment are described. If three or more branch portions 62 are provided from one side edge of the coupling portion 61 as in this embodiment, structures adjacent in the front-rear direction for forming the tubular portions 20 and the upper and lower connecting pieces 18A, 18B cannot be symmetrically formed in the front-rear direction in the state of development.

Accordingly, in this embodiment, the structures adjacent in the front-rear direction for forming the tubular portions 20 and the upper and lower connecting pieces 18A, 18B are formed to have the same shape when viewed from above in the developed shape. In this way, the intervals between the branch portions 62 arranged in the front-rear direction can be suppressed from becoming excessively wide.

Third Embodiment

Next, a third embodiment of the technique disclosed in this specification is described with reference to FIGS. 24 to 29.

Figure 24:
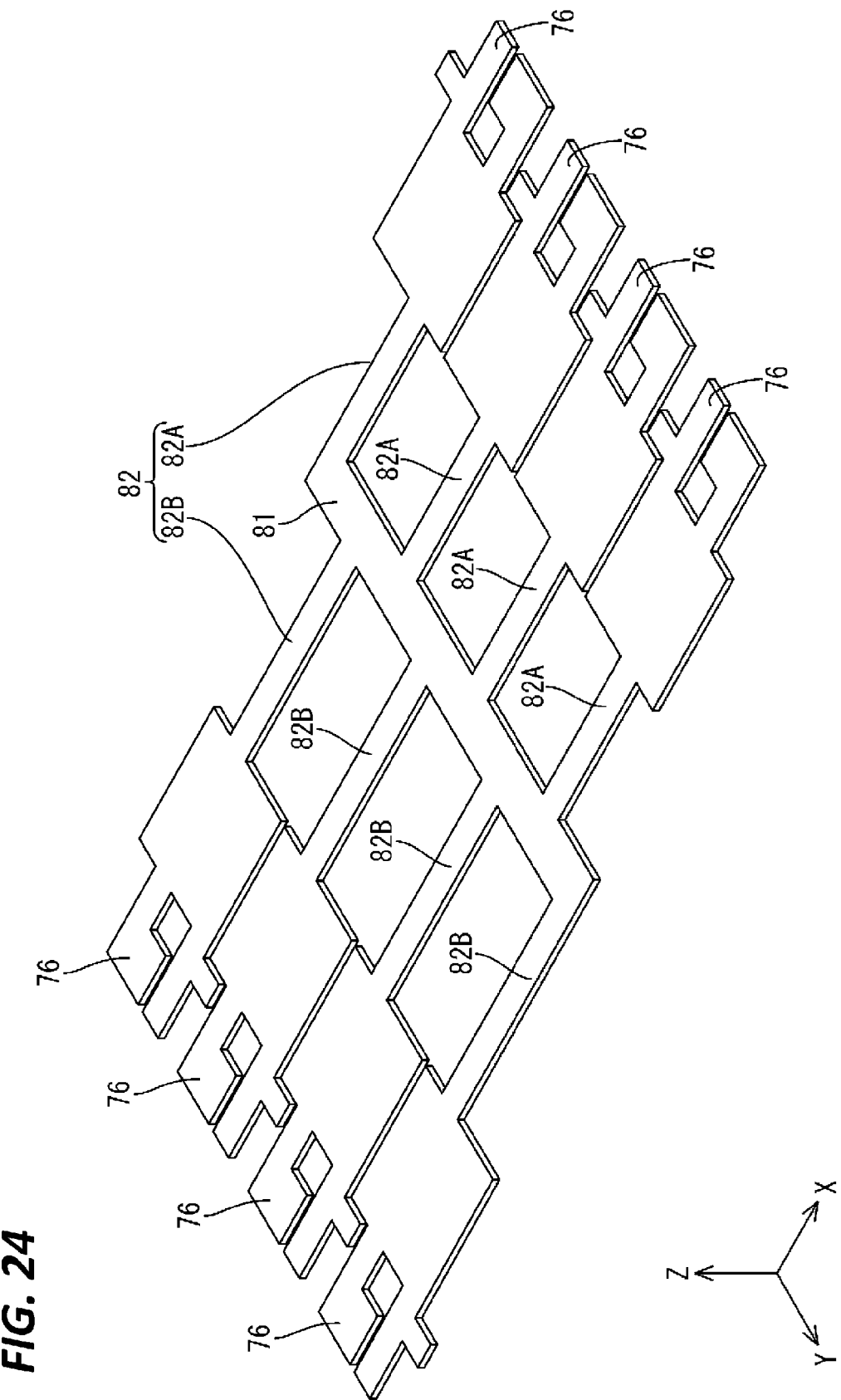
FIG. 24 is a plan view showing a developed shape of a metal plate material after cutting in a joint terminal according to a third embodiment.

A joint terminal 80 according to this embodiment includes a plurality of branch portions 82. The plurality of branch portions 82 include first branch portions 82A and second branch portions 82B to be described later. The joint terminal 80 is press-worked after being cut into a developed shape as shown in FIG. 24. In the developed shape, a plurality of (four in this embodiment) the first branch portions 82A are formed to extend leftward on a left side edge of a coupling portion 81 extending in a front-rear direction. The respective first branch portions 82A are arranged at equal intervals in the front-rear direction.

Further, in the developed shape, a plurality of (four in this embodiment) the second branch portions 82B are formed to extend rightward on a right side edge of the coupling portion 81. The respective second branch portions 82B are arranged at equal intervals in the front-rear direction.

The first branch portions 82A disposed to the left of the coupling portion 81 and the second branch portions 82B to the right of the coupling portion 81 are disposed at positions shifted in the front-rear direction. In particular, the second branch portions 82B disposed to the right of the coupling portion 81 are arranged by being shifted forward by half the interval in the front-rear direction of the first branch portions 82A disposed to the left of the coupling portion 81.

A lateral length of the second branch portions 82B disposed to the right of the coupling portion 81 is set longer than that of the first branch portions 82A disposed to the left of the coupling portion 81 by a lateral width of the coupling portion 81.

Figure 25:
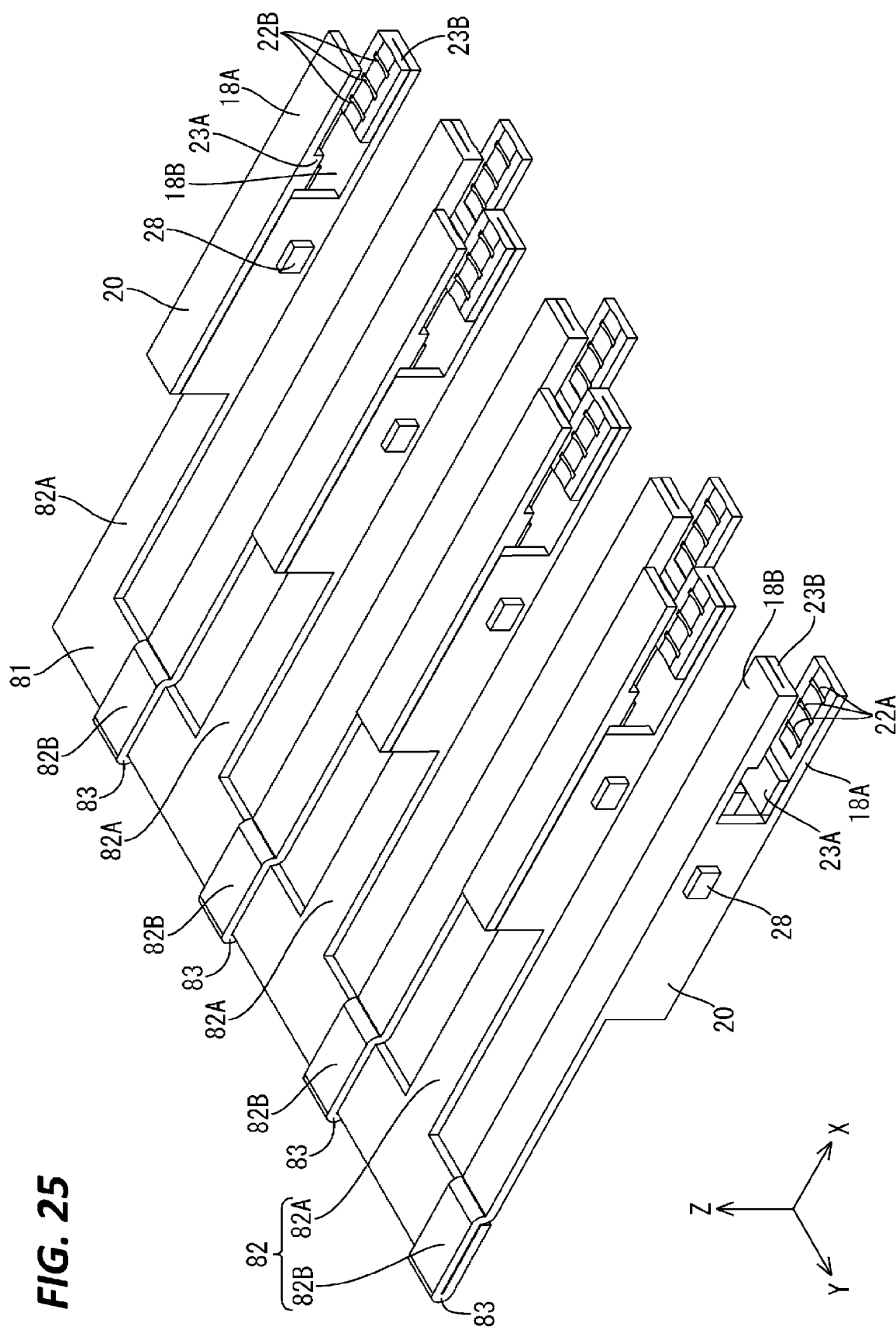
FIG. 25 is a perspective view showing the joint terminal before pressing portions are mounted.
Figure 29:
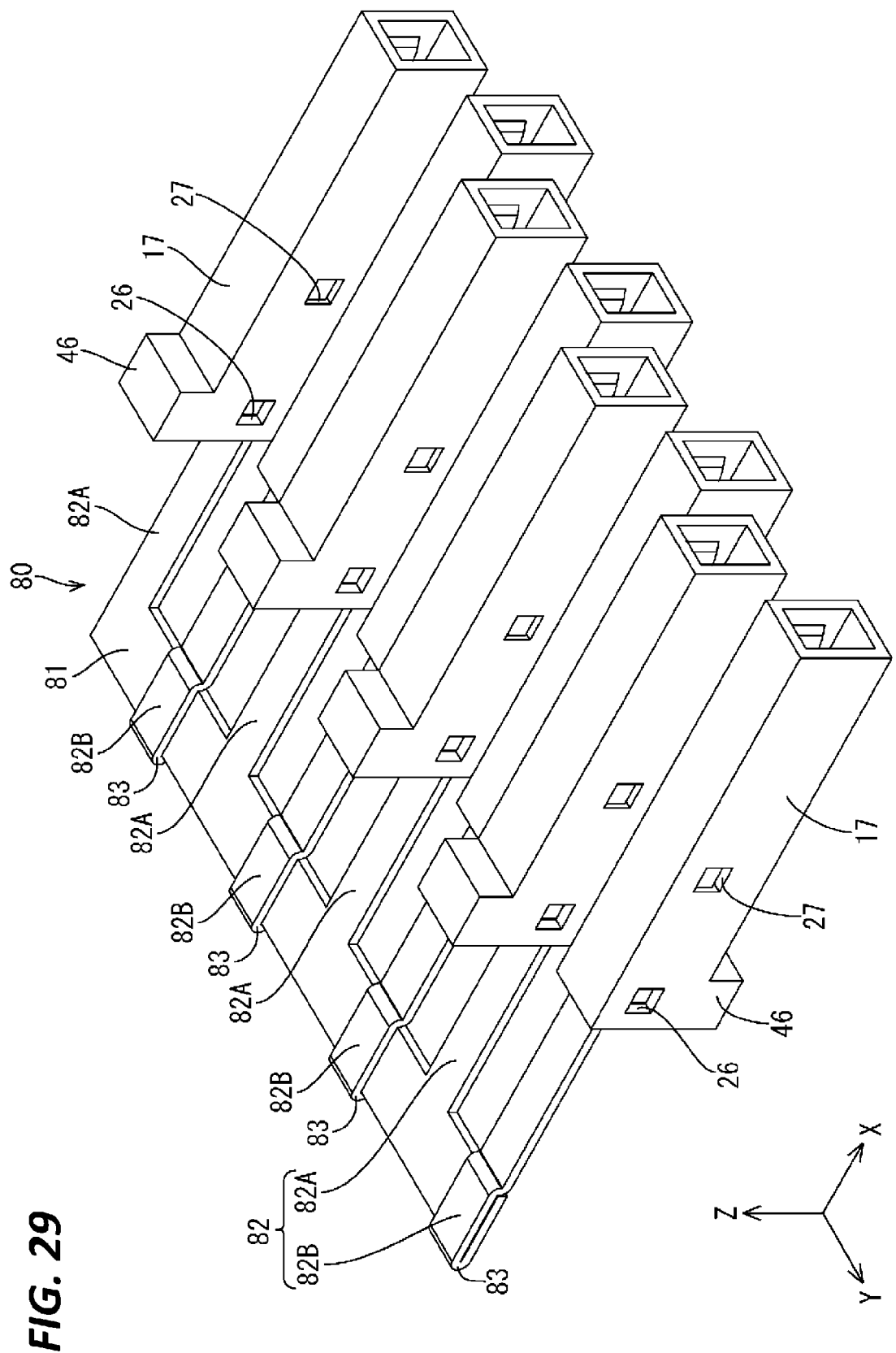
FIG. 29 is a perspective view showing the joint terminal.

As shown in FIGS. 25 and 29, in the joint terminal 80 after press-working, branch portion folded portions 83 extending in the front-rear direction are formed in boundary parts between the right side edge of the coupling portion 81 and the first branch portions 82B disposed to the right of the coupling portion 81. In these branch portion folded portions 83, the second branch portions 82B formed on the right side edge of the coupling portion 81 are folded leftward and disposed to extend leftward of the coupling portion 81. The second branch portions 82B are folded to extend in the same direction as an extending direction (leftward direction) of the first branch portions 82A. The folded second branch portions 82B partially overlap on the upper surface of the coupling portion 81. Out of the folded second branch portions 82B, parts not overlapping on the upper surface of the coupling portion 81 are bent downward into a crank shape to be disposed substantially at the same height positions in the vertical direction as the first branch portions 82A extending from the left side edge of the coupling portion 81.

As described above, the lateral length of the second branch portions 82B formed on the right side edge of the coupling portion 81 is set longer than that of the first branch portions 82A formed on the left side edge of the coupling portion 81 by the lateral width of the coupling portion 81. Thus, the positions of left end parts of the wire connecting portions 19 formed on the first branch portions 82A extending from the left side edge of the coupling portion 81 and those of left end parts of the wire connecting portions 19 formed on the second branch portions 82B folded from the right side edge of the coupling portion in the branch portion folded portions 83 are substantially aligned in the front-rear direction when viewed from above.

Figure 26:
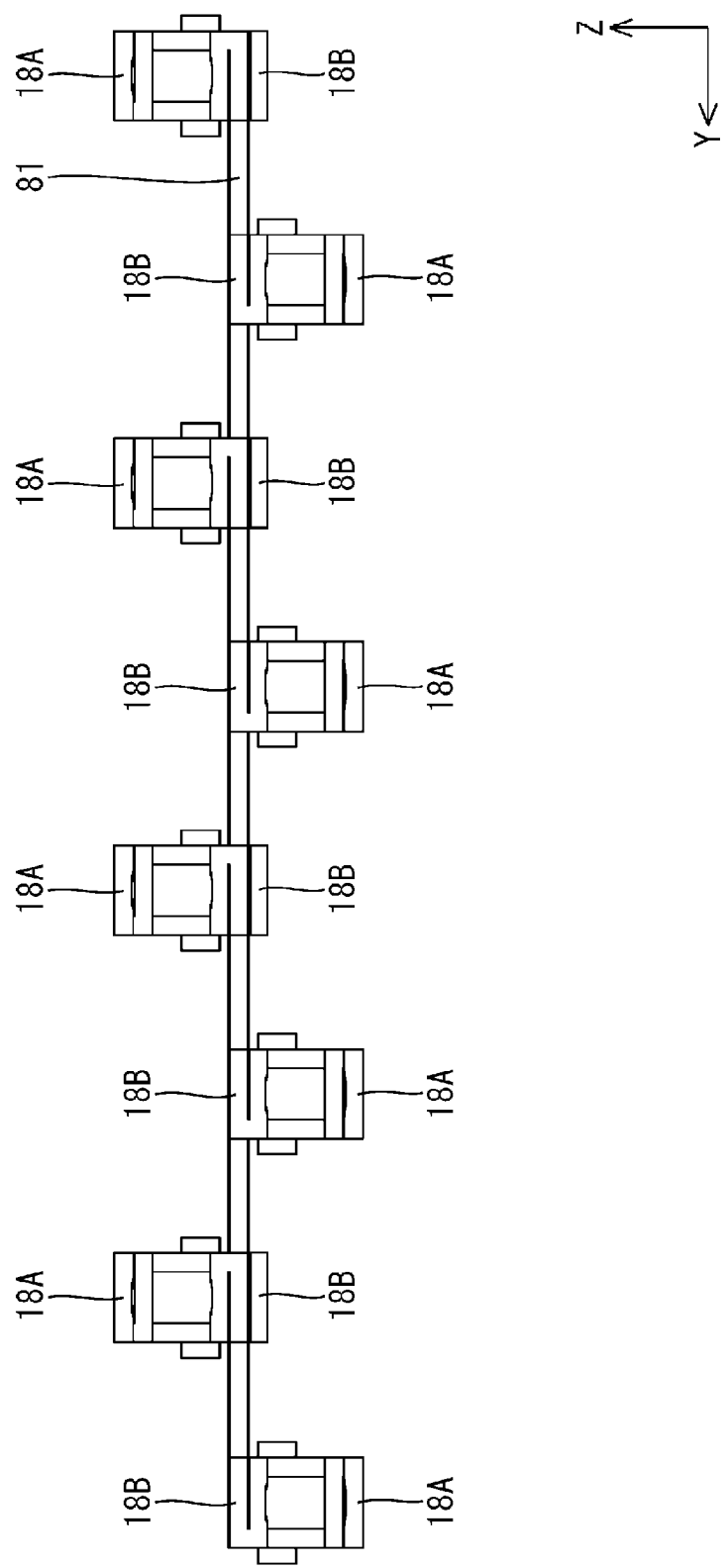
FIG. 26 is a left side view showing the joint terminal before the pressing portions are mounted.
Figure 28:
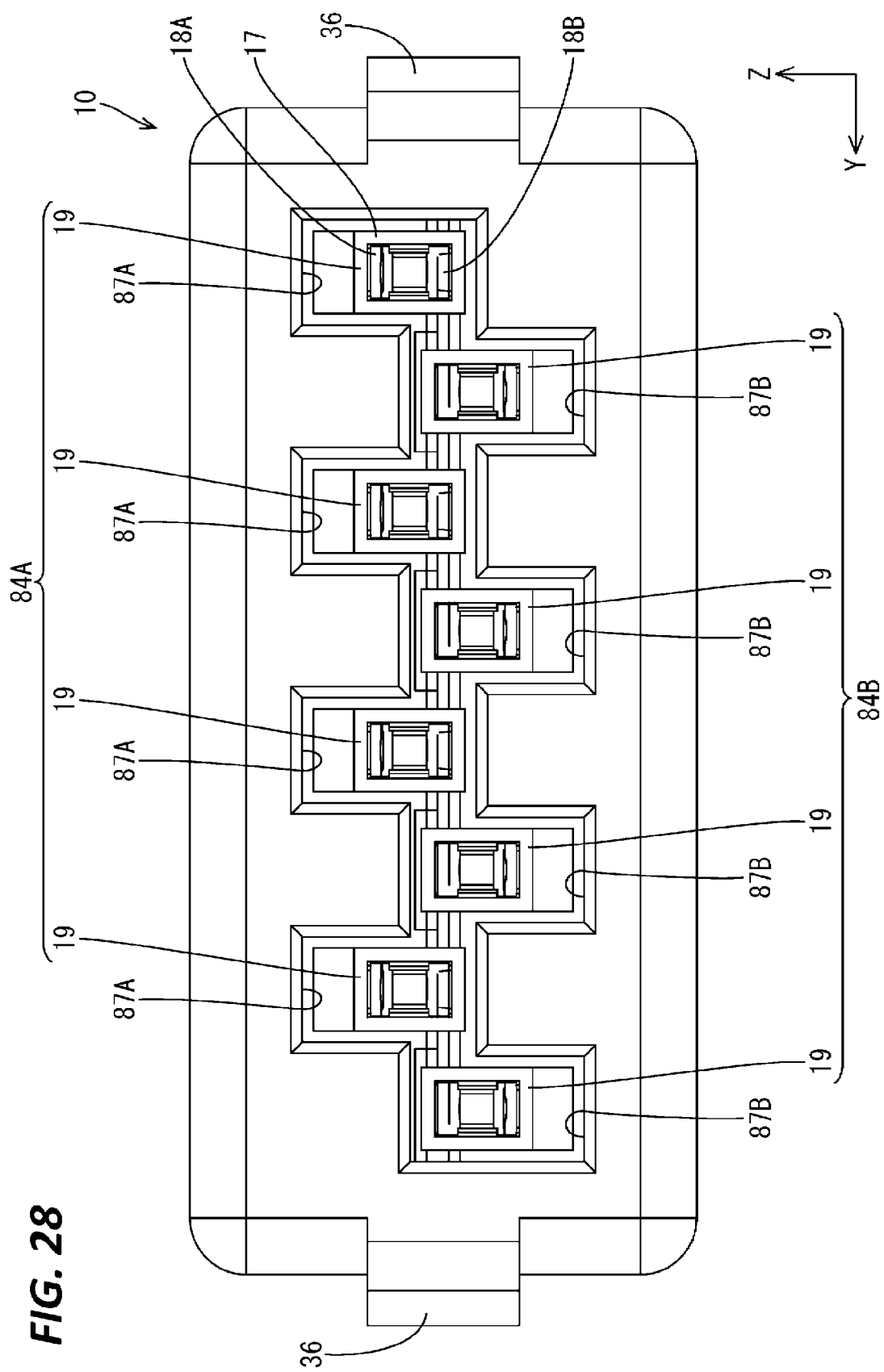
FIG. 28 is a left side view showing the joint connector.

As shown in FIG. 26, in a state of the joint terminal 80 viewed from the left, the wire connecting portions 19 formed on the first branch portions 82A extending from the left side edge of the coupling portion 81 are disposed above the coupling portion 81 and constitute an upper wire connecting portion row 84A (an example of a wire connecting portion row) arranged in the front-rear direction. On the other hand, the wire connecting portions 19 formed on the second branch portions 82B folded from the right side edge of the coupling portion 81 in the branch portion folded portions 83 are disposed below the coupling portion 81 and constitute a lower wire connecting portion row 84B (an example of a wire connecting portion row) arranged in the front-rear direction. The upper and lower wire connecting portion rows 84A, 84B are arranged in the vertical direction.

Further, the wire connecting portions 19 formed on the first branch portions 82A extending from the left side edge of the coupling portion 81 and the wire connecting portions 19 formed on the second branch portions 82B folded from the right side edge of the coupling portion 81 in the branch portion folded portions 83 are disposed in opposite orientations in the vertical direction. Thus, the terms of members and the positions thereof shown in figures may be opposite. For example, the upper connecting pieces 18A are shown to be located on a lower side for the above reason.

(Housing 85)

A plurality of (four in this embodiment) wire connecting portion accommodating portions 87A into which the wire connecting portions 19 formed on the first branch portions 82A extending from the left side edge of the coupling portion 81 are accommodated are provided to be open leftward at positions above a vertical center position in a left side wall of the housing 85. Further, a plurality of (four in this embodiment) wire connecting portion accommodating portions 87B into which the wire connecting portions 19 formed on the second branch portions 82B folded from the right side edge of the coupling portion 81 in the branch portion folded portions 83 are accommodated are provided to be open leftward at positions below the vertical center position in the left side wall of the housing 85.

The wire connecting portion accommodating portions 87A provided in an upper half of the left side wall of the housing 85 and the wire connecting portion accommodating portions 87B provided in a lower half of the side wall of the housing 85 are disposed at positions shifted in the front-rear direction.

Although not shown in detail, a holder is mounted on a left end part of the housing 85. Insertion holes into which wires 11 are inserted are formed to penetrate through a holding wall of the holder in the lateral direction at positions corresponding to the wire connecting portion accommodating portions 87A, 87B provided in the left side wall of the housing 85.

Since the configuration other than the above is substantially the same as in the second embodiment, the same members are denoted by the same reference signs and repeated description is omitted.

(Manufacturing Process of Joint Connector)

Next, a manufacturing process of a joint connector 90 according to this embodiment is described. Note that the manufacturing process of the joint connector 90 is not limited to the one described below.

The joint terminal 80 is formed into a developed shape shown in FIG. 24 by cutting a metal plate material. Subsequently, the second branch portions 82B formed on the right side edge of the coupling portion 81 are folded in the branch portion folded portions 83 and press-worked and pressing portions 17 are mounted, whereby the joint terminal 80 shown in FIG. 29 is formed.

Since the process other than the above is substantially the same as in the second embodiment, repeated description is omitted.

Functions and Effects of Embodiment

Next, functions and effects of this embodiment are described. In this embodiment, the plurality of branch portions 82 include the first branch portions 82A branched on the left side of the coupling portion 81 and the second branch portions 82B branched on the right side of the coupling portion 81, and the second branch portions 82B are folded to extend in the same direction (leftward direction) as the extending direction of the first branch portions 82A.

According to the above configuration, the second branch portions 82B are folded in the branch portion folded portions 83, whereby the wire connecting portions 19 continuous with the second branch portions 82B can be disposed between adjacent ones of the plurality of wire connecting portions 19 continuous with the first branch portions 82A arranged in the front-rear direction. In this way, intervals between the plurality of wire connecting portions 19 arranged along the front-rear direction can be narrowed. In this way, the joint connector 90 can be made narrower in the front-rear direction.

Further, in this embodiment, the joint terminal 80 includes two wire connecting portion rows 84A, 84B in each of which a plurality of wire connecting portions 19 are arranged along the front-rear direction, and the plurality of wire connecting portion rows 84A, 84B are disposed side by side in the vertical direction.

According to the above configuration, since the plurality of wire connecting portions 19 can be disposed side by side on upper and lower sides, the joint terminal 80 can be reduced in size in the front-rear direction. In this way, the joint connector 90 can be reduced in size in the front-rear direction.

Further, in this embodiment, the upper and lower wire connecting portion rows 84A, 84B are disposed at the positions shifted in the front-rear direction. In this way, intervals between the wire connecting portions 19 adjacent in the front-rear direction can be set to be relatively wide in the upper wire connecting portion row 84A. In this way, walls separating the wire connecting portion accommodating portions 87A adjacent in the front-rear direction can be formed to be thick for the wire connecting portion accommodating portions 87A into which the wire connecting portions 19 constituting the upper wire connecting portion row are accommodated. Thus, the strength of the housing 85 can be improved. Similarly, walls separating the wire connecting portion accommodating portions 87B adjacent in the front-rear direction can be formed to be thick for the wire connecting portion accommodating portions 87B into which the wire connecting portions 19 constituting the lower wire connecting portion row are accommodated. Thus, the strength of the housing 85 can be improved.

Fourth Embodiment

Next, a fourth embodiment of the technique disclosed in this specification is described with reference to FIGS. 30 to 35.

Figure 30:
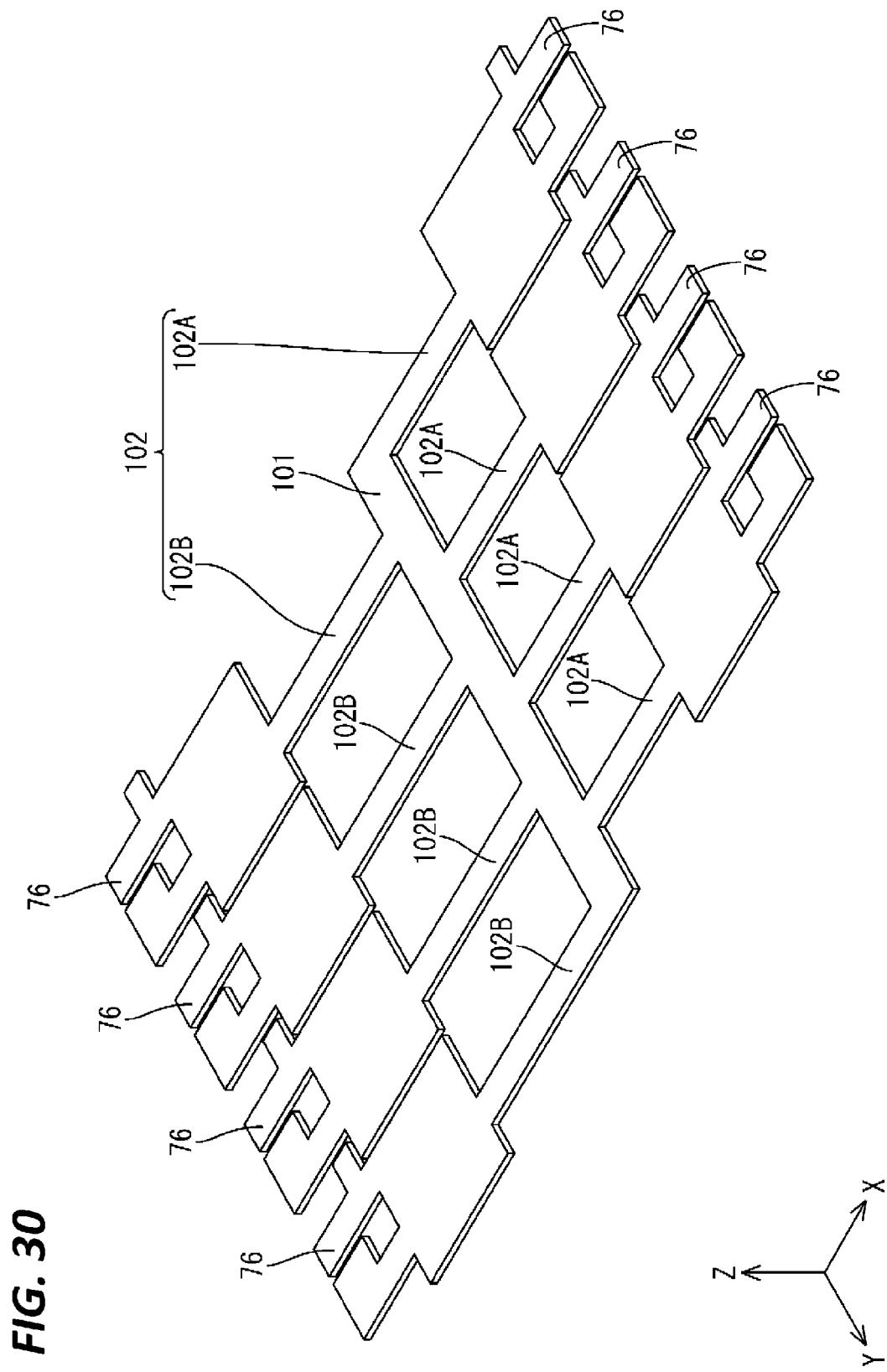
FIG. 30 is a plan view showing a developed shape of a metal plate material after cutting in a joint terminal according to a fourth embodiment.
Figure 31:
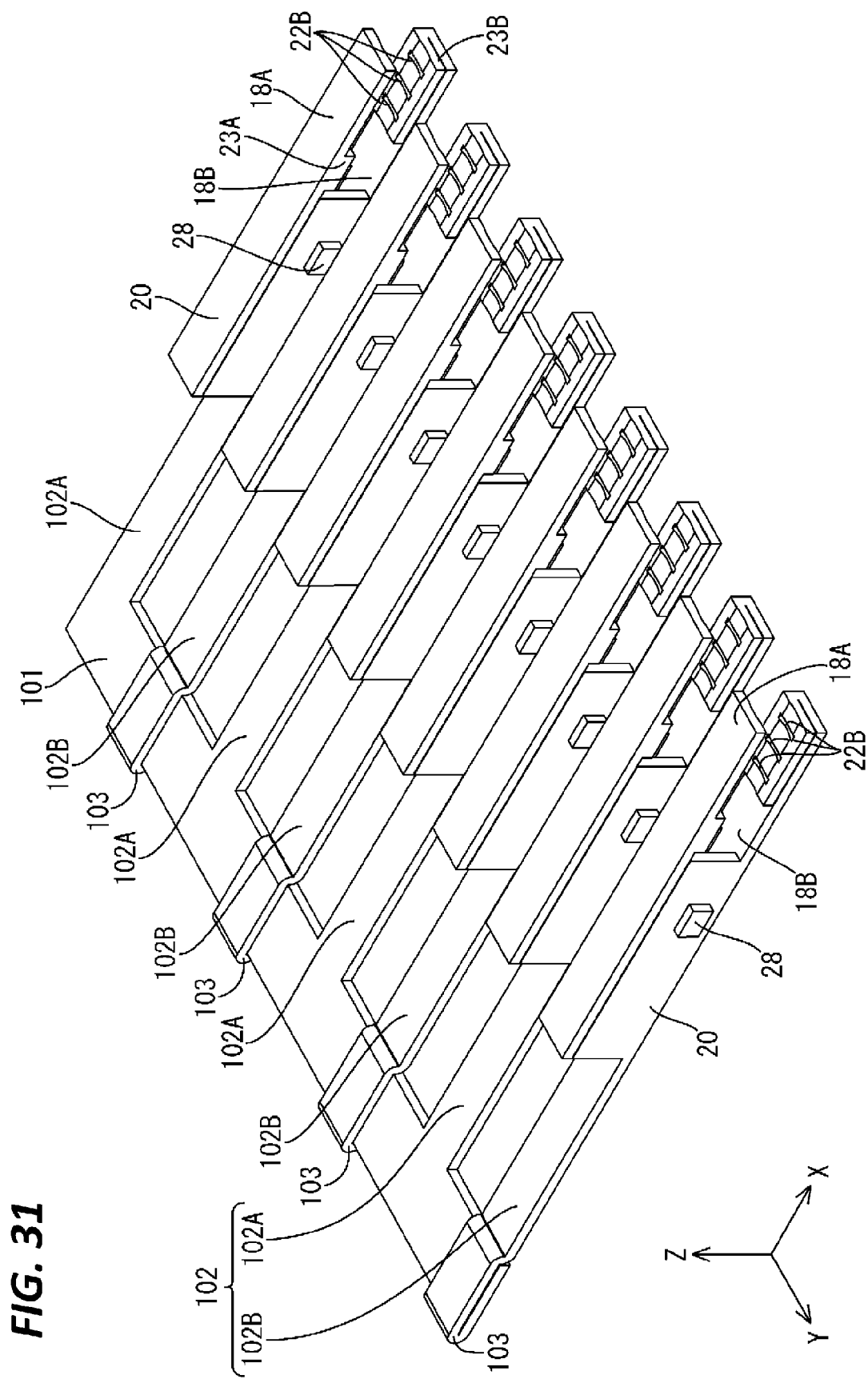
FIG. 31 is a perspective view showing the joint terminal before pressing portions are mounted.
Figure 32:
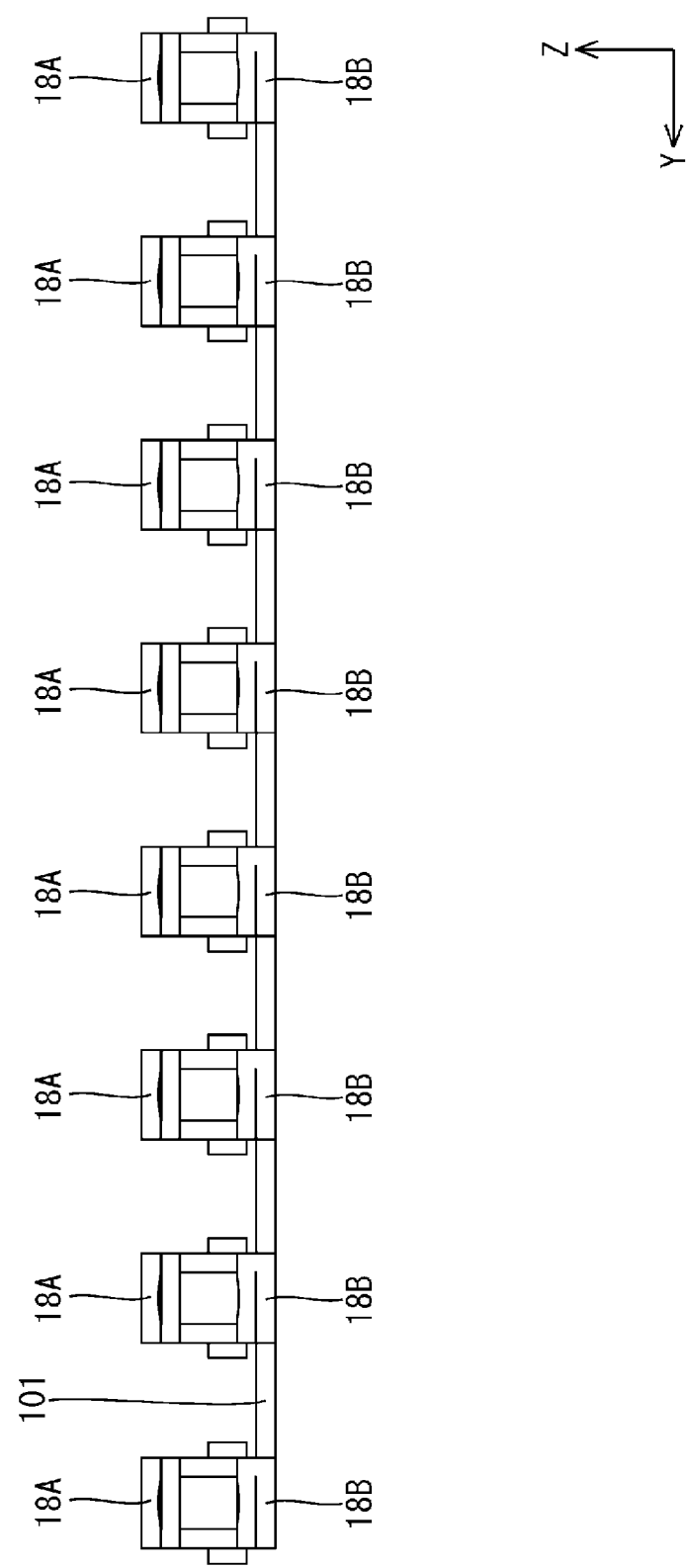
FIG. 32 is a left side view showing the joint terminal before the pressing portions are mounted.
Figure 33:
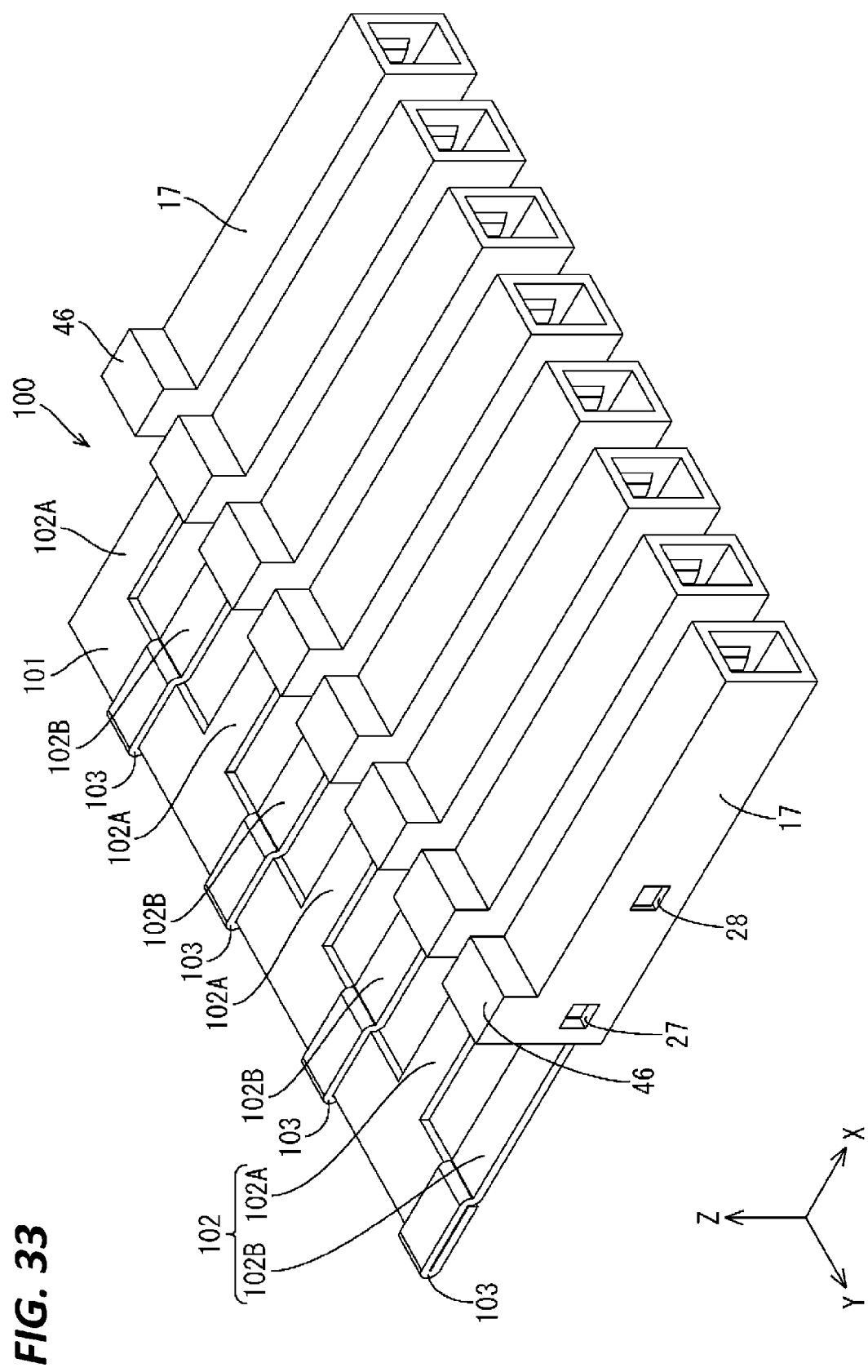
FIG. 33 is a perspective view showing the joint terminal.

A joint terminal 100 according to this embodiment is press-worked into a shape shown in FIGS. 31 and 32 after being cut into a developed shape as shown in FIG. 30. As shown in FIG. 33, the joint terminal 100 after press-working includes a plurality of branch portions 102. The plurality of branch portions 102 include first branch portions 102A and second branch portions 102B to be described later. In the joint terminal 100, both wire connecting portions 19 formed on a plurality of (four in this embodiment) the first branch portions 102A extending from a left side edge of a coupling portion 101 and wire connecting portions 19 formed on a plurality of (four in this embodiment) the second branch portions 102B folded from a right side edge of the coupling portion 101 in branch portion folded portions 103 are disposed above the coupling portion 101 and arranged in a front-rear direction.

Figure 34:
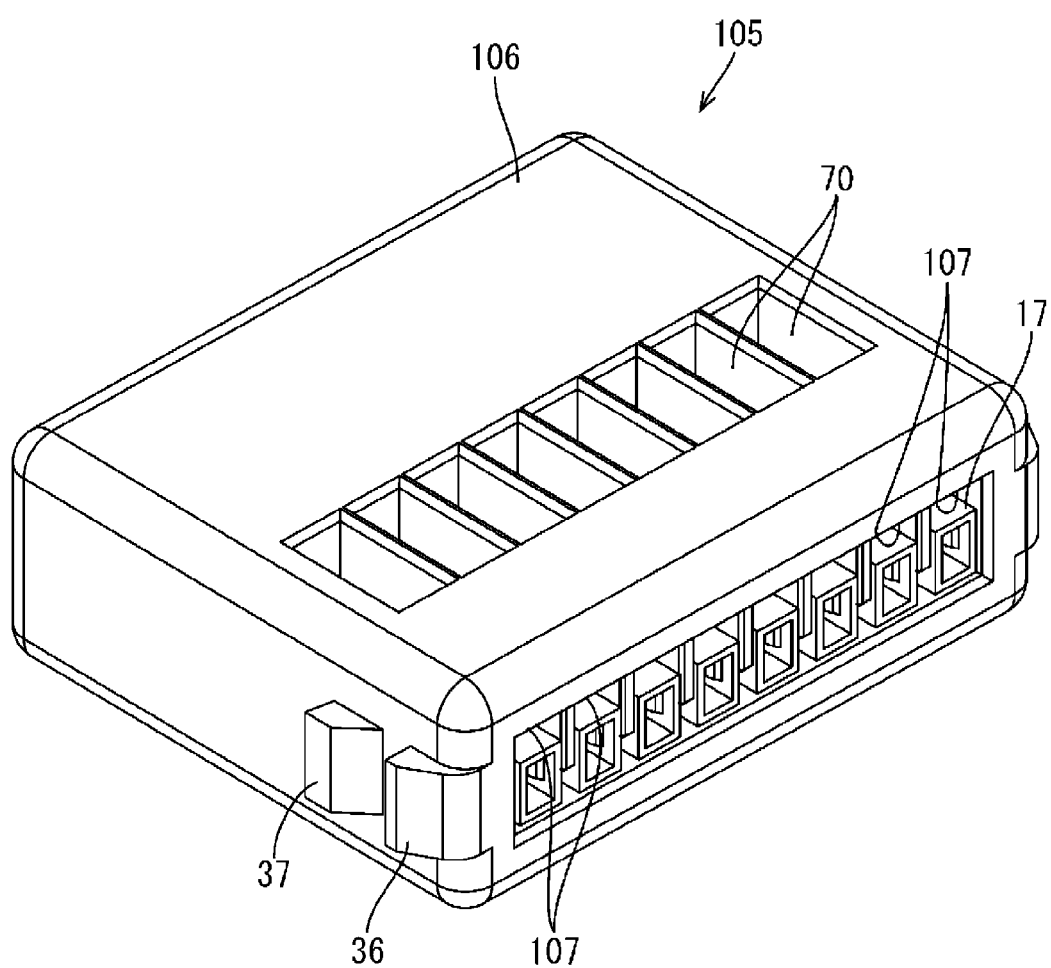
FIG. 34 is a perspective view showing a joint connector.
Figure 35:
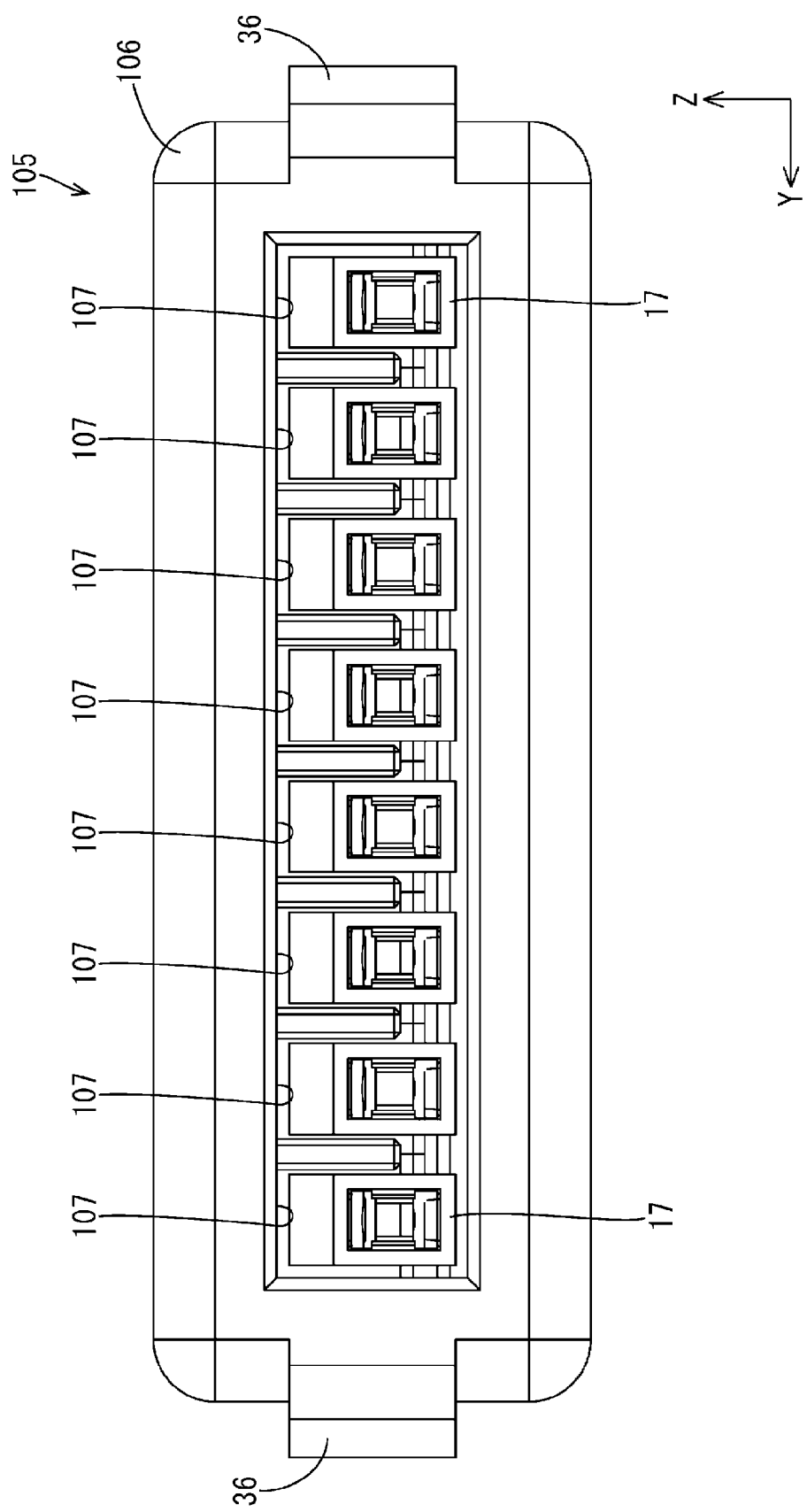
FIG. 35 is a left side view showing the joint connector.

As shown in FIGS. 34 and 35, a plurality of (eight in this embodiment) wire connecting portion accommodating portions 107 open leftward are provided in a left side wall of the housing 106. Lower end parts of the respective wire connecting portion accommodating portions 107 communicate in the front-rear direction.

In this embodiment, a plurality of (eight in this embodiment) wire connecting portions 19 are disposed above the coupling portion 101 in a vertical direction and formed side by side in the front-rear direction. Since the joint terminal 100 can be reduced in size in the vertical direction in this way, a joint connector 105 including the joint terminal 100 can be reduced in size in the vertical direction.

Since the configuration other than the above is substantially the same as in the second embodiment, the same members are denoted by the same reference signs and repeated description is omitted.

Fifth Embodiment

Next, a fifth embodiment relating to a joint connector 110 to which the technique disclosed in this specification is applied is described with reference to FIGS. 36 to 41.

Figure 36:
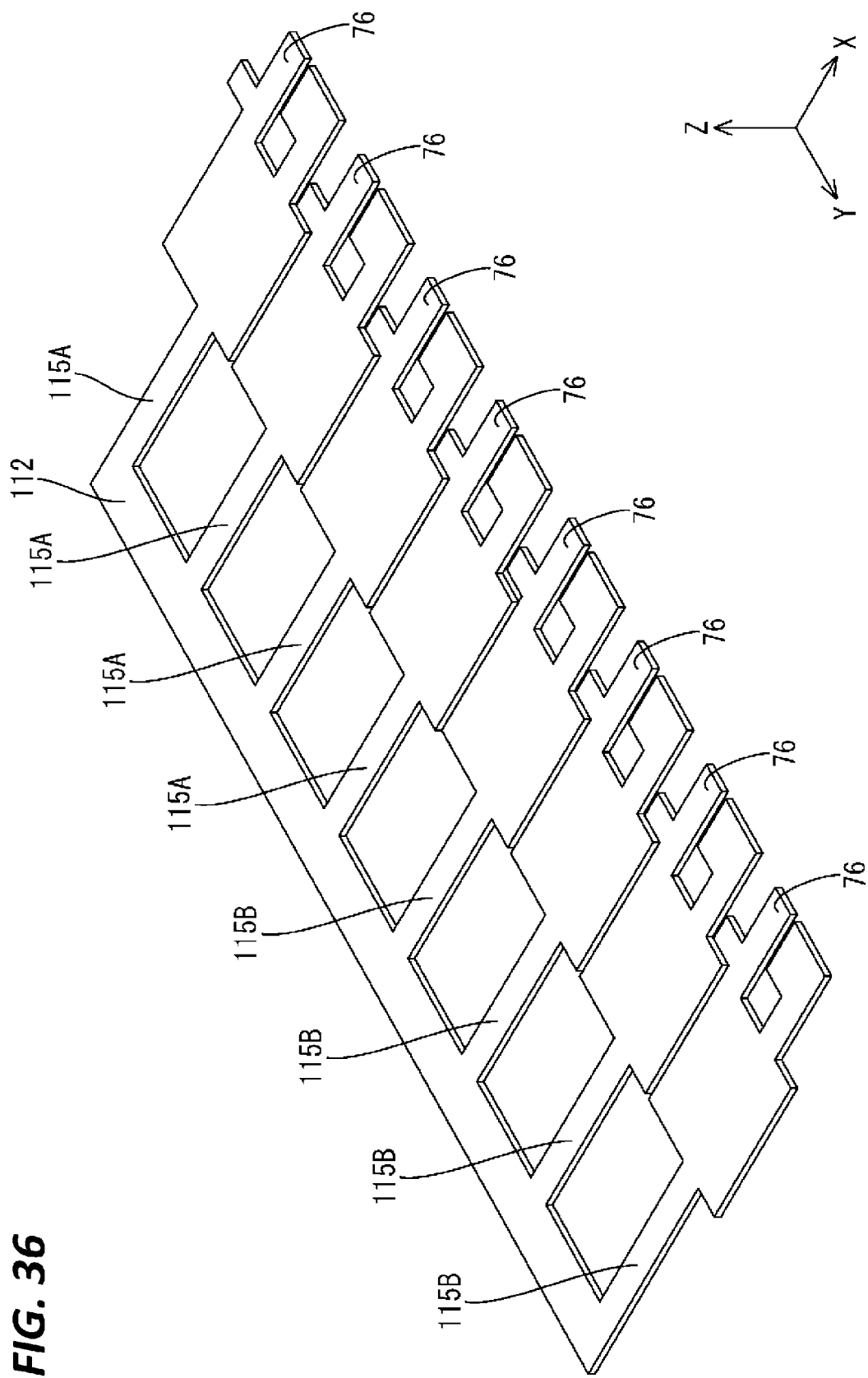
FIG. 36 is a plan view showing a developed shape of a metal plate material after cutting in a joint terminal according to a fifth embodiment.
Figure 37:
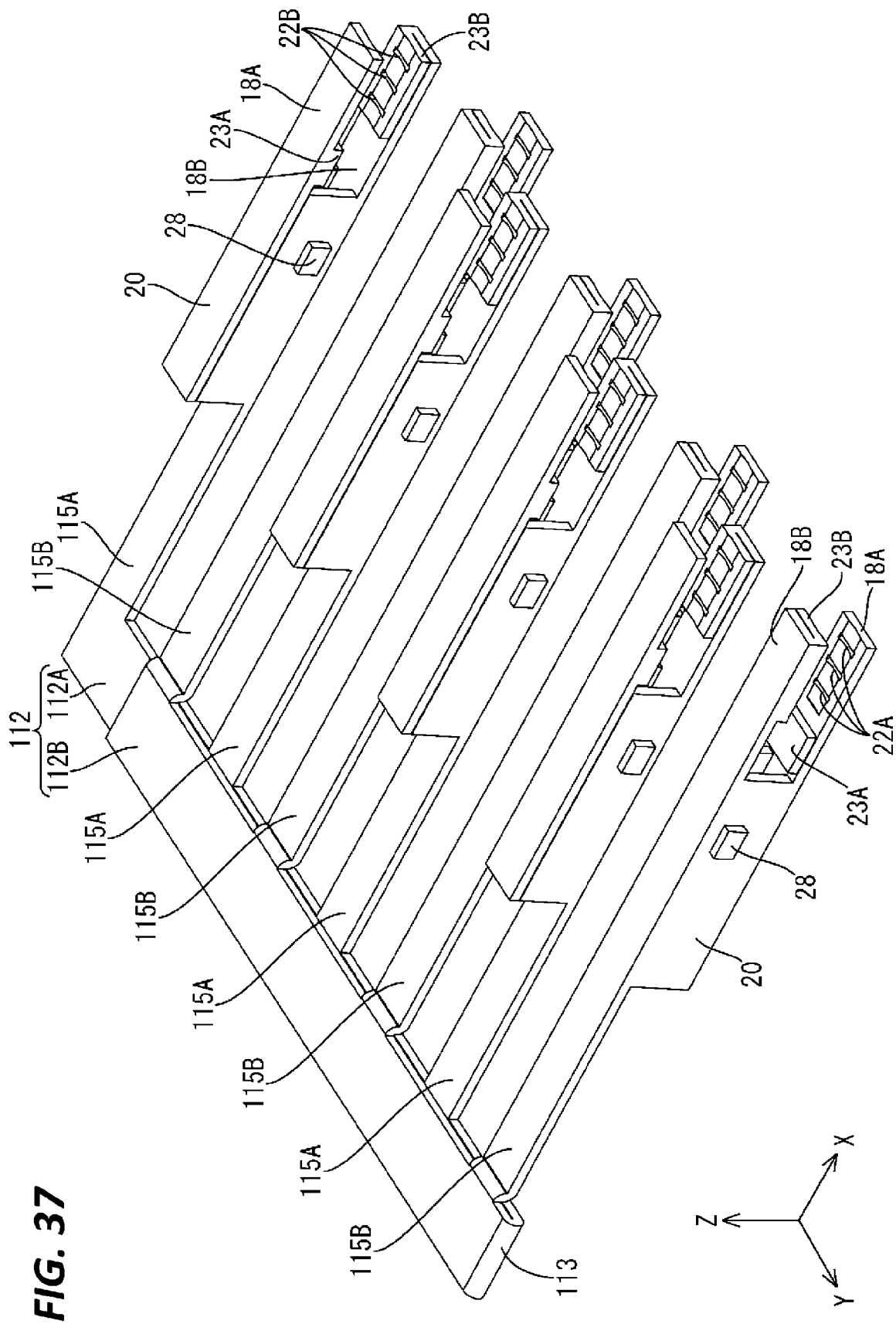
FIG. 37 is a perspective view showing the joint terminal before pressing portions are mounted.
Figure 38:
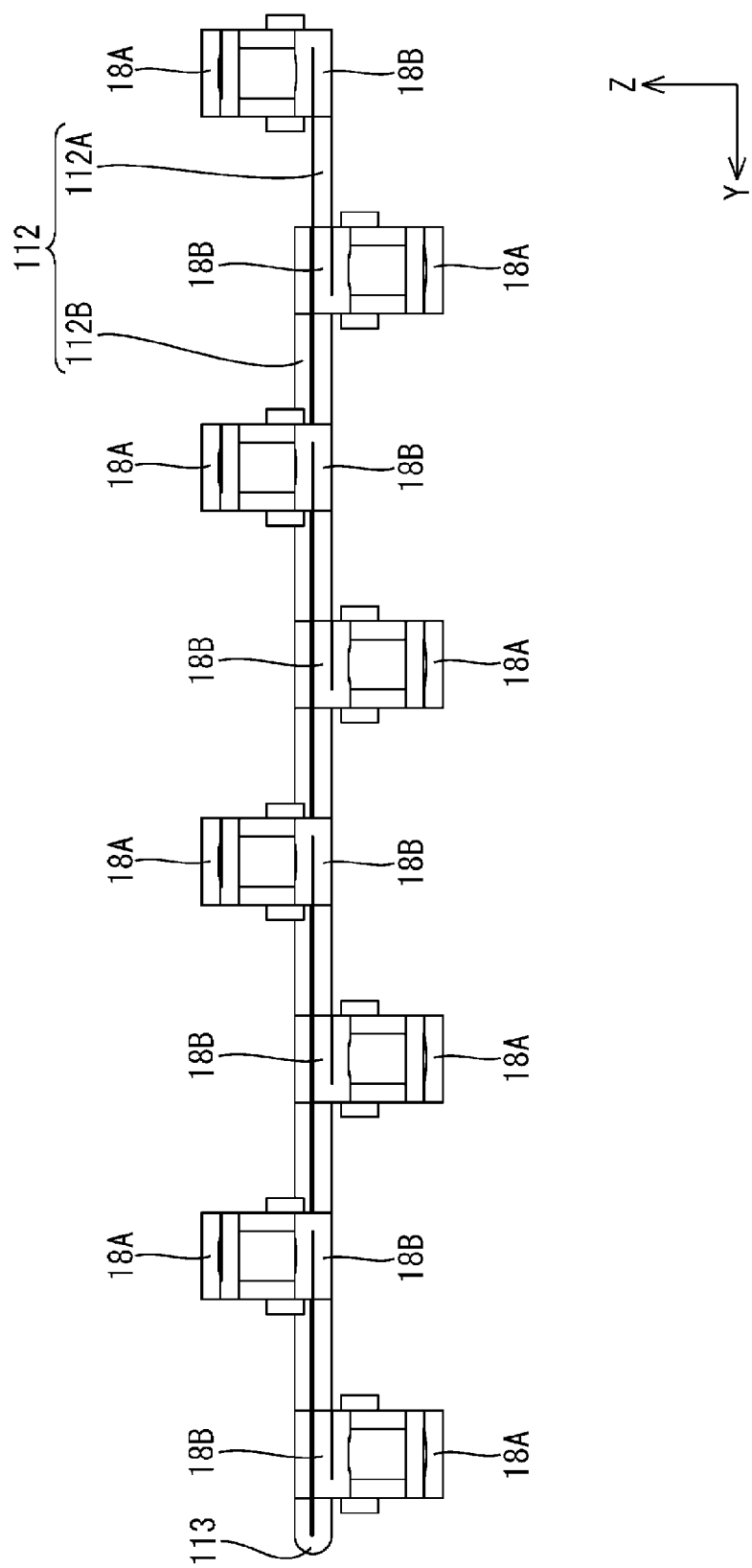
FIG. 38 is a left side view showing the joint terminal before the pressing portions are mounted.

A joint terminal 111 according to this embodiment is press-worked into a shape shown in FIGS. 37 and 38 after being cut into a developed shape as shown in FIG. 36. In the developed shape, a plurality of (eight in this embodiment) branch portions 115A, 115B are formed to extend leftward on a left side edge of a coupling portion 112 extending in a front-rear direction. The respective branch portions 115A, 115B are arranged at equal intervals in the front-rear direction.

Figure 39:
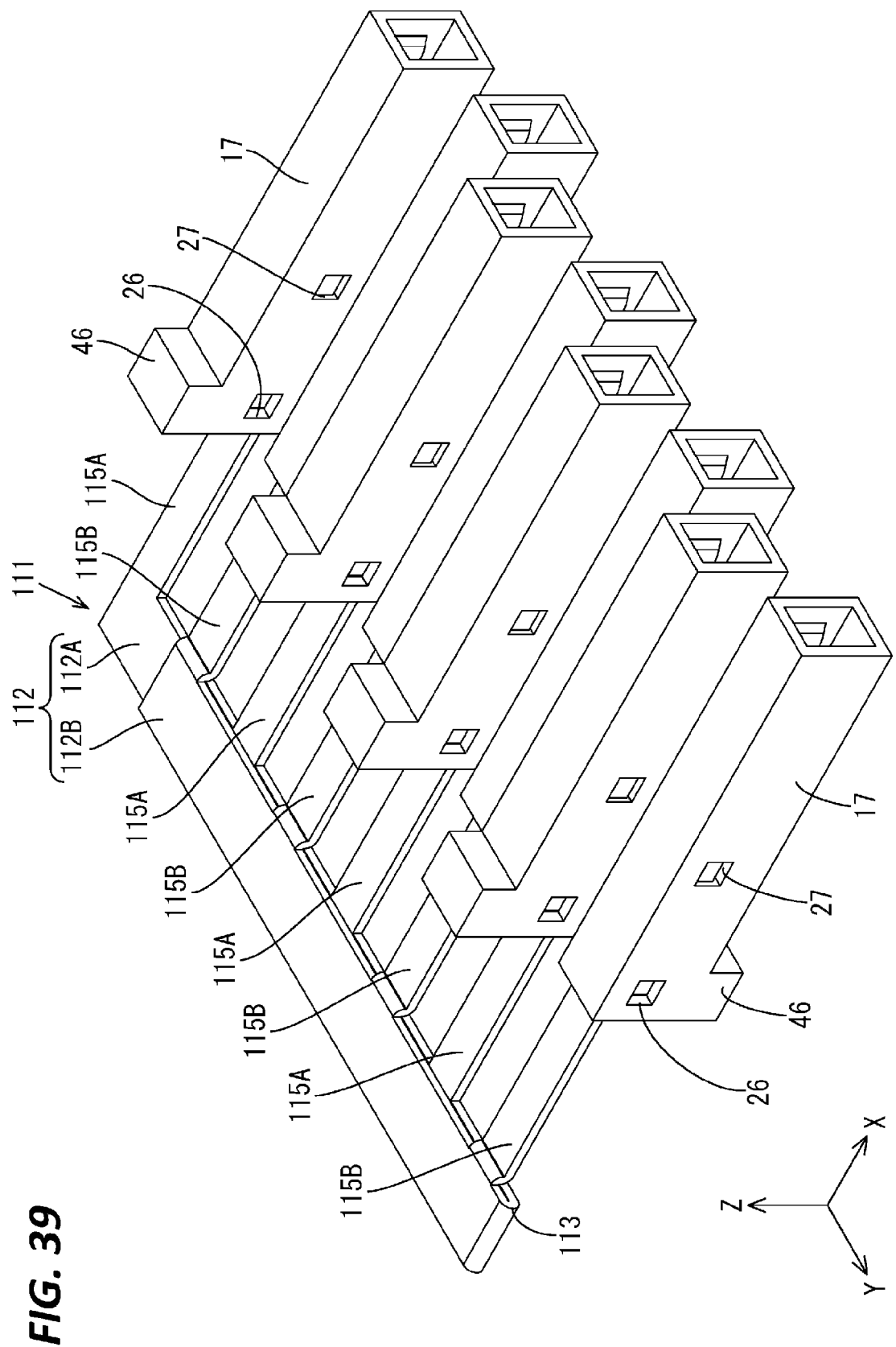
FIG. 39 is a perspective view showing the joint terminal.

As shown in FIG. 39, in the joint terminal 111 after press-working, a coupling portion folded portion 113 extending in a lateral direction is formed near a center position in the front-rear direction of the coupling portion 112. The coupling portion 112 is provided with a first coupling portion 112A and a second coupling portion 112B overlapped on the upper surface of the first coupling portion 112A by the coupling portion folded portion 113.

With the coupling portion 112 folded in the coupling portion folded portion 113, a plurality of (four in this embodiment) the first branch portions 115A formed on a left side edge of the first coupling portion 112A and a plurality of (four in this embodiment) the second branch portions 115B formed on a left side edge of the second coupling portion 112B are disposed side by side at intervals in the front-rear direction.

As shown in FIG. 37, the branch portions 115B formed on the second coupling portion 112B are bent into a crank shape in boundary parts between the second coupling portion 112B and the branch portions 115B, thereby being disposed substantially at the same height positions in the vertical direction as the branch portions 115A formed on the first coupling portion 112A.

In this embodiment, the coupling portion 112 includes the coupling portion folded portion 113 folded in a longitudinal direction (front-rear direction) of the coupling portion 112 and the first and second coupling portions 112A, 112B delimited by the coupling portion folded portion 113, and is so folded that the first and second coupling portions 112A, 112B overlap.

Figure 40:
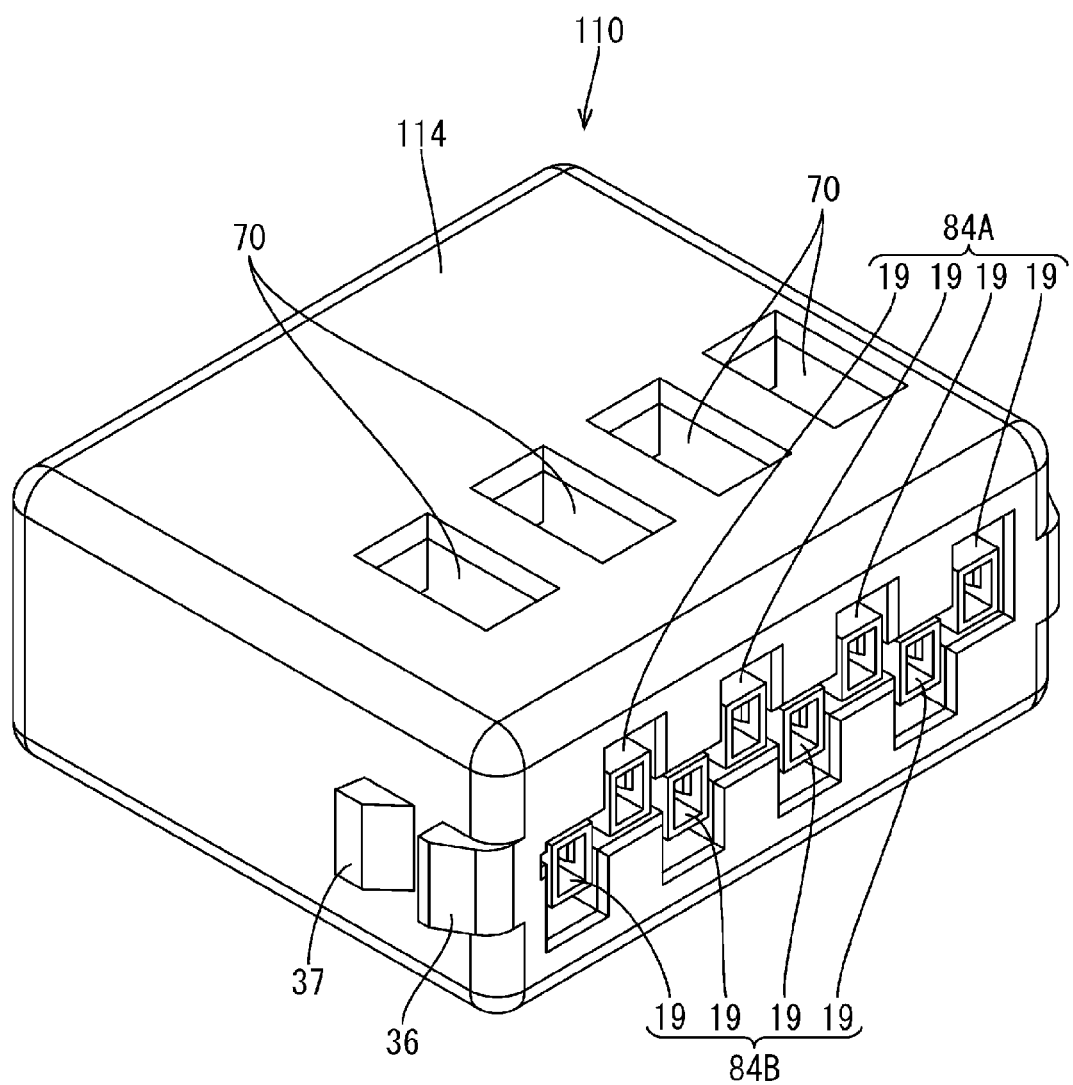
FIG. 40 is a perspective view showing a joint connector.
Figure 41:
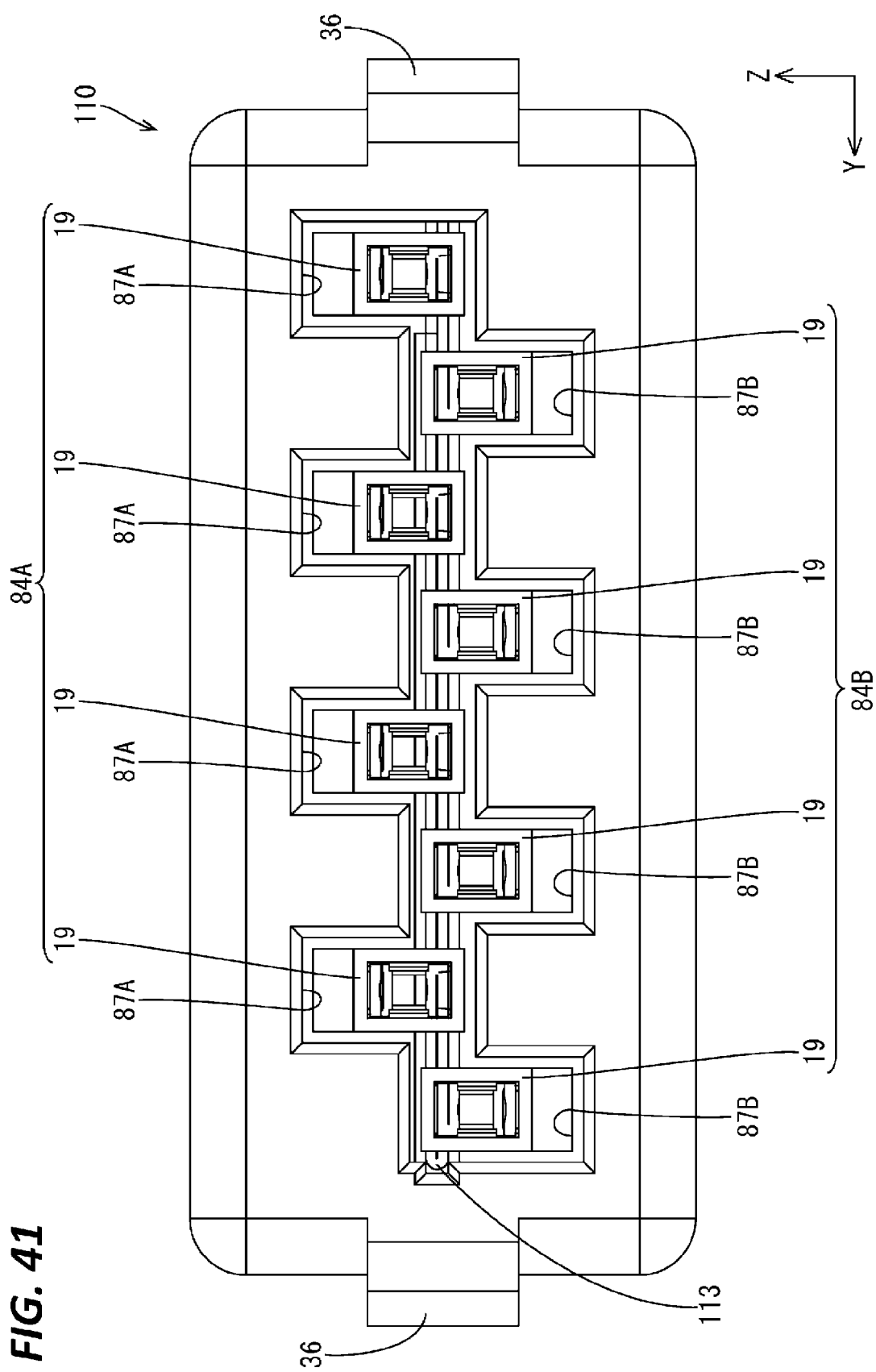
FIG. 41 is a left side view showing the joint connector.

According to the above configuration, the plurality of wire connecting portions 19 provided on the second coupling portion 112B can be respectively disposed between adjacent ones of the plurality of wire connecting portions 19 provided on the first coupling portion 112A by folding the coupling portion 112 at the coupling portion folded portion 113. Since the intervals between the plurality of wire connecting portions 19 arranged in the front-rear direction can be narrowed in this way as shown in FIGS. 40 and 41, the joint connector 110 can be made narrower in a first direction.

Further, since the first and second coupling portions 112A, 112B vertically overlap in this embodiment, it is suppressed that an excessive force is applied to the joint terminal 111 by pressing a part where the first and second coupling portions 112A, 112B vertically overlap when the joint terminal 111 is press-fit into a housing 114. In this way, the deformation of the joint terminal 111 in a press-fitting process into the housing 114 can be suppressed.

Since the configuration other than the above is substantially the same as in the third embodiment, the same members are denoted by the same reference signs and repeated description is omitted.

Sixth Embodiment

Next, a sixth embodiment relating to a joint connector 120 to which the technique disclosed in this specification is applied is described with reference to FIGS. 42 to 47.

Figure 42:
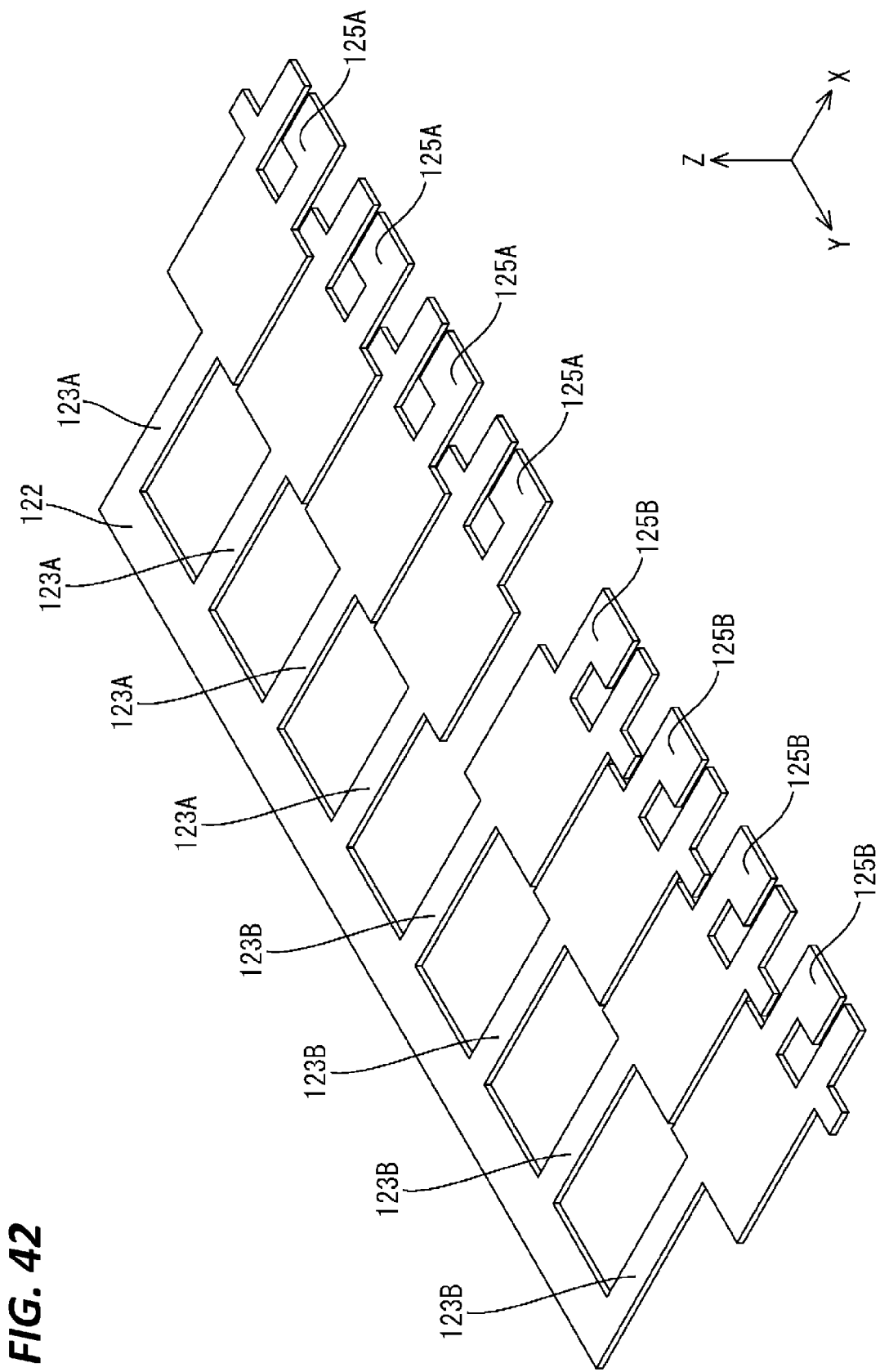
FIG. 42 is a plan view showing a developed shape of a metal plate material after cutting in a joint terminal according to a sixth embodiment.
Figure 43:
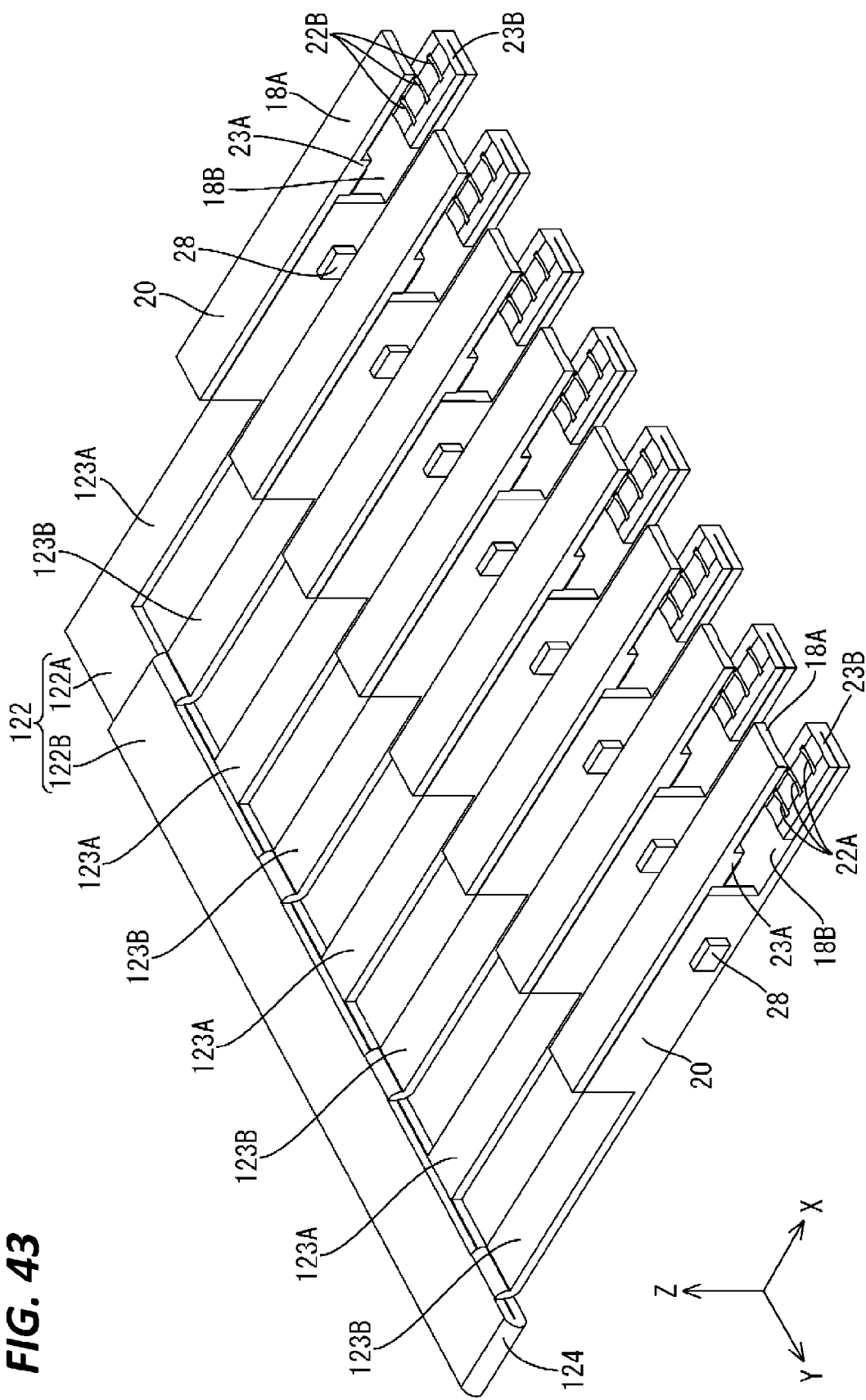
FIG. 43 is a perspective view showing the joint terminal before pressing portions are mounted.
Figure 44:
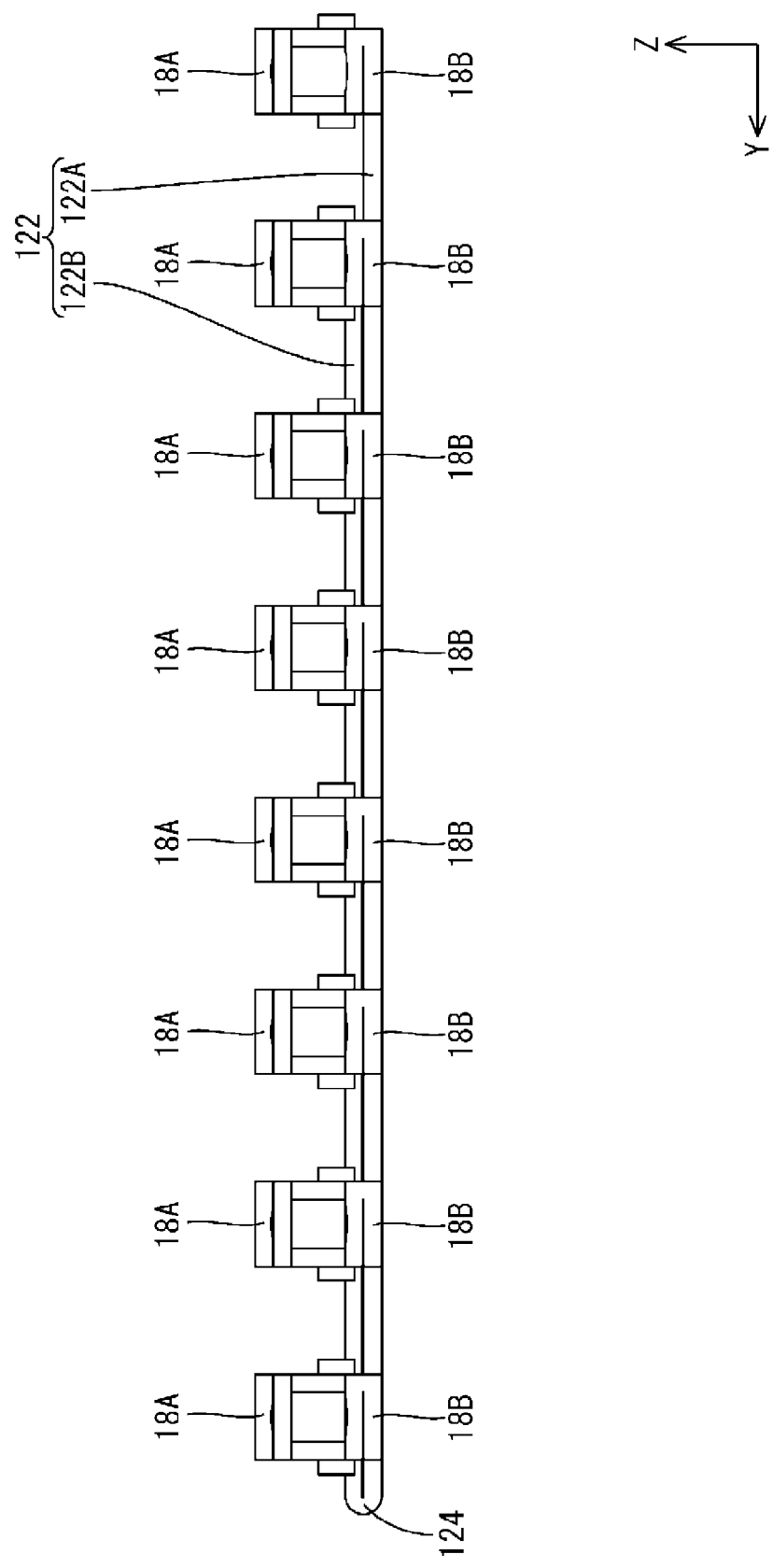
FIG. 44 is a left side view showing the joint terminal before the pressing portions are mounted.

A joint terminal 121 according to this embodiment is press-worked into a shape shown in FIGS. 43 and 44 after being cut into a developed shape as shown in FIG. 42. In the developed shape, a plurality of (eight in this embodiment) branch portions 123A, 123B are formed to extend leftward on a left side edge of a coupling portion 122 extending in a front-rear direction. The respective branch portions 123A, 123B are arranged at equal intervals in the front-rear direction.

Parts 125A which are provided on the tips of the branch portions 123A, 123B formed in a front half of the coupling portion 122 and where tubular portions 20 and upper and lower connecting pieces 18A, 18B are formed, and parts 125B which are provided on the tips of the branch portions 123A, 123B formed in a rear half of the coupling portion 122 and where tubular portions 20 and upper and lower connecting pieces 18A, 18B are formed are formed symmetrically in the front-rear direction.

Figure 45:
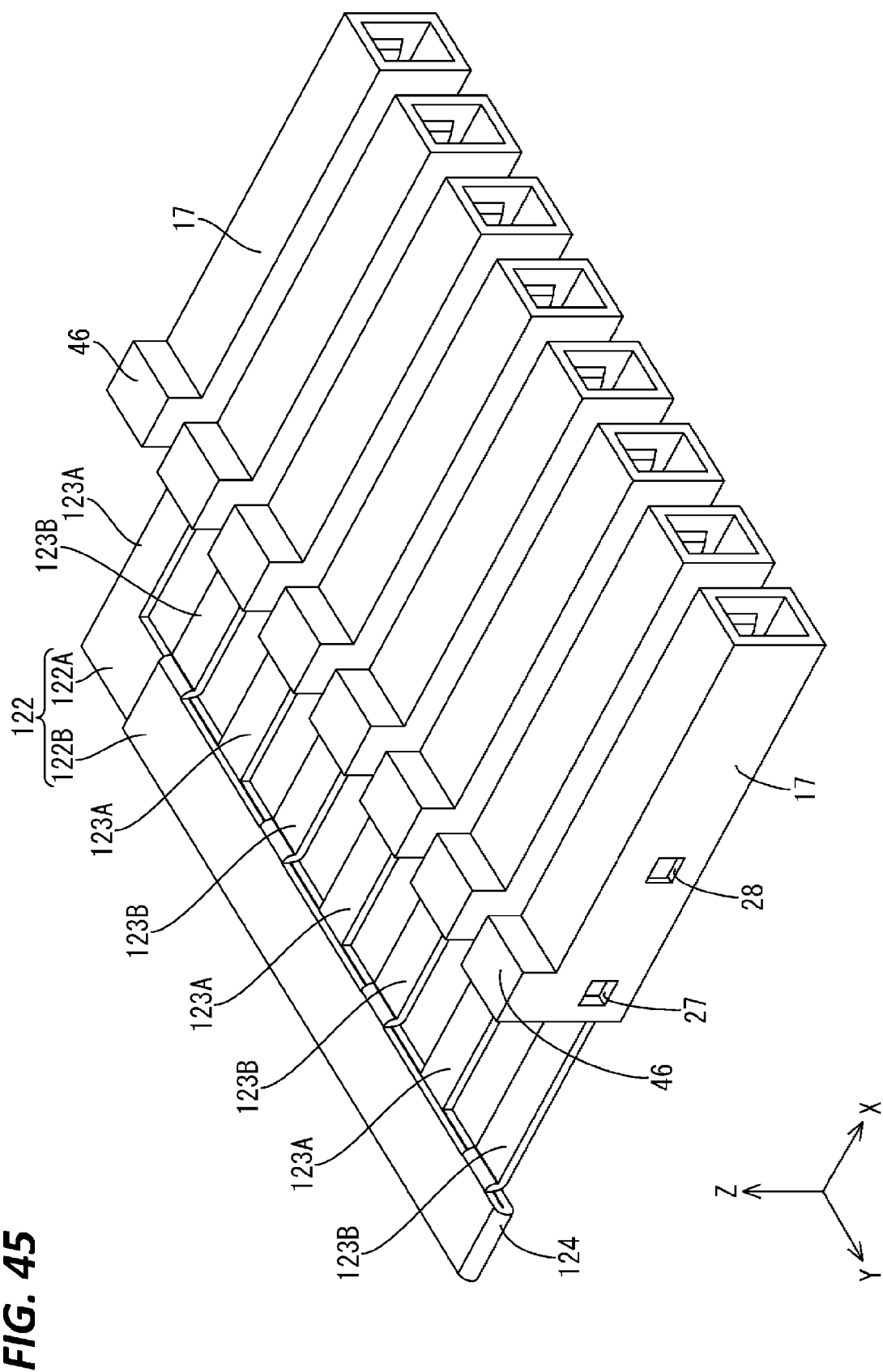
FIG. 45 is a perspective view showing the joint terminal.

As shown in FIG. 45, in the joint terminal 121 after press-working, a coupling portion folded portion 124 extending along a lateral direction is formed near a center position in the front-rear direction of the coupling portion 122. The coupling portion 122 is provided with a first coupling portion 122A and a second coupling portion 122B overlapped on the upper surface of the first coupling portion 122A by the coupling portion folded portion 124.

With the coupling portion 122 folded in the coupling portion folded portion 124, a plurality of (four in this embodiment) branch portions 123A formed on a left side edge of the first coupling portion 122A and a plurality of (fourth in this embodiment) second branch portions 123B formed on a left side edge of the second coupling portion 122B are disposed side by side at intervals in the front-rear direction.

As shown in FIG. 43, the branch portions 123B formed on the second coupling portion 122B are bent downward into a crank shape in boundary parts between the second coupling portion 122B and the branch portions 123B, thereby being disposed substantially at the same height positions in a vertical direction as the branch portions 123A formed on the first coupling portion 122A.

Figure 47:
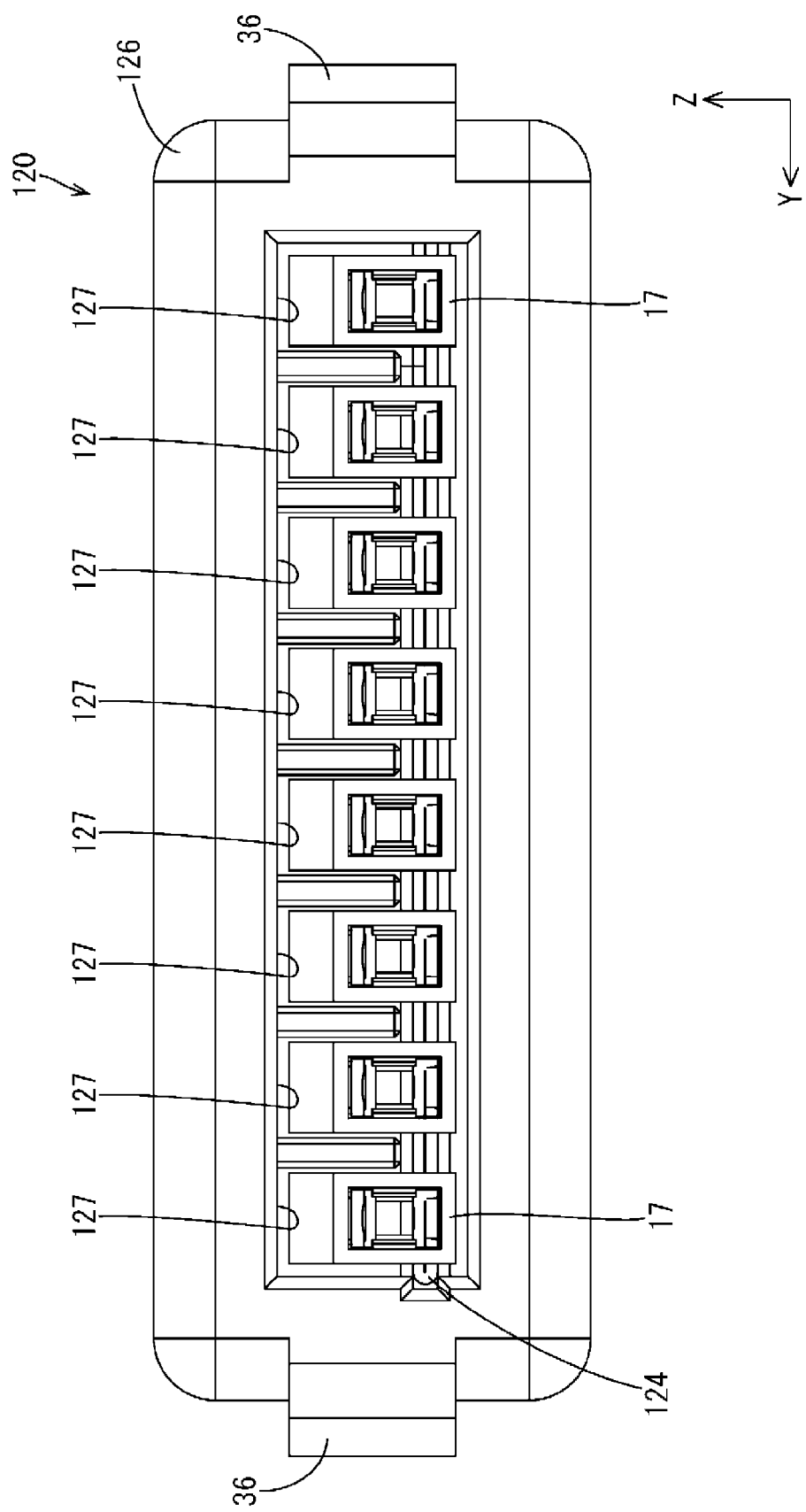
FIG. 47 is a left side view showing the joint connector.

As shown in FIGS. 46 and 47, a plurality of (eight in this embodiment) wire connecting portion accommodating portions 127 open leftward are provided in a left side wall of the housing 126. Lower end parts of the respective wire connecting portion accommodating portions 127 communicate in the front-rear direction.

Since the configuration other than the above is substantially the same as in the fourth embodiment, the same members are denoted by the same reference signs and repeated description is omitted.

Other Embodiments

The technique disclosed in this specification is not limited to the above described and illustrated embodiments. For example, the following embodiments are also included in the technical scope of the technique disclosed in this specification.

(1) The wire 11 may be a stranded wire formed by stranding a plurality of metal thin wires. Further, the wire 11 may be a so-called bare wire in which the core 13 is exposed without including the insulation coating 14.

(2) Although the pressing portion 17 is configured to slide along the lateral direction (an example of a second direction) in the above embodiments, there is no limitation to this and the pressing portion 17 may be configured to slide along the vertical direction (an example of a third direction).

(3) The joint terminal may include an arbitrary number of wire connecting portions.

(4) Although one tubular portion 20 includes the upper connecting piece 18A and the lower connecting piece 18B, there is no limitation to this. One tubular portion 20 may be provided with one connecting piece or may be provided with three or more connecting pieces.

(5) Although the pressing portion 17 is made of metal, there is no limitation to this and the pressing portion 17 can be made of an arbitrary material such as synthetic resin or ceramic.

(6) Although the upper and lower connecting pieces 18A, 18B are configured to be resiliently deformed, the upper and lower connecting pieces 18A, 18B may be configured to be plastically deformed.

(7) Two or more joint terminals may be disposed side by side at intervals in the vertical direction in the housing.

LIST OF REFERENCE NUMERALS 10, 75, 90, 105, 110, 120: joint connector
11: wire
12, 60, 80, 100, 111, 12: joint terminal
13: core
14: insulation coating
15, 61, 81, 101, 112, 122: coupling portion
16, 62, 82, 102, 115A, 115B, 123, 123A, 123B: branch portion
17: pressing portion
18A: upper connecting piece (example of connecting piece)
18B: lower connecting piece (example of connecting piece)
19: wire connecting portion
20: tubular portion
21A: upper contact surface (example of contact surface)
21B: lower contact surface (example of contact surface)
22A, 22B: serration
23A: upper holding protrusion
23B: lower holding protrusion
25A: upper contact portion
25B: lower contact portion
26: partial lock receiving portion
27: full lock receiving portion
28: locking projection
29, 67: cavity
30, 63, 85, 106, 114, 126: housing
31, 71: holder
32, 72: holding wall (example of engaging portion)
33: tapered surface
36: partial locking portion
37: full locking portion
38: lock receiving portion
39, 73: insertion hole
40, 76, 125A, 125B: part where upper and lower connecting pieces are formed
45: jig
46: jig contact portion
47: guiding portion
50: lower case
51: upper case
52: lock portion
53: lock receiving portion
54: coupling portion accommodating portion
55: branch portion accommodating portion
56, 57, 66, 107, 127: wire connecting portion accommodating portion
58, 69: upper wall
59, 70: work hole
64: coupling portion accommodating portion
65: branch portion accommodating portion
68: slit
74: rib
82A, 102A: first branch portion
82B, 102B: second branch portion
83, 103: branch portion folded portion
84A: upper wire connecting portion row (example of wire connecting portion row)
84B: lower wire connecting portion row (example of wire connecting portion row)
103: branch portion folded portion
112A, 122A: first coupling portion
112B, 122B: second coupling portion
113, 124: coupling portion folded portion

What is claimed is:

1. A joint connector, comprising:
a joint terminal; and
a housing configured to accommodate the joint terminal,
the joint terminal including a plurality of branch portions, a plurality of wire connecting portions respectively continuous with the plurality of branch portions and to be connected to wires, and a coupling portion electrically connecting the plurality of branch portions by coupling the plurality of branch portions,
wherein:
the wire connecting portion includes a connecting piece having a contact surface configured to contact the wire and a pressing portion configured to press the connecting piece against the wire by coming into contact with the connecting piece,
the pressing portion has a tubular shape and is externally fit to a region of the wire connecting portion where the connecting piece is provided,
the pressing portion includes a contact portion configured to press the connecting piece against the wire by coming into contact with the connecting piece,
the contact portion projects inward from an inner surface of a wall of the pressing portion, and
the contact portion comes into contact with the connecting piece when the pressing portion is slid to a pressing position where the pressing portion presses the connecting piece against the wire.

2. The joint connector of claim 1, wherein the pressing portion moves between the pressing position and a releasing position where the pressing portion does not press the connecting piece.

3. The joint connector of claim 2, wherein a jig contact portion is provided to project on the pressing portion, and the pressing portion is moved from the releasing position to the pressing position by being pressed by a jig with the jig contact portion held in contact with the jig.

4. The joint connector of claim 2, wherein:
a holder is mounted on the housing, and
the holder includes an engaging portion configured to restrict a movement of the pressing portion at the pressing position to the releasing position by engaging the pressing portion with the holder mounted on the housing.

5. The joint connector of claim 1, wherein the plurality of wire connecting portions are disposed on opposite ends in a longitudinal direction of the branch portions.

6. The joint connector of claim 1, wherein:
the coupling portion includes a coupling portion folded portion folded in a longitudinal direction of the coupling portion and a first coupling portion and a second coupling portion delimited by the coupling portion folded portion, and
the first and second coupling portions are folded to overlap.

7. The joint connector of claim 1, wherein:
the plurality of branch portions include first branch portions branched on one side of the coupling portion and second branch portions branched on the other side of the coupling portion, and
the second branch portions are folded to extend in the same direction as an extending direction of the first branch portions.

* * * * *